US011448846B2

(12) United States Patent
Kaml et al.

(10) Patent No.: US 11,448,846 B2
(45) Date of Patent: Sep. 20, 2022

(54) FIBER ROUTING SYSTEMS

(71) Applicant: COMMSCOPE TECHNOLOGIES LLC, Hickory, NC (US)

(72) Inventors: Jonathan R. Kaml, Shakopee, MN (US); Cyle D. Petersen, Belle Plaine, MN (US); Rodney C. Schoenfelder, Shakopee, MN (US); James J. Solheid, Minneapolis, MN (US); Matthew J. Holmberg, Le Center, MN (US); Oscar Fernando Bran De León, Belle Plaine, MN (US); Thomas Caesar Tinucci, Eden Prairie, MN (US); Dennis Krampotich, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/606,085

(22) PCT Filed: Apr. 17, 2018

(86) PCT No.: PCT/US2018/028014
§ 371 (c)(1),
(2) Date: Oct. 17, 2019

(87) PCT Pub. No.: WO2018/195109
PCT Pub. Date: Oct. 25, 2018

(65) Prior Publication Data
US 2021/0116666 A1   Apr. 22, 2021

Related U.S. Application Data

(60) Provisional application No. 62/582,811, filed on Nov. 7, 2017, provisional application No. 62/523,050, filed (Continued)

(51) Int. Cl.
*G02B 6/44* (2006.01)

(52) U.S. Cl.
CPC ........... *G02B 6/4472* (2013.01); *G02B 6/443* (2013.01); *G02B 6/4455* (2013.01); *G02B 6/4477* (2013.01)

(58) Field of Classification Search
CPC .... G02B 6/4472; G02B 6/442; G02B 6/4477; G02B 6/4455
(Continued)

(56) References Cited

U.S. PATENT DOCUMENTS 4,846,545 A * 7/1989 Estabrook ............ G02B 6/2558
385/99
5,013,125 A * 5/1991 Nilsson ................ G02B 6/4465
254/134.3 R
(Continued)

FOREIGN PATENT DOCUMENTS

CN    101317112 B    7/2012
EP    0 740 174 A2   1/1997
WO    2017/046190 A2 3/2017

OTHER PUBLICATIONS

Extended European Search Report for European Patent Application No. 18788372.3 dated Dec. 14, 2020, 7 pages.
(Continued)

*Primary Examiner* — Kaveh C Kianni
(74) *Attorney, Agent, or Firm* — Merchant & Gould P.C.

(57) ABSTRACT

The present disclosure relates to structures and configurations for breaking out fibers from cables and/or securing the ends of protective mesh sleeves to other structures such as brackets, cables and trays/cassettes. The mesh sleeves can be adapted to protect optical fibers that pass therethrough. In one example, a mesh sleeve can be secured to another structure by an anchor including a reinforcing insert that fits in the mesh sleeve and a clamping housing that mounts over the mesh sleeve.

20 Claims, 61 Drawing Sheets

Related U.S. Application Data on Jun. 21, 2017, provisional application No. 62/500,730, filed on May 3, 2017, provisional application No. 62/486,122, filed on Apr. 17, 2017.

(58) Field of Classification Search
USPC .......................................................... 385/135
See application file for complete search history.

(56) References Cited

U.S. PATENT DOCUMENTS

| | | | | |
|---|---|---|---|---|
| 5,615,734 A | * | 4/1997 | Hyp | ...................... F22B 37/002 |
| | | | | 165/11.2 |
| 5,720,907 A | | 2/1998 | Anderson et al. | |
| 5,771,984 A | * | 6/1998 | Potter | ...................... E21B 7/14 |
| | | | | 175/14 |
| 6,572,277 B1 | * | 6/2003 | Ritter | .................. G02B 6/4471 |
| | | | | 385/77 |
| 7,787,614 B2 | | 8/2010 | Duran et al. | |
| 8,879,278 B2 | * | 11/2014 | Keith | ..................... H04Q 1/023 |
| | | | | 361/826 |
| 9,377,133 B2 | * | 6/2016 | Pionetti | ................. E21B 17/017 |
| 9,448,365 B2 | | 9/2016 | Fletcher | |
| 9,739,952 B2 | | 8/2017 | Fletcher | |
| 10,054,753 B2 | * | 8/2018 | Petersen | .............. G02B 6/4472 |
| 2004/0200536 A1 | * | 10/2004 | Strasser | ................ A62C 33/00 |
| | | | | 138/104 |
| 2005/0031276 A1 | | 2/2005 | Zimmel et al. | |
| 2005/0117857 A1 | * | 6/2005 | Cooke | .................. G02B 6/4428 |
| | | | | 385/100 |
| 2012/0195019 A1 | | 8/2012 | Keith | |
| 2014/0140664 A1 | | 5/2014 | Islam | |
| 2014/0262431 A1 | * | 9/2014 | Crain, Jr. | ............. H02G 3/0487 |
| | | | | 174/117 R |
| 2015/0192740 A1 | * | 7/2015 | Bible | .................. G02B 6/2558 |
| | | | | 385/135 |
| 2015/0370029 A1 | | 12/2015 | Petersen et al. | |
| 2016/0139355 A1 | * | 5/2016 | Petersen | .............. G02B 6/4478 |
| | | | | 385/100 |
| 2016/0202438 A1 | | 7/2016 | Bustamante | |
| 2018/0074275 A1 | * | 3/2018 | Thompson | ........... G02B 6/4454 |

OTHER PUBLICATIONS

International Search Report and Written Opinion of the International Searching Authority for International Patent Application No. PCT/US2018/028014 dated Aug. 8, 2018, 13 pages.
Examination Report for European Patent Application No. 18788372.3 dated Dec. 23, 2021, 6 pages.

* cited by examiner

FIG. 6
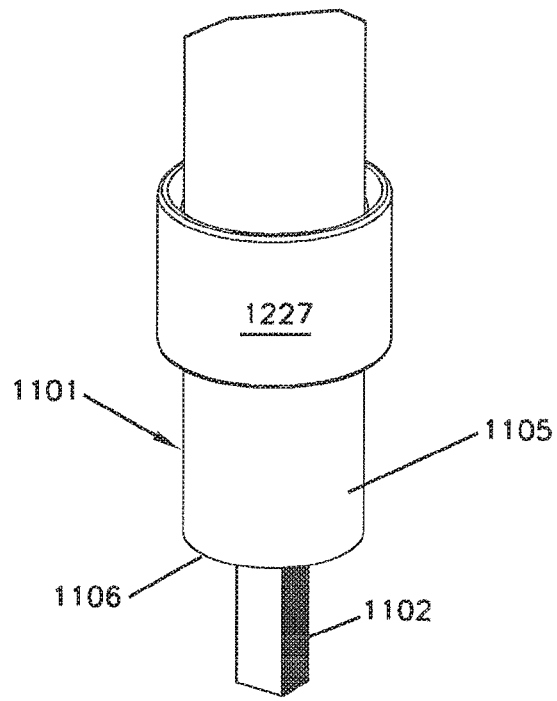
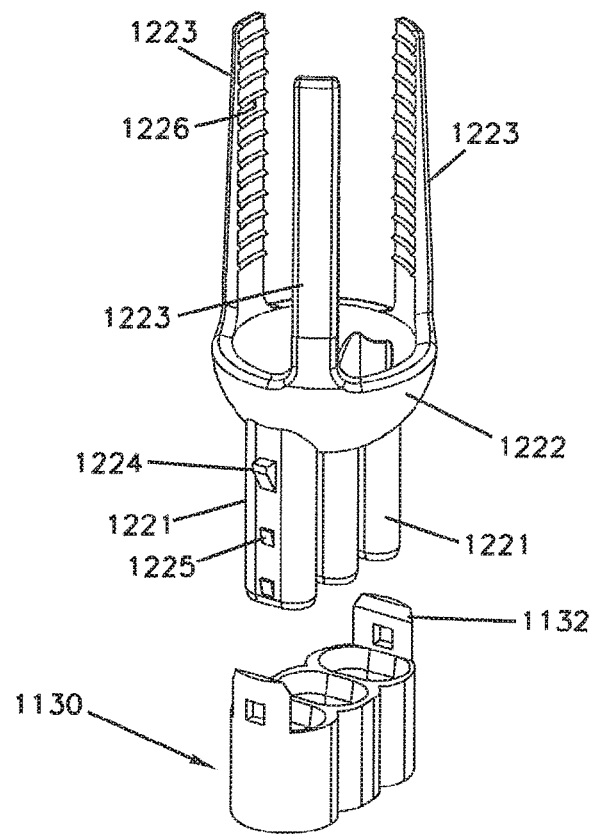

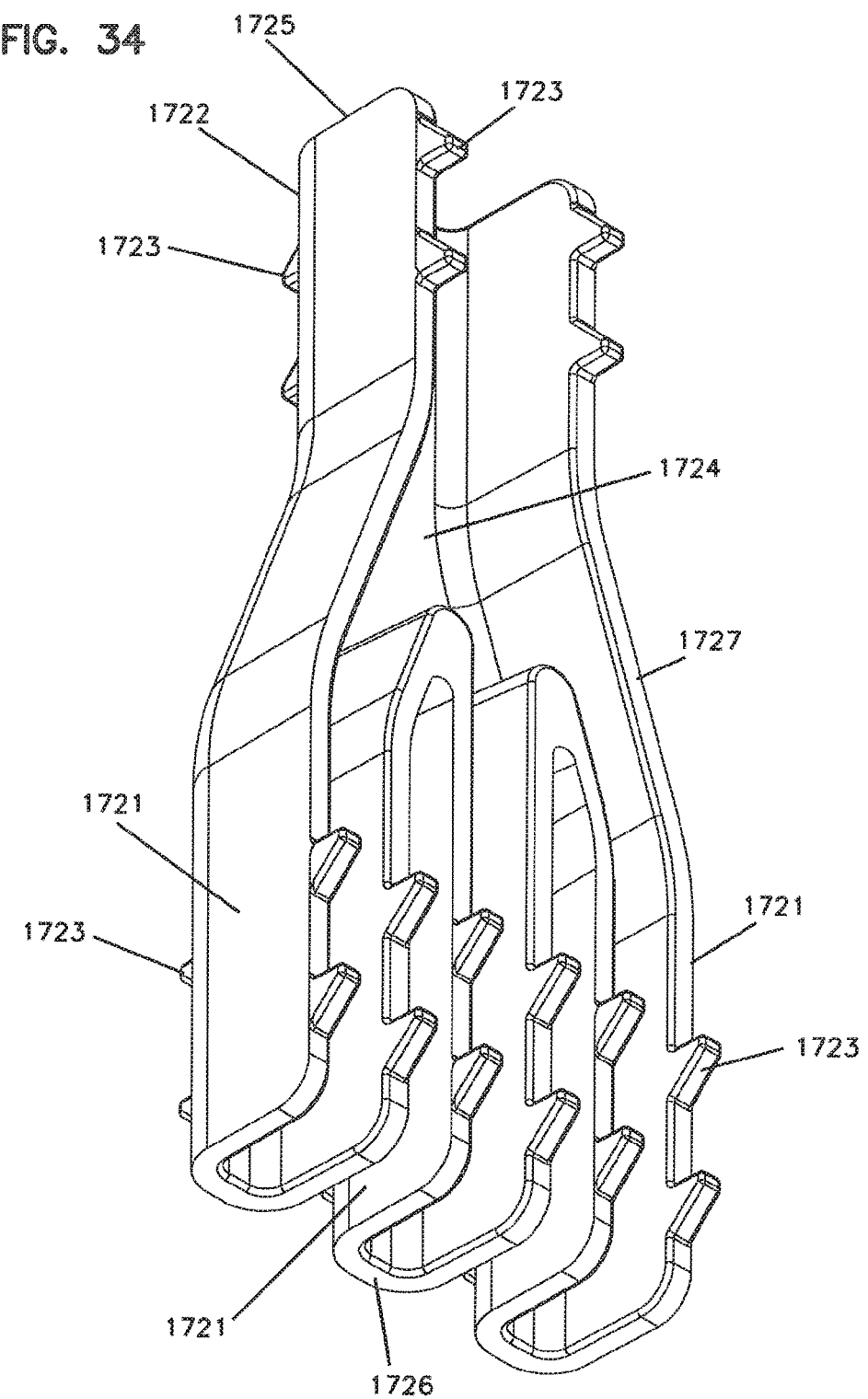

FIBER ROUTING SYSTEMS

CROSS-REFERENCE TO RELATED APPLICATIONS

This application is a National Stage Application of PCT/US2018/028014, filed on Apr. 17, 2018, which claims the benefit of U.S. Patent Application Ser. No. 62/486,122, filed on Apr. 17, 2017, and claims the benefit of U.S. Patent Application Ser. No. 62/500,730, filed on May 3, 2017, and claims the benefit of U.S. Patent Application Ser. No. 62/523,050, filed on Jun. 21, 2017, and claims the benefit of U.S. Patent Application Ser. No. 62/582,811, filed on Nov. 7, 2017, the disclosures of which are incorporated herein by reference in their entireties. To the extent appropriate, a claim of priority is made to each of the above disclosed applications.

BACKGROUND

The present disclosure is directed to fiber optics and, more specifically, to fiber routing systems.

The demand for higher and higher data speeds continues to grow. To accommodate that demand, data centers utilize multi-fiber fiber optic cables to connect servers, switches and storage. Multi-fiber fiber optic cables enable the use of a great number of fibers in a small space. However, with the use of greater and greater numbers of fiber optic cables is the need to maintain cable management and protection. The management of fiber optic cables includes the routing of each cable to a desired location and protection of fiber optic cables includes reducing abrasion, dirt and dust penetration, and other wear that may occur.

SUMMARY

The present disclosure is directed to a fiber routing system for managing and protecting optical fibers. One aspect relates to anchoring devices and/or anchoring configurations for securing the ends of conduits (e.g., mesh sleeves) to fixtures, brackets, frames, panels, cassettes, trays, modules, racks, terminals, optical fiber fan-outs breakouts, or the like. In certain examples, the conduits are suitable for protecting optical fibers routed therethrough.

Other aspects relate to fiber breakout configurations for breaking out or fanning out optical fibers from a fiber optic cable to a plurality of protective conduits (e.g., mesh sleeves, furcation tubes, jackets, etc.). The fiber routing system includes a mesh sleeve that surrounds and protects at least one optical fiber which has been routed through the mesh sleeve.

Certain aspects of the disclosure are directed to a cable breakout assembly that secures to a cable jacket. The cable breakout assembly includes a sleeve; an insert arrangement; and a fixing arrangement. The sleeve surrounds at least a portion of a media segment disposed beyond a terminated end of the cable jacket. The insert arrangement is at least partly disposed within the first end of the sleeve. The fixing arrangement is disposed about the first end of the sleeve to hold the sleeve to the insert arrangement. The fixing arrangement is secured to the insert arrangement so that the sleeve is sandwiched between the fixing arrangement and the insert arrangement.

In some implementations, the insert arrangement secures to the cable jacket. In other implementations, the fixing arrangement secures to the cable jacket.

In certain implementations, a conduit extends between a first end and a second end, the first end of the conduit securing to the cable jacket, and the second end of the conduit securing to the cable breakout assembly.

In certain examples, the conduit is formed from a common material with the sleeve. In an example, the common material is mesh. In certain examples, the sleeve is formed of mesh.

In certain implementations, the fixing arrangement couples to the sleeve and separately couples to the insert arrangement. In certain implementations, the fixing arrangement includes a plurality of separate fixation members of the cable breakout assembly. In certain implementations, the fixing arrangement includes a plurality of fixation members coupled together as a unit. In certain implementations, the fixing arrangement couples to the insert arrangement through the sleeve.

In certain implementations, the sleeve is one of a plurality of sleeves of the cable breakout assembly; and wherein the insert arrangement includes a plurality of inserts, each of the inserts being disposed within a first end of a respective one of the sleeves.

In certain examples, the insert arrangement includes an anchor bracket attached to the cable jacket; and wherein the inserts extend from the anchor bracket.

In certain examples, the anchor bracket includes a cylindrical body that surrounds the cable jacket. In certain examples, the anchor bracket includes a two-piece body. In certain examples, the cylindrical body defines apertures to facilitate tying the anchor bracket to the cable jacket.

In certain examples, the insert arrangement also includes a compression ring that surrounds the cable jacket and defines an external ridge; wherein the cylindrical body defines an inner annular recess that receives the external ridge when the anchor bracket is slid over the compression ring in a first direction; wherein engagement between the external ridge and a shoulder bounding the inner annular recess inhibits movement of the anchor bracket relative to the compression ring in a second direction that is opposite to the first direction.

In certain examples, a mounting member surrounds the extension arms to secure the extension arms to the cable. In certain examples, the mounting member includes a wrap member. In certain examples, the mounting member includes a ring that slides over the extension arms.

In certain examples, the anchor bracket includes extension arms that extend partly along the cable jacket. In certain examples, the extension arms have inner textured surfaces that contact the cable jacket when the anchor bracket is secured to the cable jacket.

In certain examples, the inserts are separate pieces.

In certain examples, the fixing arrangement includes an extension sufficiently long to extend along a portion of the cable jacket.

Other aspects of the disclosure are directed to a cable assembly including a cable breakout as disclosed herein mounted to a cable at a terminated end of a cable jacket of the cable.

In an aspect, the optical fibers extend between a rack-mounted cassette and a fiber optic cable. At the rack-mounted cassette, a first sleeve anchor includes a reinforcing insert and a wrap-around style fastener that secures a first end of the mesh sleeve to the rack-mounted cassette. At an end of the fiber optic cable, a second sleeve anchor includes a reinforcing insert and a clamping collar that secures a second end of the mesh sleeve to a breakout bracket for the fiber optic cable. In certain aspects, the second sleeve anchor can include an attachment feature for securing the second end of the mesh sleeve to the breakout bracket and/or a breakout block.

Certain aspects of the present disclosure relate to structures and configurations for securing the ends of protective mesh sleeves to other structures such as brackets, cables and trays/cassettes. The mesh sleeves can be adapted to protect optical fibers that pass therethrough. In one example, a mesh sleeve can be secured to another structure by an anchor including a reinforcing insert that fits in the mesh sleeve and a clamping housing that mounts over the mesh sleeve.

Another aspect of the present disclosure relates to a fiber routing system. The fiber routing system includes a mesh sleeve having a sleeve end and a reinforcing insert positioned within the sleeve end. The reinforcing insert defines an internal fiber passage that extends through a length of the reinforcing insert and is configured to receive at least one optical fiber routed therethrough. The reinforcing insert includes an outer side defining an annular channel. The fiber routing system also includes a wrap-around style fastener for securing the sleeve end to a sleeve anchoring location. The wrap-around style fastener being tightened about an exterior of the mesh sleeve at a location in alignment with the annular channel of the reinforcing insert such that a portion of the mesh sleeve is compressed into the annular channel by the wrap-around style fastener.

Another aspect of the present disclosure relates to a fiber routing system. The fiber routing system includes a mesh sleeve having a sleeve end and a sleeve anchor mounted at the sleeve end. The sleeve anchor includes a reinforcing insert including at least a portion that fits within the sleeve end of the mesh sleeve. The reinforcing insert includes an anchoring feature accessible from outside of the sleeve end for securing the sleeve anchor at a sleeve anchoring location. The reinforcing insert defines a fiber passage of the sleeve anchor that extends through the reinforcing insert and is configured to receive at least one optical fiber routed therethrough. The sleeve anchor also includes a clamping collar that mounts over the sleeve end such that the sleeve end is clamped radially between the clamping collar and the reinforcing insert.

A further aspect of the disclosure relates to a fiber routing system. The fiber routing system includes a plurality of mesh sleeves each having a sleeve end and a sleeve mount secured at the sleeve ends of the mesh sleeves. The sleeve mount includes a reinforcing insert piece including a plurality of reinforcing inserts arranged in a ganged configuration. Each of the reinforcing inserts fits within a corresponding one of the sleeve ends of the mesh sleeves. The reinforcing inserts defines separate fiber passages configured to receive at least one optical fiber routed therethrough. The sleeve mount also includes a clamping piece including a plurality of clamping collars each configured to mount over a corresponding one of the reinforcing inserts such that the sleeve ends of the mesh sleeves are clamped radially between the clamping collar and their corresponding reinforcing inserts.

In yet another aspect the disclosure relates to a fiber routing system. The fiber routing system includes a mesh sleeve having a sleeve end and a sleeve anchor mounted at the sleeve end. The sleeve anchor includes a reinforcing insert that fits within the sleeve end of the mesh sleeve. The reinforcing insert includes opposite first and second ends and the reinforcing insert includes first and second outer tapered sections positioned respectively at the first and second ends of the reinforcing insert. The first and second outer tapered sections tapering radially outwardly as the first and second outer tapered sections extend toward a central region of the reinforcing insert. The reinforcing insert defines a fiber passage that extends through the reinforcing insert from the first end to the second end of the reinforcing insert and is configured to receive at least one optical fiber routed therethrough. A first clamping collar mounts over the sleeve end at a location corresponding to the first outer tapered section of the reinforcing insert such that the sleeve end is clamped radially between the first clamping collar and the first outer tapered section of the reinforcing insert. The first clamping collar has a first inner tapered section adapted to nest relative to the first outer tapered section of the reinforcing insert. The sleeve anchor also includes a second clamping collar that mounts over the sleeve end at a location corresponding to the second outer tapered section of the reinforcing insert such that the sleeve end is clamped radially between the second clamping collar and the second outer tapered section of the reinforcing insert. The second clamping collar has a second inner tapered section adapted to nest relative to the second outer tapered section of the reinforcing insert.

Still another aspect of the present disclosure relates to a fiber routing system including a mesh sleeve having a sleeve end, and a sleeve anchor that mounts at the sleeve end. The sleeve anchor includes a reinforcing insert including at least an insert portion that fits within the sleeve end of the mesh sleeve. The reinforcing insert defines a fiber passage of the sleeve anchor that extends through the reinforcing insert that is configured to receive at least one optical fiber routed therethrough. The sleeve anchor also includes a clamping housing that mounts over the sleeve end such that the sleeve end is clamped between the clamping housing and the insert portion of the reinforcing insert.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The accompanying drawings, which are incorporated in and constitute a part of the description, illustrate several aspects of the present disclosure. A brief description of the drawings is as follows:

FIG. 6 is an exploded view of the first cable assembly of FIG. 5;

FIGS. 33 and 34 are perspective views of an example insert arrangement of the seventh cable breakout assembly;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
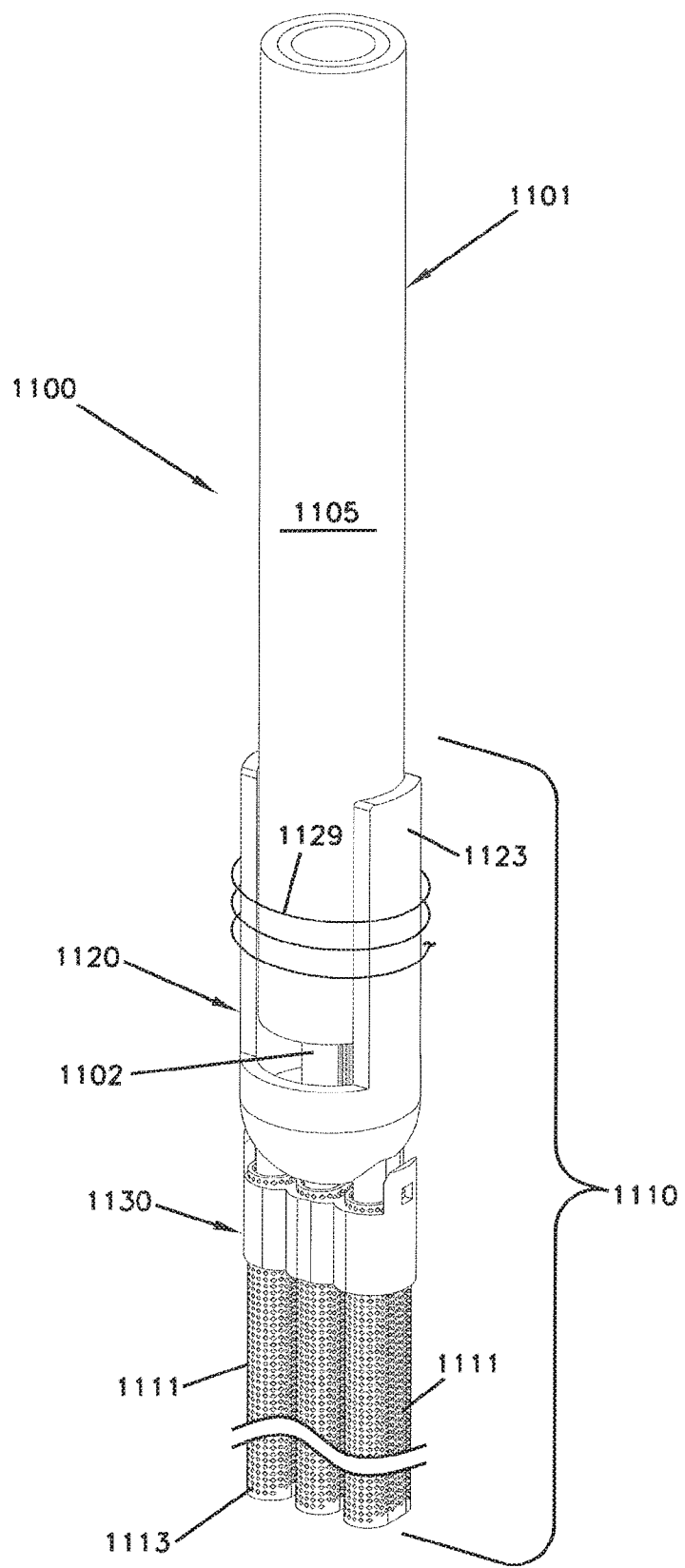
FIG. 1 is a perspective view of a first cable assembly including a first example cable breakout assembly mounted to a cable, the first cable breakout assembly including an insert arrangement, a fixation arrangement, and at least one sleeve.
Figure 2:
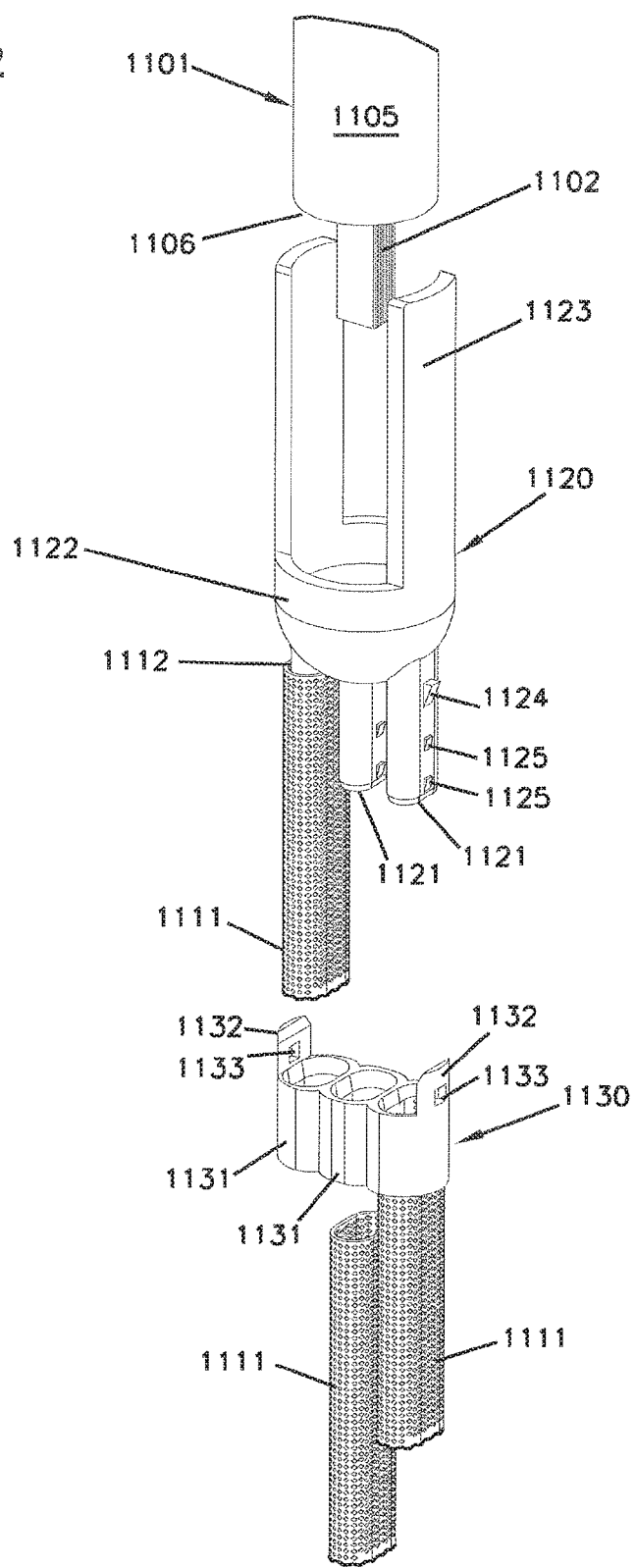
FIG. 2 is an exploded view of the first cable assembly of FIG. 1.
Figure 3:
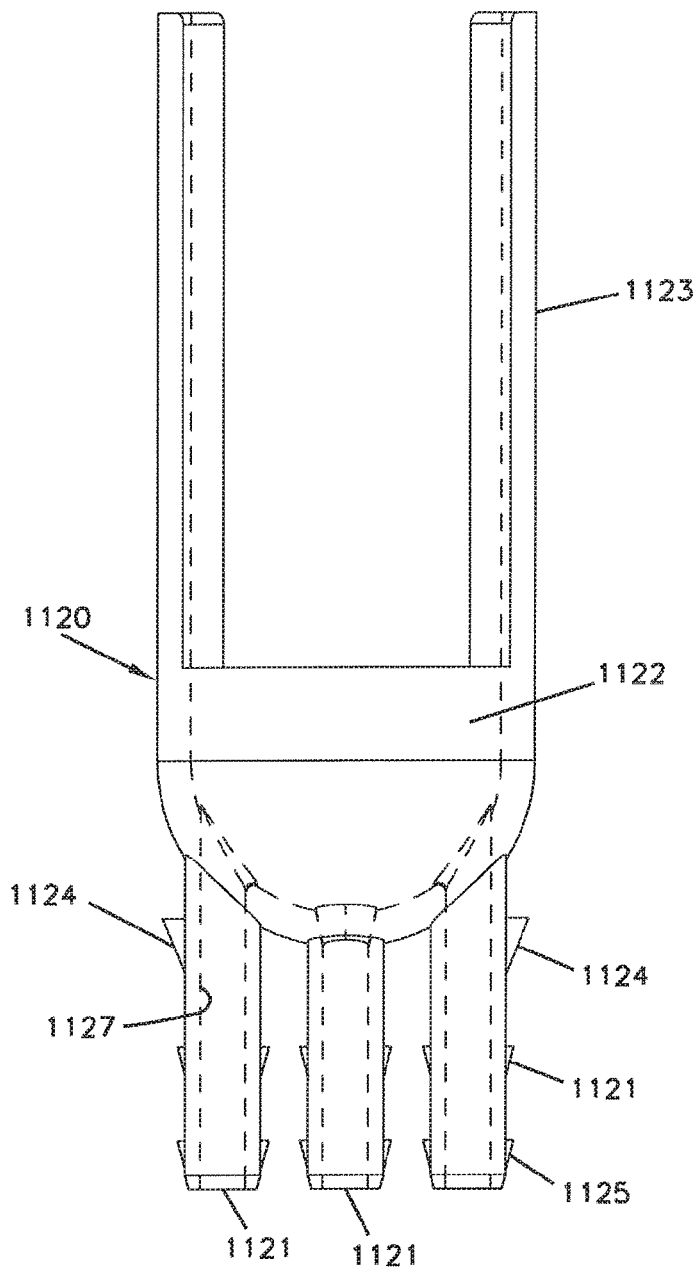
FIG. 3 is a side view of the insert arrangement of the first cable breakout assembly of FIG. 1 with internal details shown in dashed lines.
Figure 4:
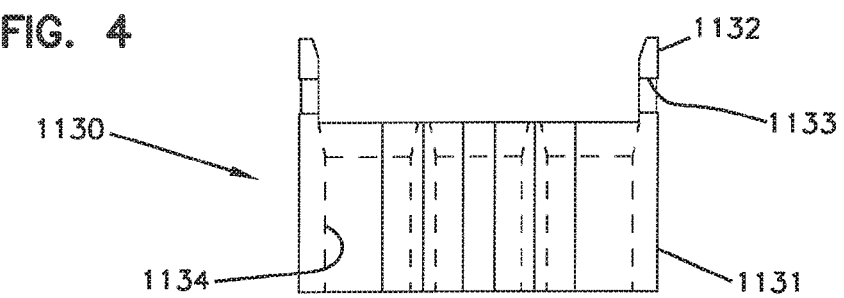
FIG. 4 is a side view of the fixation arrangement of the first cable breakout assembly of FIG. 1 with internal details shown in dashed lines.
Figure 5:
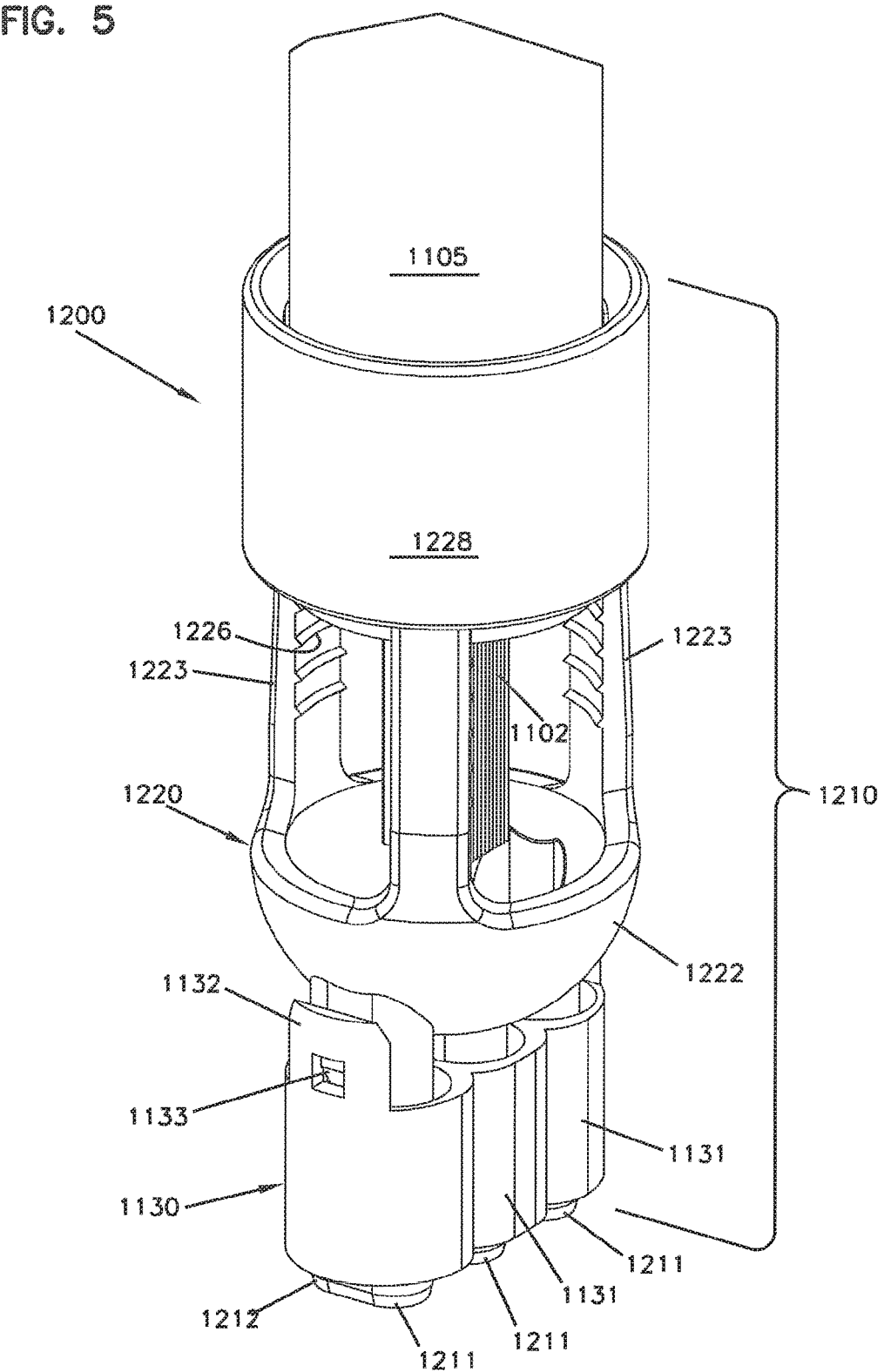
FIG. 5 is a perspective view of a second cable assembly including a second example cable breakout assembly mounted to a cable, the second cable breakout assembly including an insert arrangement, a fixation arrangement, and at least one sleeve.
Figure 7:
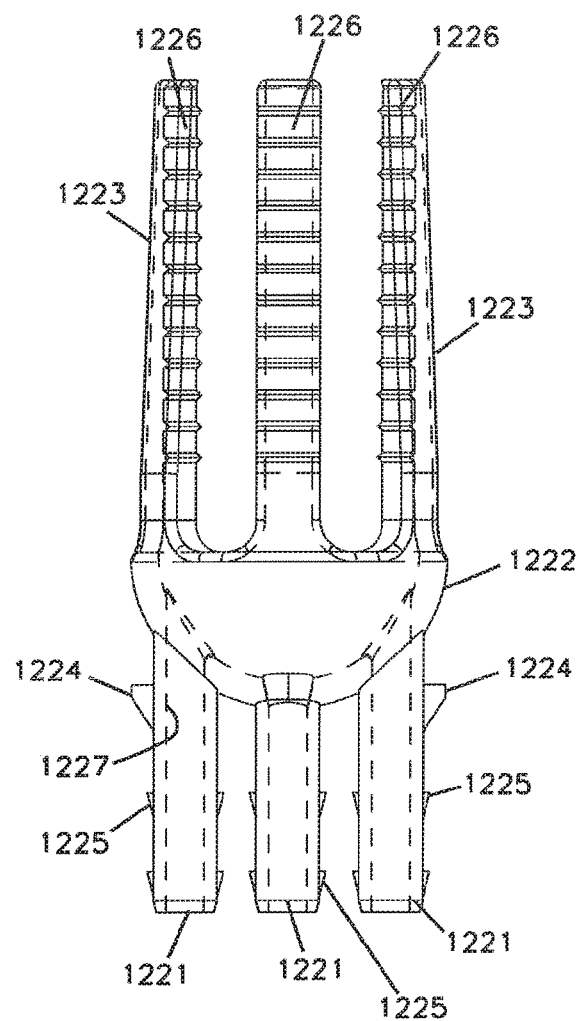
FIG. 7 is a side view of the insert arrangement of the second cable breakout assembly of FIG. 5 with internal details shown in dashed lines.
Figure 8:
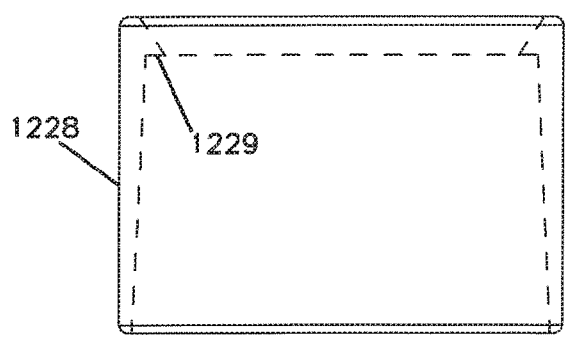
FIG. 8 is a side view of an example mounting member of the first cable breakout assembly of FIG. 5 with internal details shown in dashed lines.
Figure 9:
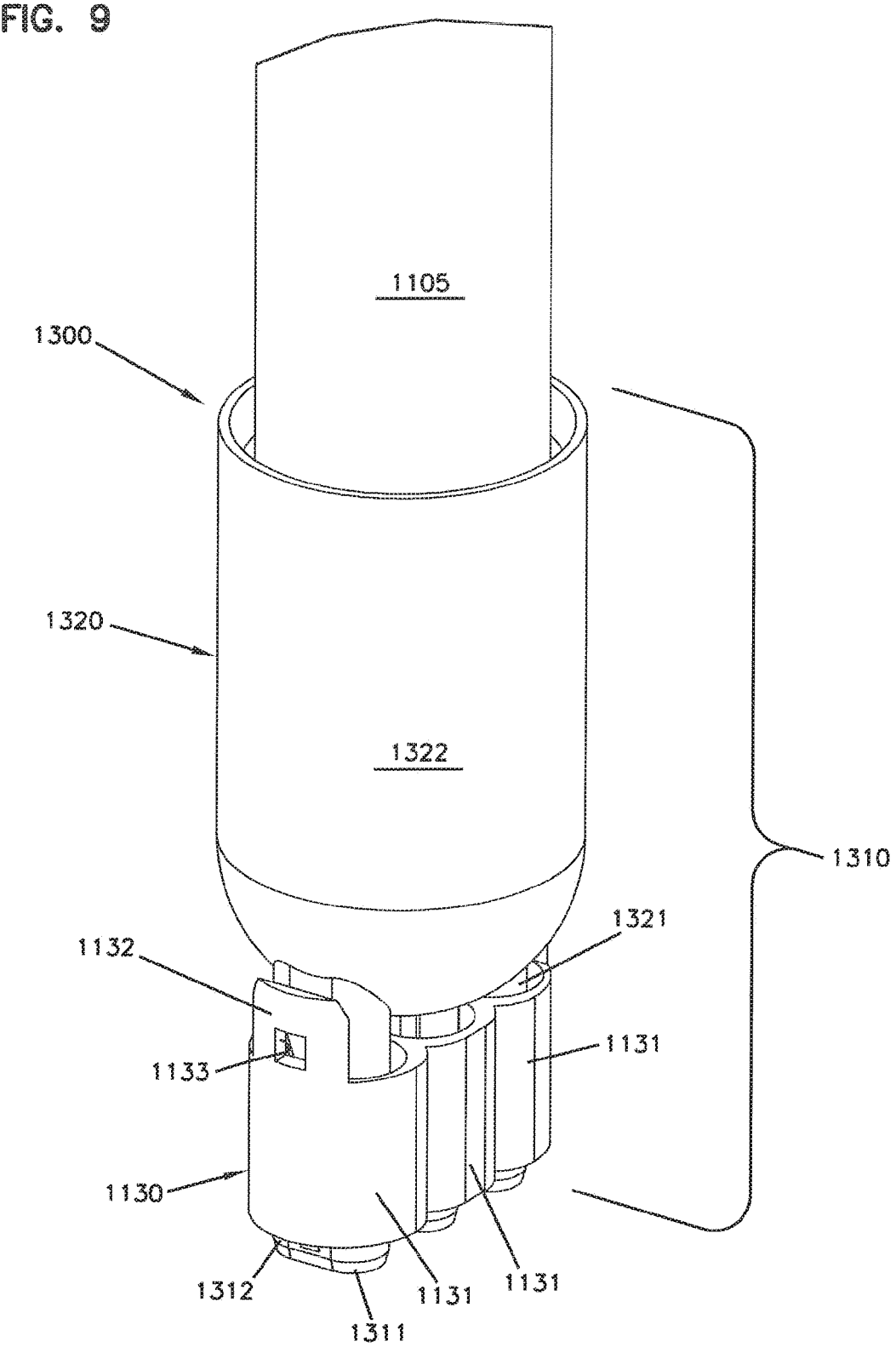
FIG. 9 is a perspective view of a third cable assembly including a third example cable breakout assembly mounted to a cable, the third cable breakout assembly including an insert arrangement, a fixation arrangement, and at least one sleeve.
Figure 10:
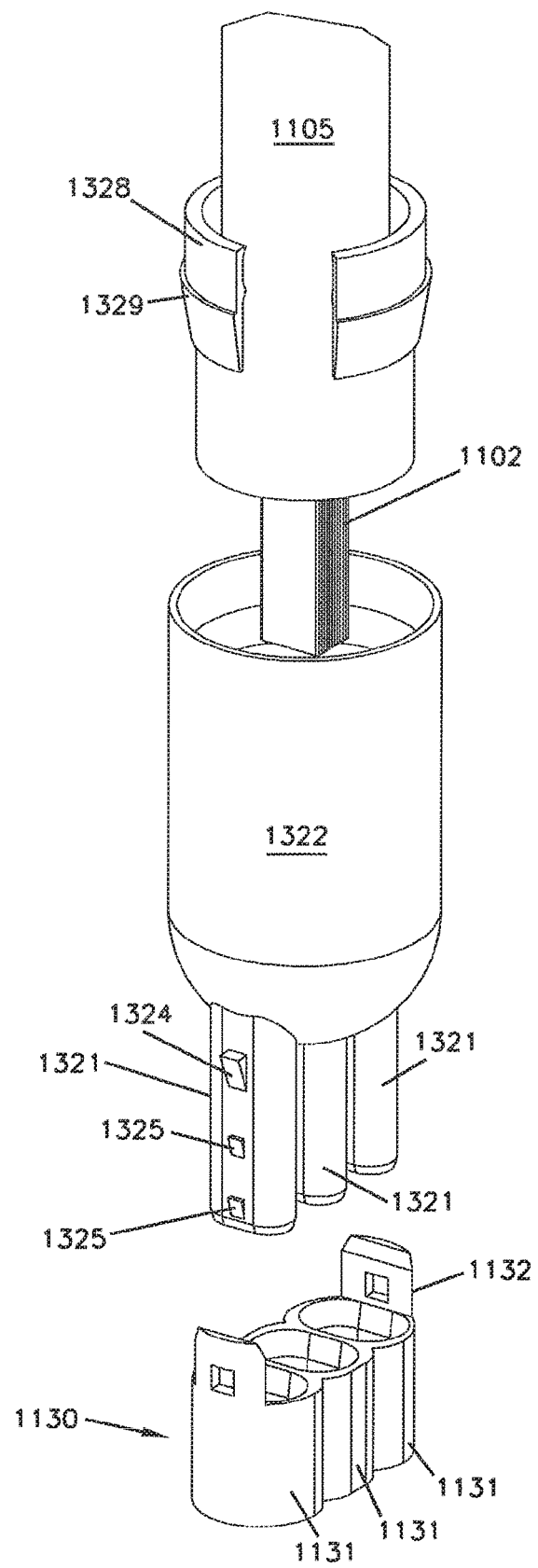
FIG. 10 is an exploded view of the third cable assembly of FIG. 9.
Figure 11:
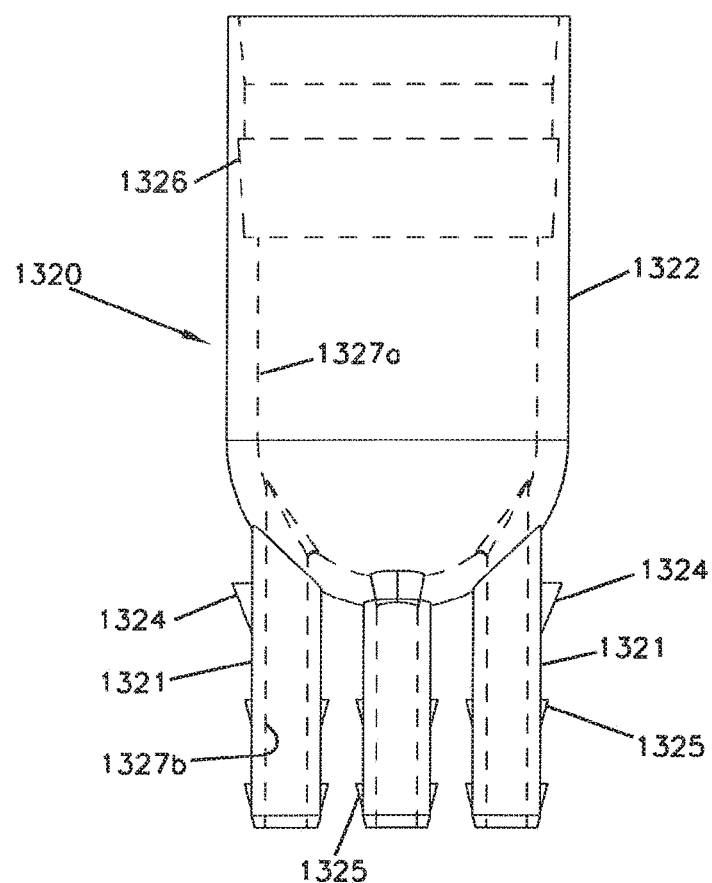
FIG. 11 is a side view of the insert arrangement of the third cable breakout assembly of FIG. 9 with internal details shown in dashed lines.
Figure 12:
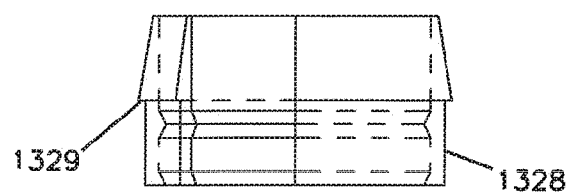
FIG. 12 is a side view of an example mounting member of the third cable breakout assembly of FIG. 9 with internal details shown in dashed lines.
Figure 13:
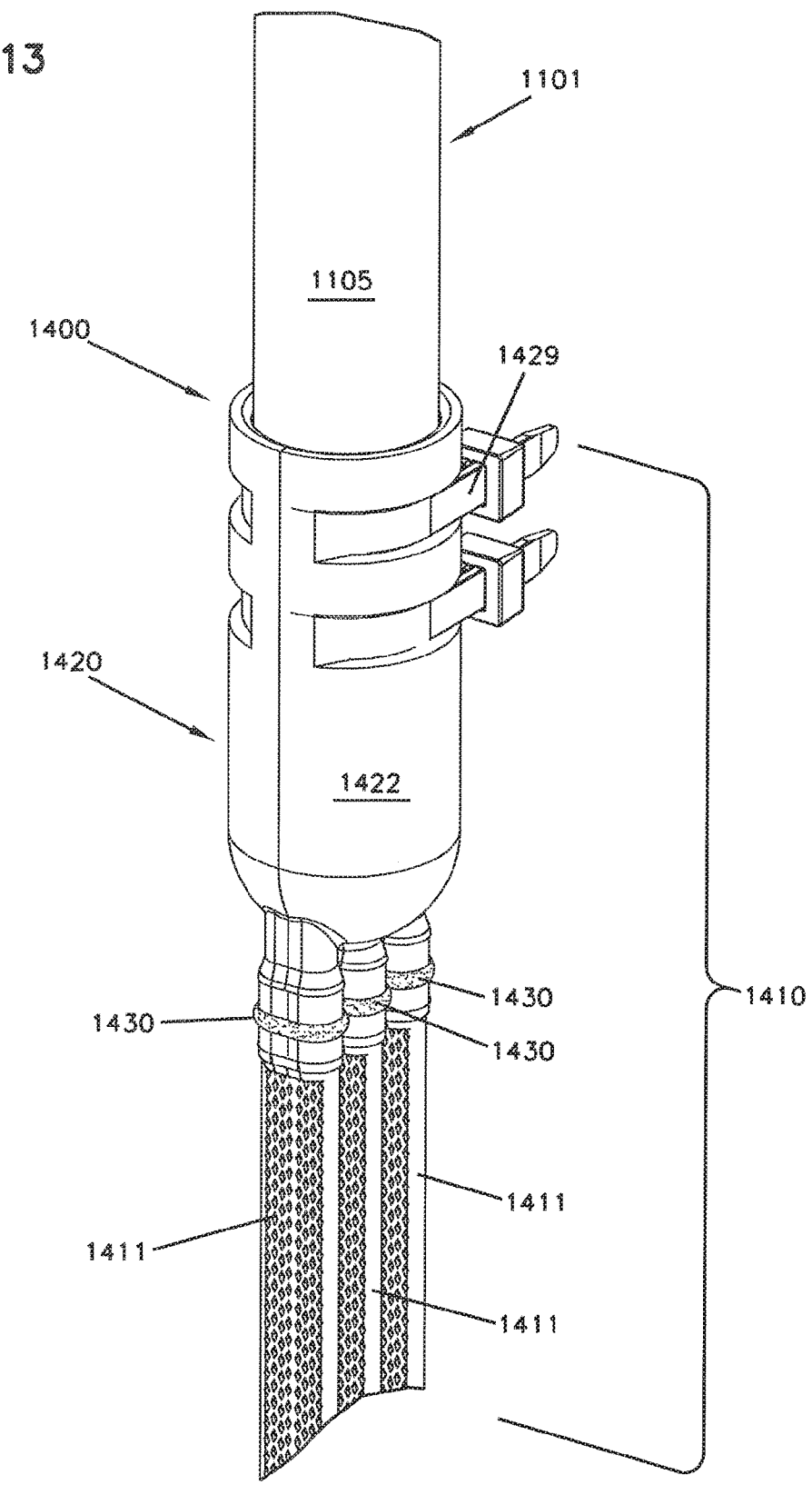
FIG. 13 is a perspective view of a fourth cable assembly including a fourth example cable breakout assembly mounted to a cable, the fourth cable breakout assembly including an insert arrangement, a fixation arrangement, and at least one sleeve.
Figure 14:
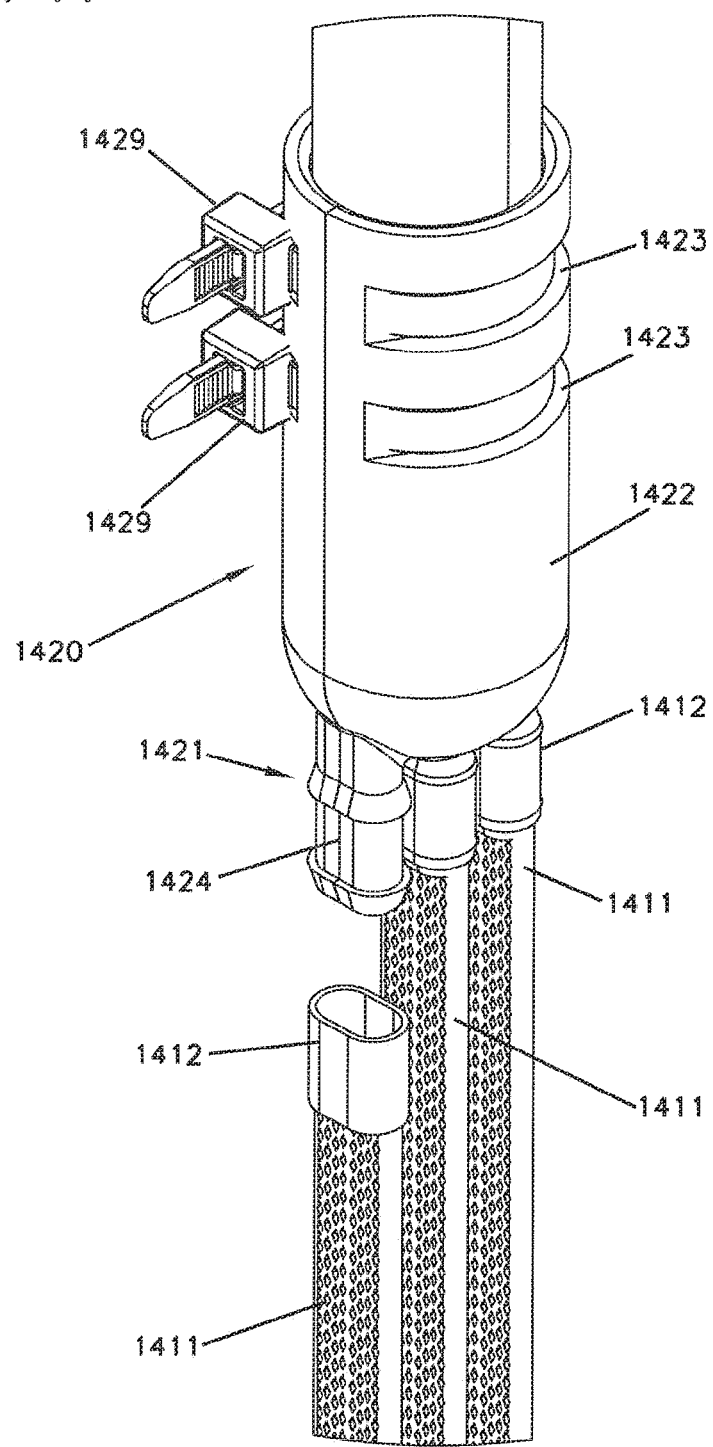
FIG. 14 is a partially exploded view of the fourth cable assembly of FIG. 13.
Figure 15:
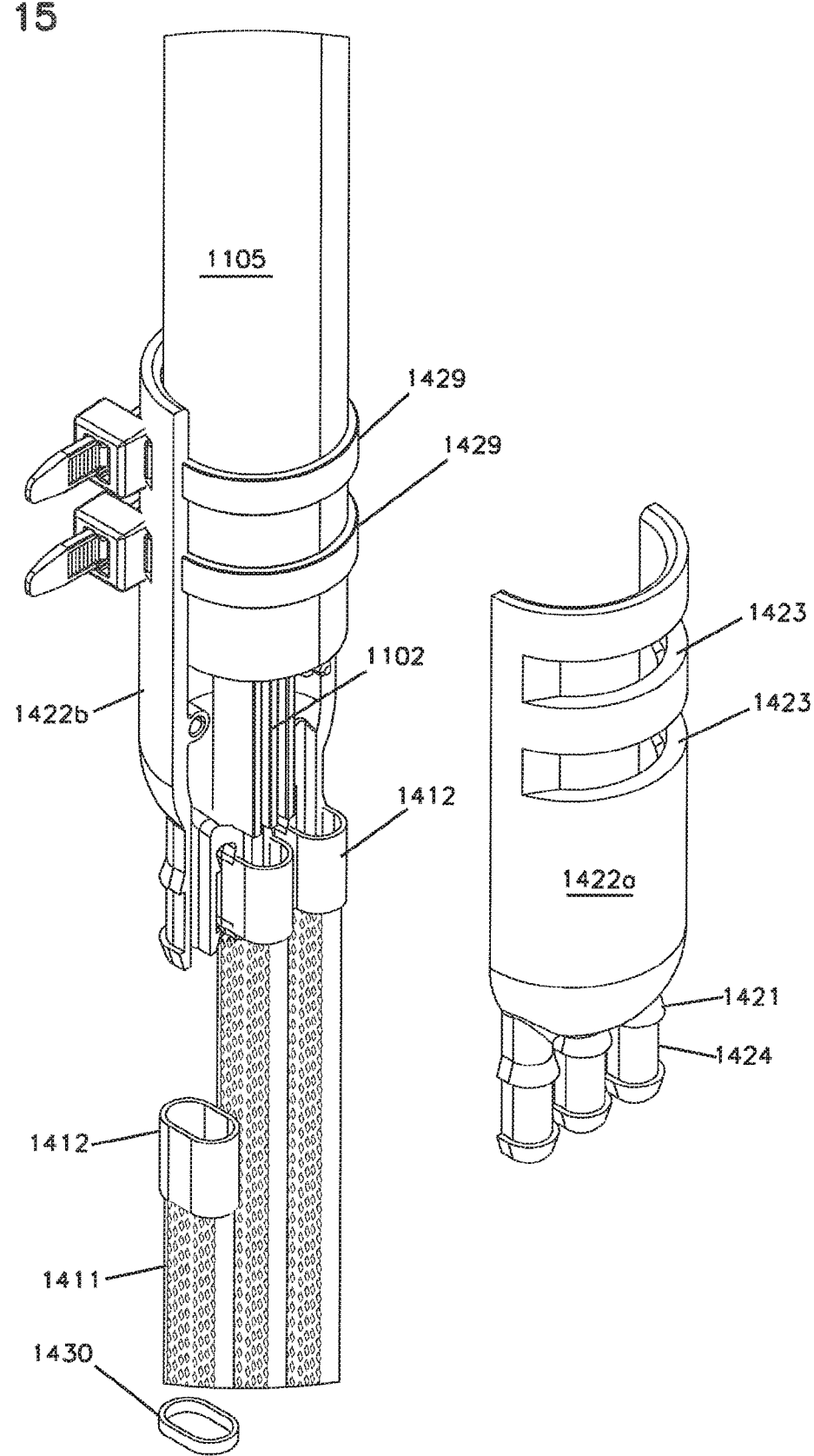
FIG. 15 is another partially exploded view of the fourth cable assembly of FIG. 13.
Figure 16:
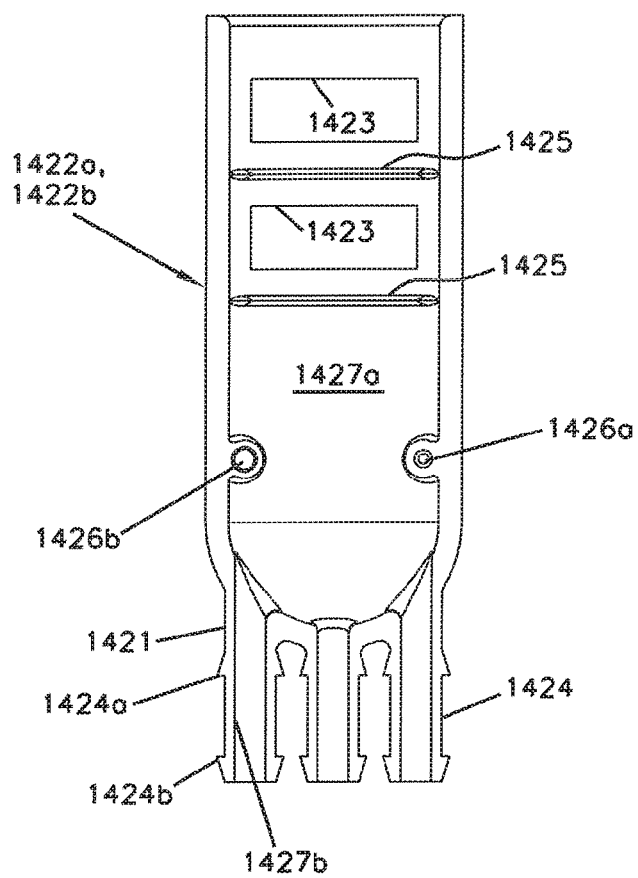
FIG. 16 is a side elevational view of a piece of the insert arrangement of the fourth cable breakout assembly of FIG. 13.
Figure 17:
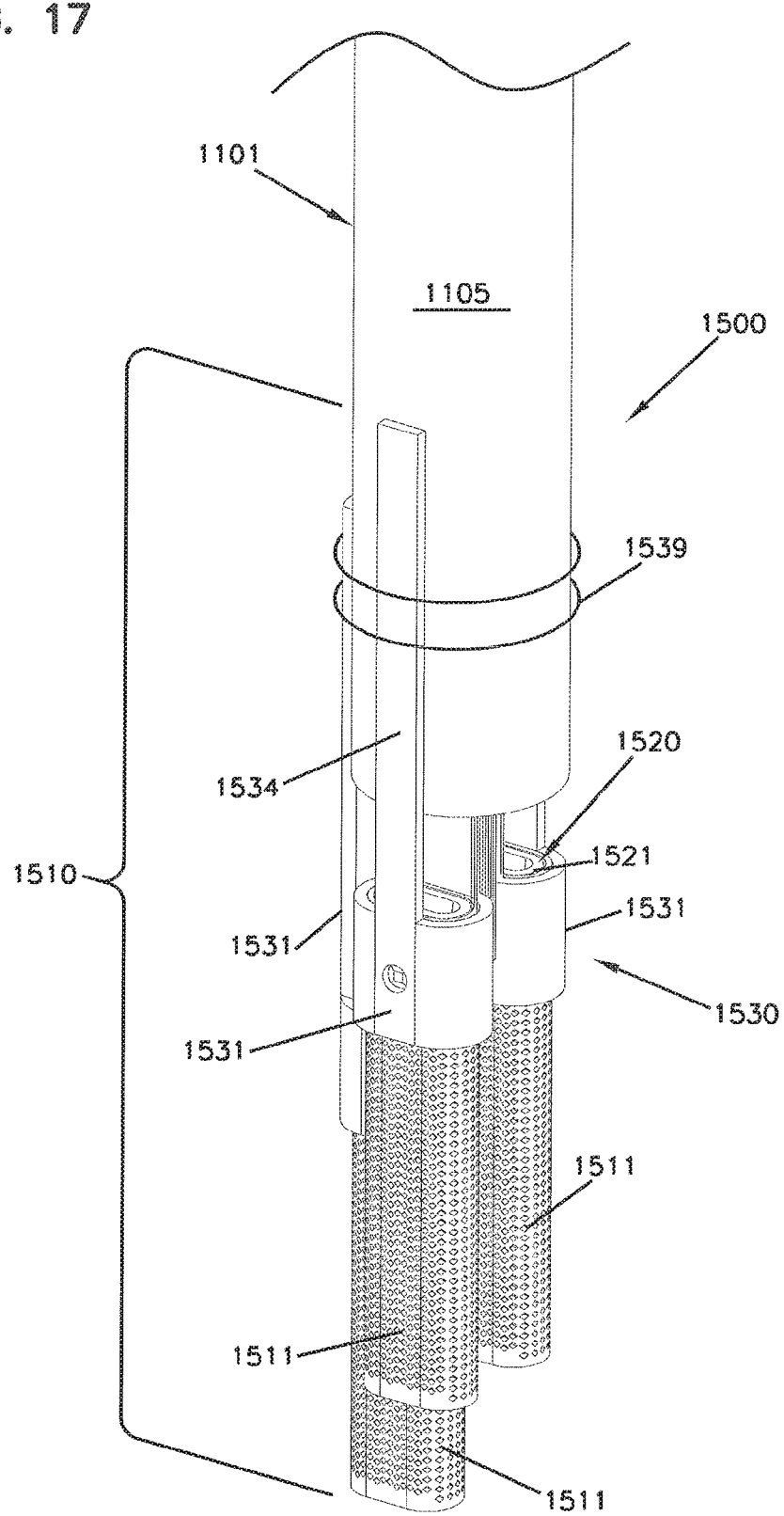
FIG. 17 is a perspective view of a fifth cable assembly including a fifth example cable breakout assembly mounted to a cable, the fifth cable breakout assembly including an insert arrangement, a fixation arrangement, and at least one sleeve.
Figure 18:
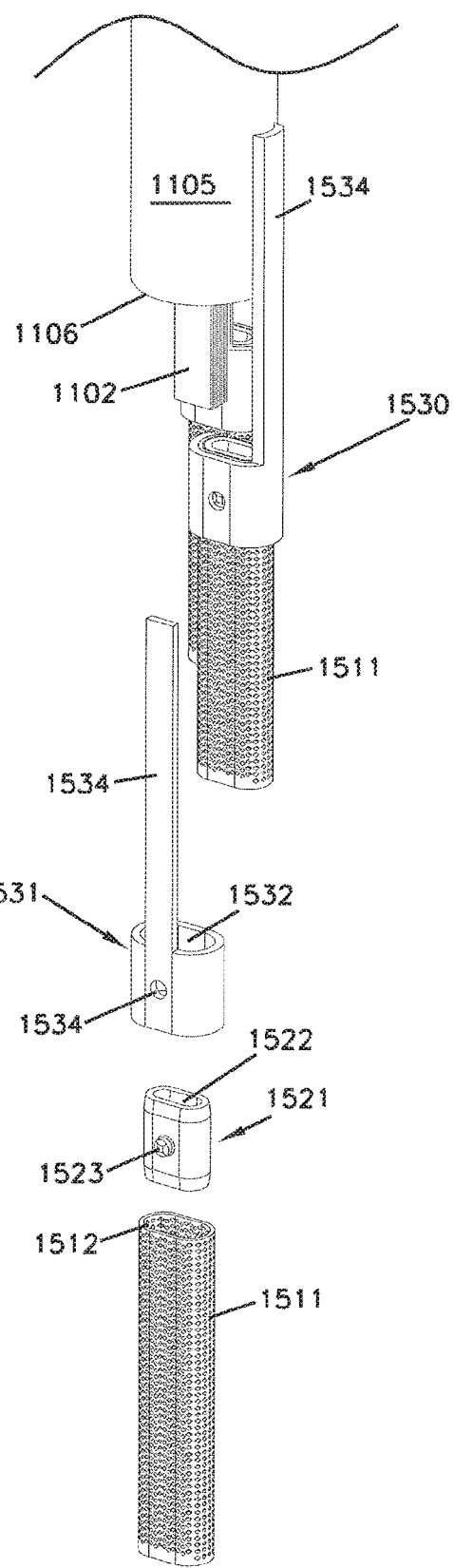
FIG. 18 is an exploded view of the fifth cable assembly of FIG. 17.
Figure 19:
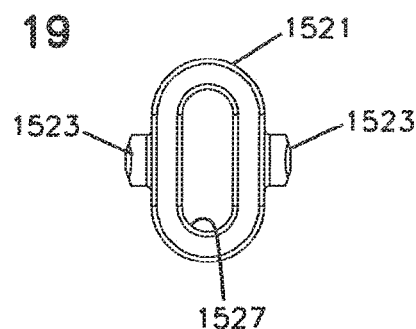
FIG. 19 is a top plan view of an example insert member of the insert arrangement of FIG. 17.

The present disclosure is directed to a routing system for managing and protecting optical fibers, copper wires, or other media segments of a cable. The routing system includes a conduit, such as a mesh sleeve, that surrounds at least one media segment. The routing system includes a cable breakout assembly that separates media segments of a cable into a plurality of groups of one or more media segments. Each group of the media segments is routed through a separate conduit. Accordingly, the groups of media segments can be routed to different locations. The conduits protect the media segments routed therein.

To separate out the optical fibers of a cable 1101, the cable jacket 1105 of the cable 1101 is terminated at an intermediate location along the cable 1101 to provide access to the media segments 1102. Referring to the figures in general, a cable breakout assembly 200, 802, 1110, 1210, 1310, 1410, 1510, 1610, 1710 secures to the cable 1101 at the terminated end 1106 of a cable jacket 1105. The cable breakout assembly 200, 802, 1110, 1210, 1310, 1410, 1510, 1610, 1710 includes one or more sleeves 1111, 1211, 1311, 1411, 1511, 1611, 1711, at least one insert arrangement 406, 606, 702, 1120, 1220, 1320, 1420, 1520, 1620, 1720, and at least one fixing arrangement 408, 608, 704, 1130, 1430, 1530, 1630, 1730 to hold the sleeve(s) 1111, 1211, 1311, 1411, 1511, 1611, 1711 to the at least one insert arrangement 406, 606, 702, 1120, 1220, 1320, 1420, 1520, 1620, 1720, respectively.

In some implementations, the media segments of the cable include ribbonized optical fibers (e.g., matrixed ribbon cable, rollable ribbon cable, etc.) before being separated into groups. In other implementations, the media segments of the cable include loose optical fibers.

In certain implementations, the sleeves 1111, 1211, 1311, 1411, 1511, 1611, 1711 include mesh sleeves. The mesh sleeves can be used in data centers to extend the life-cycle of the optical fiber ribbons or other media segments that run therethrough. For example, the mesh sleeves may help reduce abrasion, dirt and dust penetration, and other wear that may undesirably occur to the optical fiber ribbons. The mesh sleeves may also prevent excessive bending of the optical fibers. The sleeves can be a textile such as a braid, weave, or other configuration of fabric, nylon, polyethylene, or other material. In some examples, the sleeves may be heat resistant. The sleeves can also be referred to as a mesh conduit, a mesh tube, or like terms.

FIGS. 1-4 illustrate a first example implementation of a cable breakout assembly 1110. FIGS. 5-8 illustrate a second example implementation of a cable breakout assembly 1210. FIGS. 9-12 illustrate a third example implementation of a cable breakout assembly 1310. FIGS. 13-16 illustrate a fourth example implementation of a cable breakout assembly 1410. FIGS. 17-21 illustrate a fifth example implementation of a cable breakout assembly 1510. FIGS. 22-30 illustrate a sixth example implementation of a cable breakout assembly 1610. FIGS. 31-38 illustrate a seventh example implementation of a cable breakout assembly 1710. FIGS. 39-66 illustrate other implementations of a cable breakout assembly in which multiple insert arrangements and fixing arrangements cooperate to breakout fibers of a cable. Instead of securing the cable breakout assembly to the cable, however, the breakout assembly is secured to a bracket. Common features of the cable breakout assemblies 1110, 1210, 1310, 1410, 1510, 1610, 1710 are discussed together.

Each sleeve 1111, 1211, 1311, 1411, 1511, 1611, 1711 extends from a first end 1112, 1212, 1312, 1412, 1512, 1612, 1712 to a second end 1113, 1213, 1313, 1413, 1513, 1613, 1713 respectively. Each sleeve 1111, 1211, 1311, 1411, 1511, 1611, 1711 surrounds at least a portion of one or more of the media segment(s) 1102 disposed beyond the terminated end 1106 of the cable jacket 1105. The first end 1112, 1212, 1312, 1412, 1512, 1612, 1712 of each sleeve 1111, 1211, 1311, 1411, 1511, 1611, 1711 is disposed closer to the terminated end 1106 of the cable jacket 1105 than the second end 1113, 1213, 1313, 1413, 1513, 1613, 1713 of the sleeve 1111, 1211, 1311, 1411, 1511. In some examples, the ends of the sleeves 1111, 1211, 1311, 1411, 1511, 1611, 1711 are reinforced. In other examples, the ends of the sleeves 1111, 1211, 1311, 1411, 1511, 1611, 1711 are not reinforced.

In some examples, a sleeve 1111, 1211, 1311, 1411, 1511, 1611, 1711 includes a mesh (e.g., braided) tube. In other examples, a sleeve 1111, 1211, 1311, 1411, 1511, 1611, 1711 includes a solid tube. In some examples, each sleeve 1111, 1211, 1311, 1411, 1511, 1611, 1711 is manufactured to length. In other examples, each sleeve 1111, 1211, 1311, 1411, 1511, 1611, 1711 is cut to length during installation of the cable breakout 1110, 1210, 1310, 1410, 1510, 1610, 1710.

The insert arrangement 406, 606, 702, 1120, 1220, 1320, 1420, 1520, 1620, 1720 is at least partly disposed within the first end 1112, 1212, 1312, 1412, 1512, 1612, 1712 of the sleeve 1111, 1211, 1311, 1411, 1511, 1611, 1711, respectively. In some examples, the insert arrangement includes an insert unit having multiple insert members that extend into the sleeves as will be discussed herewith with reference to FIGS. 1-16 and 22-38. In other examples, the insert arrangement includes multiple, separate insert arrangements that are each disposed within a respective sleeve as will be discussed herein with reference to FIGS. 17-21 and 42-57.

A fixing arrangement 408, 608, 704, 1130, 1430, 1530, 1630, 1730 is disposed about the first ends 1112, 1212, 1312, 1412, 1512, 1612, 1712 of the sleeves 1111, 1211, 1311, 1411, 1511, 1611, 1711 to hold the sleeves 1111, 1211, 1311, 1411, 1511, 1611, 1711 to the insert arrangement 406, 606, 702, 1120, 1220, 1320, 1420, 1520, 1620, 1720, respectively. The fixing arrangement 408, 608, 704, 1130, 1430, 1530, 1630, 1730 is secured to the insert arrangement 406, 606, 702, 1120, 1220, 1320, 1420, 1520, 1620, 1720 so that the sleeves 1111, 1211, 1311, 1411, 1511, 1611, 1711 are sandwiched between the fixing arrangement 408, 608, 704, 1130, 1430, 1530, 1630, 1730 and the insert arrangement 406, 606, 702, 1120, 1220, 1320, 1420, 1520, 1620, 1720.

In some implementations, the insert arrangement 1120, 1220, 1320, 1420 secures to the cable jacket 1105 as will be discussed herein with reference to FIGS. 1-16. In other implementations, fixing arrangement 1530 secures to the cable jacket 1105 as will be discussed herein with reference to FIGS. 17-21. In still other implementations, a conduit 1650, 1750 secures the cable breakout assembly 1610, 1710 to the cable jacket 1105 as will be discussed herein with reference to FIGS. 22-38. In still other implementations, the insert arrangement 406 secures to a separate bracket to which the cable jacket 1105 is secured as will be discussed herein with reference to FIGS. 42-65.

The fixation arrangement 408, 608, 704, 1130, 1430, 1530, 1630, 1730 is configured to secure to the insert arrangement 406, 606, 702, 1120, 1220, 1320, 1420, 1520, 1620, 1720. In certain examples, the fixation arrangement 1130, 1430, 1530, 1630, 1730 is configured to releasably secure to the insert arrangement 1120, 1220, 1320, 1420, 1520. In certain implementations, the fixation arrangement 1130, 1430, 1530, 1630, 1730 and the insert arrangement 1120, 1220, 1320, 1420, 1520, 1620, 1720 form respective portions of a securement mechanism.

Referring now to FIGS. 1-4, a first cable breakout assembly 1110 is shown mounted to a cable 1101 to form a first cable assembly 1100. The insert arrangement 1120 of the first cable breakout assembly 1110 includes an anchor bracket 1122 that attaches to the cable jacket 1105. The media segments 1102 pass through the anchor bracket 1122. A portion of the anchor bracket 1122 extends over the terminated end 1106 of the cable jacket 1105.

In some implementations, the anchor bracket 1122 includes one or more legs 1123. In the example shown, the anchor bracket 1122 includes two oppositely facing legs 1123 extending in parallel. In other examples, the anchor bracket 1122 can have more or fewer legs 1123 (e.g., one leg, three legs, four legs, etc.). In some implementations, the legs 1123 are configured to flex relative to a remainder of the anchor bracket 1122. In other implementations, the legs 1123 are stiff relative to the remainder of the anchor bracket 1122.

A mounting member 1129 clamps or otherwise holds the legs 1123 to the cable jacket 1105. In some examples, the mounting member 1129 includes a length of tape. In an example, the tape may adhere to both the legs 1123 and the cable jacket 1105. In other examples, the mounting member 1129 includes a string, cable tie, Velcro-strap, zip-tie, or other winding structure.

One or more insert members 1121 extend away from the anchor bracket 1122. Each insert member 1121 defines a passage 1127 through which the respective media segment (s) 1102 pass to separate out the media segments 1102 into the respective groups. The first end 1112 of each sleeve 1111 couples over a respective one of the insert members 1121 so that the media segment(s) 1102 routed through an insert member 1121 also pass into the respective sleeve 1111. The fixing arrangement 1130 holds the sleeves 1111 to the insert members 1121.

In some implementations, the fixing arrangement 1130 includes a fixation member 1131 for each insert 1121 of the insert arrangement 1120. In certain implementations, the fixation members 1131 form an integral (e.g., monolithic) unit. Accordingly, all of the fixation members 1131 are attached to the insert arrangement 1120 as a unit.

In some implementations, the fixation arrangement 1130 includes two arms 1132 that each define a window 1133. The insert arrangement 1120 includes stop members 1124 that align with the windows 1133 when the fixation arrangement 1130 is mounted to the insert arrangement 1120. In certain examples, the stop members 1124 include a ramped surface and a shoulder. The arms 1132 of the fixation arrangement 1130 cam over the ramped surfaces of the stop members 1124 and snap over the shoulders so that the stop members 1124 protrude through the windows 1133.

In certain implementations, each insert member 1121 of the insert arrangement 1120 includes grip members 1125 that enhance a hold on the sleeve 1111 when the sleeve 1111 is mounted to the insert member 1121. In certain examples, the fixation members 1131 push the sleeves 1111 against the grip members 1125. In the example shown, the grip members 1125 include teeth protruding from an external surface of the insert members 1121.

To assembly the first cable breakout assembly 1110, the anchor bracket 1122 is slid over the cable 1101 so that a portion of the anchor bracket 1122 extends over the terminated end 1106 of the cable jacket 1105. The media segments 1102 are separated into groups. Each group of media segments 1102 is routed into the passage 1127 of one of the insert members 1121. A mounting member 1129 is wrapped or otherwise positioned around the legs 1123 of the insert member 1120 and the cable jacket 1105 to hold the anchor bracket 1122 in place.

Each sleeve 1111 is routed over one of the media segment groups until the first end 1112 of the sleeve 1111 reaches the respective insert member 1121. The first end 1112 of each sleeve 1111 is pushed over the respective insert member 1121. The fixation arrangement 1130 is routed over the sleeves 1111 towards the anchor bracket 1122. The fixation arrangement 1130 is pushed towards the anchor bracket 1122 until the stop members 1124 snap into the windows 1133 on the arms 1132.

Pushing the fixation arrangement 1130 over the insert members 1121 causes the fixation members 1131 to slide over respective insert members 1121, thereby capturing the respective sleeve 1111 between the insert member 1121 and the fixation member 1131. The second end 1113 of the sleeve 1111 and the corresponding group of media segments 1102 can then be routed to any desired location.

Referring now to FIGS. 5-8, a second cable breakout assembly 1210 is shown mounted to a cable 1101 to form a second cable assembly 1200. The insert arrangement 1220 of the second cable breakout assembly 1110 includes an anchor bracket 1222 that attaches to the cable jacket 1105. The media segments 1102 pass through the anchor bracket 1222. A portion of the anchor bracket 1222 extends over the terminated end 1106 of the cable jacket 1105.

In some implementations, the anchor bracket 1222 includes one or more legs 1223. In the example shown, the anchor bracket 1222 includes three legs 1223. In other examples, the anchor bracket 1222 can have more or fewer legs 1223 (e.g., one leg, two legs, four legs, etc.). In certain implementations, the legs 1223 are flexible relative to a remainder of the anchor bracket 1222.

A mounting member 1228 clamps or otherwise holds the legs 1223 to the cable jacket 1105. In some examples, the mounting member 1229 includes an annular ring disposed over the cable jacket 1105. To mount the anchor bracket 1222 to the cable jacket 1105, the annular ring 1228 is slid over the distal ends of the legs 1223, thereby clamping the legs 1223 towards the cable jacket 1105. In certain implementations, the annular ring defines an inner ledge 1229. In an example, the inner ledge 1229 abuts the distal ends of the legs 1223.

One or more insert members 1221 extend away from the anchor bracket 1222. Each insert member 1221 defines a passage 1227 through which the respective media segment(s) 1102 pass to separate out the media segments 1102 into the respective groups. The first end 1212 of each sleeve 1211 couples over a respective one of the insert members 1221 so that the media segment(s) 1102 routed through an insert member 1221 also pass into the respective sleeve 1211.

In certain implementations, the insert members 1221 are the same as the insert members 1121 of the first cable breakout assembly 1110. For example, the insert members 1221 can have grip members 1225. In certain implementations, stop members 1224 of the insert arrangement 1220 and the fixation arrangement can be the same as the stop members 1124 and the fixation arrangement 1130 of the first cable breakout assembly 1110. In other implementations, however, a different fixation arrangement and stop members can be utilized.

Referring now to FIGS. 9-12, a third cable breakout assembly 1310 is shown mounted to a cable 1101 to form a third cable assembly 1300. The insert arrangement 1320 of the third cable breakout assembly 1310 includes an anchor bracket 1322 that attaches to the cable jacket 1105. The media segments 1102 pass through the anchor bracket 1322. A portion of the anchor bracket 1322 extends over the terminated end 1106 of the cable jacket 1105.

In some implementations, the anchor bracket 1322 includes a body defining a cavity 1327a accessible through an open end of the anchor bracket 1322. Multiple insert members 1321 extend from an otherwise closed end of the anchor bracket 1322. Each insert member 1321 defines a corresponding passage 1327b in communication with the cavity 1327a. The body of the anchor bracket 1322 also defines an inner ledge 1326. In an example, the body is generally cylindrical at the open end and at the inner ledge 1326.

A mounting member 1328 is disposed about the cable jacket 105 and includes an external ridge 1329. In the example shown, the mounting member 1328 is a C-shaped piece that snaps over the cable 1101. In other examples, the mounting member 1328 can fully encircle the cable 1101. For example, the mounting member 1328 can be a tube axially slid over the cable jacket 1105 or a flexible member wrapped around the cable jacket 1105.

The mounting member 1328 is positioned on the cable jacket 1105 at a desired longitudinal position along the cable 1101. The anchor bracket 1322 is slid over the mounting member 1328 until the internal ledge 1326 abuts the external ridge 1329. The engagement between the ledge 1326 and the ridge 1329 holds the anchor bracket 1322 in position on the cable 1101.

Each insert member 1321 defines a passage 1327 through which the respective media segment(s) 1102 pass to separate out the media segments 1102 into the respective groups. The first end 1312 of each sleeve 1311 couples over a respective one of the insert members 1321 so that the media segment(s) 1102 routed through an insert member 1321 also pass into the respective sleeve 1311.

In certain implementations, the insert members 1321 are the same as the insert members 1121 of the first cable breakout assembly 1110. For example, the insert members 1321 can have grip members 1325 similar to grip members 1125 of FIG. 2. In certain implementations, stop members 1324 of the insert arrangement 1320 and the fixation arrangement can be the same as the stop members 1124 and the fixation arrangement 1130 of the first cable breakout assembly 1110. In other implementations, however, a different fixation arrangement and stop members can be utilized.

Referring now to FIGS. 13-16, a fourth cable breakout assembly 1410 is shown mounted to a cable 1101 to form a fourth cable assembly 1400. The insert arrangement 1420 of the fourth cable breakout assembly 1410 includes an anchor bracket 1422 that attaches to the cable jacket 1105. The media segments 1102 pass through the anchor bracket 1422. A portion of the anchor bracket 1422 extends over the terminated end 1106 of the cable jacket 1105. In certain implementations, the anchor body 1422 can define internal ridges 1425 that enhance grip between the anchor body 1422 and the cable jacket 1105 of the cable 1101.

In some implementations, the anchor bracket 1422 includes a body defining a cavity 1427a accessible through an open end of the anchor bracket 1422. Multiple insert members 1421 extend from an otherwise closed end of the anchor bracket 1422. Each insert member 1421 defines a corresponding passage 1427b in communication with the cavity 1427a. The body of the anchor bracket 1422 also defines windows or slots 1423 at which a mounting member 1429 can secure the anchor bracket 1422 to the cable 1101. In the example shown, zip-ties 1429 are wrapped around the cable 1101 and extend through the windows 1423. In other examples, other types of mounting members (cable ties, Velcro-straps, tape, etc.) can be wrapped around the cable and through the windows 1423.

In certain implementations, the anchor bracket body 1422 can be formed in two pieces 1422a, 1422b. In certain examples, the two pieces 1422a, 1422b can be latched, snap-fit, or otherwise coupled together to form the anchor bracket body 1422. In certain examples, the two pieces 1422a, 1422b are identical.

In certain examples, the two pieces 1422a, 1422b cooperate to define an alignment mechanism by which the two pieces 1422a, 1422b are aligned with each other. For example, each piece 1422a, 1422b can include a peg 1426a and a hole 1426b. Each peg 1426a is sized to fit within the hole 1426b of the other piece 1422b, 1422a. In other examples, one piece 1422a, 1422b can include only pegs 1426a and the other piece 1422b, 1422a can include only holes 1426b.

Each insert member 1421 defines a passage 1427*b* through which the respective media segment(s) 1102 pass to separate out the media segments 1102 into the respective groups. The first end 1412 of each sleeve 1411 couples over a respective one of the insert members 1421 so that the media segment(s) 1102 routed through an insert member 1421 also pass into the respective sleeve 1411. In certain implementations, the two pieces 1422*a*, 1422*b* cooperate to define each of the insert members 1421 and the corresponding passages 1427*b*.

In certain implementations, each insert member 1421 defines a fixation member receiving region 1424 at which a fixation member 1431 can be disposed over the sleeve 1411. In certain examples, the fixation member receiving region 1424 is bounded by opposing shoulders 1424*a*, 1424*b* spaced apart along a length of the insert member 1421. In some examples, the shoulders 1424*a*, 1424*b* are defined by teeth protruding from an exterior surface of the insert member 1421. In other examples, the shoulders 1424*a*, 1424*b* are defined by a recessed channel defined in the exterior surface of the insert member 1421.

In certain implementations, the fixation arrangement 1430 includes individual fixation members 1431 that separately attach to a corresponding one of the insert members 1421. For example, each fixation member 1431 can be a separate zip-tie, length of string, length of tape, resilient collar, or other such structure sized to fit at the fixation member receiving region 1424. In some examples, the shoulders 1424*a*, 1424*b* inhibit movement of the fixation member 1431 along the insert member 1421. In other examples, the shoulders 1424*a*, 1424*b* provide sufficient contouring of the sleeve 1411 mounted over the insert member 1421 to provide an indication to the user of where to attach the fixation member 1431.

To assembly the fourth cable breakout assembly 1410, first and second pieces 1422*a* of the anchor bracket 1422 are positioned at a desired location over the terminated end 1106 of the cable jacket 1105. The groups of media segments 1102 are routed through the passages 1427 defined between the two pieces 1422*a*, 1422*b*. The pieces 1422*a*, 1422*b* are secured together using a mounting member 1429. For example, a zip-tie can be wrapped around the cable jacket 1105 and through the windows 1423 of one or both pieces 1422*a*, 1422*b*.

Assembling the first and second pieces 1422*a*, 1422*b* of the anchor bracket 1422 forms the insert members 1421 around the groups of media segments 1102. Each sleeve 1411 is slid over the respective group until the first end 1412 slides over the respective insert member 1421. A fixation member 1431 is placed over the first end of the sleeve 1412 in alignment with the fixation member receiving region 1424 to hold the sleeve 1411 to the insert member 1421. In an example, a zip-tie 1431 is wrapped around the first end 1412 of the sleeve 1411 between the shoulders 1424*a*, 1424*b*. In another example, an elastic band 1431 is slid over the first end 1412 of the sleeve 1411 between the opposing shoulders 1424*a*, 1424*b*.

Referring now to FIGS. 17-21, a fifth cable breakout assembly 1510 is shown mounted to a cable 1101 to form a fifth cable assembly 1500. The fixation arrangement 1530 of the fifth cable breakout assembly 1510 attaches to the cable 1101. The fixation arrangement 1530 holds the insert arrangement 1520 of the fifth cable breakout assembly 1510 to the cable 1101.

In some implementations, the fixation arrangement includes a plurality of separate fixation members 1531 and the insert arrangement 1520 includes a plurality of separate insert members 1521. Each fixation member 1531 cooperates with a corresponding one of the insert members 1521 to hold one of the sleeves 1511 over a corresponding group of media segments 1102.

Each insert member 1521 defines a passage 1527. Each insert member 1521 is mounted over a respective group of media segments 1102 so that the media segments 1102 extend through the passage 1527. At least a portion of each insert member 1521 extends into the first end 1512 of a respective one of the sleeves 1511. In the example shown, each insert member 1521 fully fits within the first end 1512 of the sleeve 1511.

Each fixation member 1531 attaches to a corresponding one of the insert members 1521 to hold the sleeve 1511 between the insert member 1521 and the fixation member 1531. Each fixation member 1531 defines a through-passage 1532 sized to receive the respective insert member 1521. The first end 1512 of the sleeve 1511 also fits within the through-passage 1532 and is sandwiched between the insert member 1521 and the fixation member 1531.

In certain implementations, the insert members 1521 and the corresponding fixation members 1531 cooperate to define a securement mechanism. In some implementations, one of the insert members 1521 and the fixation members 1531 includes one or more pegs 1523 and the other of the insert members 1521 and the corresponding fixation members 1531 define one or more apertures 1533 sized to receive the pegs 1523. The member defining the aperture(s) 1533 may be sufficiently resilient/deformable to flex over the pegs 1523 to enable the fixation members 1531 to snap-fit over the insert members 1521.

In the example shown, the insert members 1521 include pegs 1523 at opposite sides of the insert members 1521. The fixation members 1531 define apertures 1533 at opposite sides of the fixation members 1531. The first end 1512 of the sleeve 1511 is caught between the peg 1523 and the aperture 1533. The first end 1512 of the sleeve 1511 may be pushed outwardly through the aperture 1533 by the peg 1523.

In certain implementations, each fixation member 1531 includes a leg 1534 that extends beyond the terminated end 1106 of the cable jacket 1105 so that at least a portion of each leg 1534 extends along a portion of the cable jacket 1105. A mounting member 1529 holds the legs 1534 of the fixation members 1531 to the cable jacket 1105. In some examples, the mounting member 1539 includes a wrap, such as tape, string, cable ties, or zip ties. In other examples, the mounting member 1539 can include a resilient ring or other clamping structure.

Figure 20:
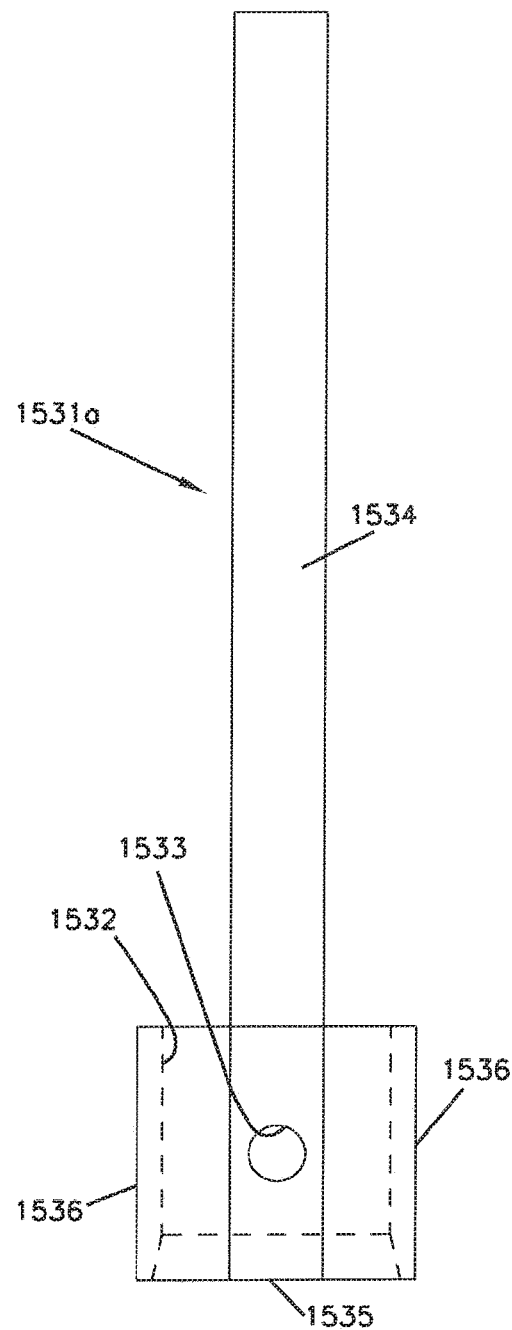
FIG. 20 is a side elevational view of a first example fixation member of the fifth cable breakout assembly of FIG. 17 with internal details shown in dashed lines.
Figure 21:
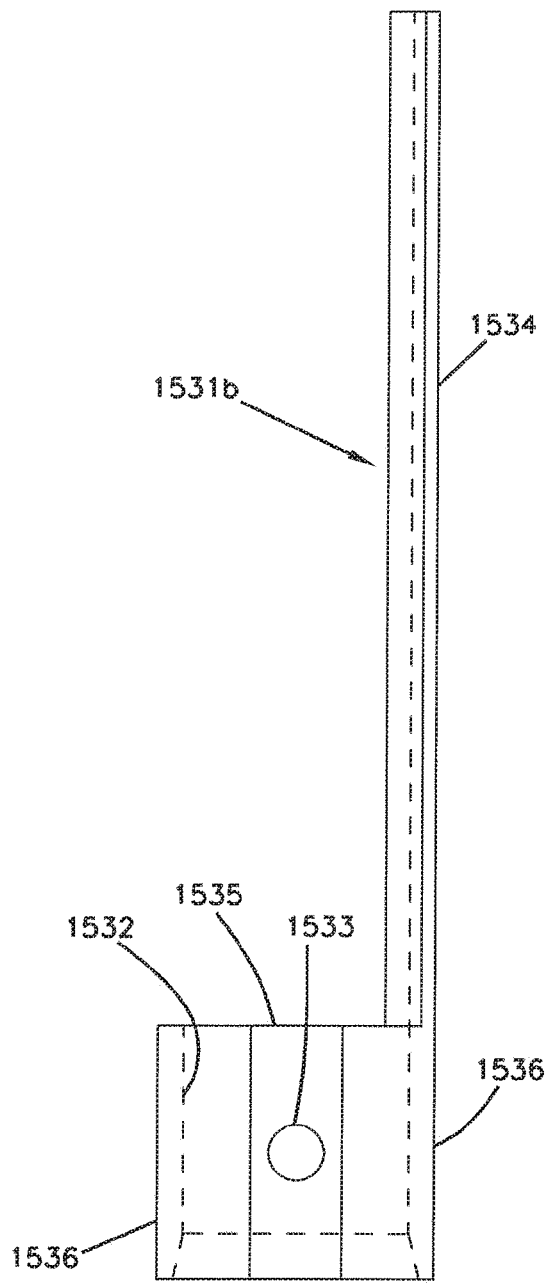
FIG. 21 is a side elevational view of a second example fixation member of the fifth cable breakout assembly of FIG. 17 with internal details shown in dashed lines.
Figure 22:
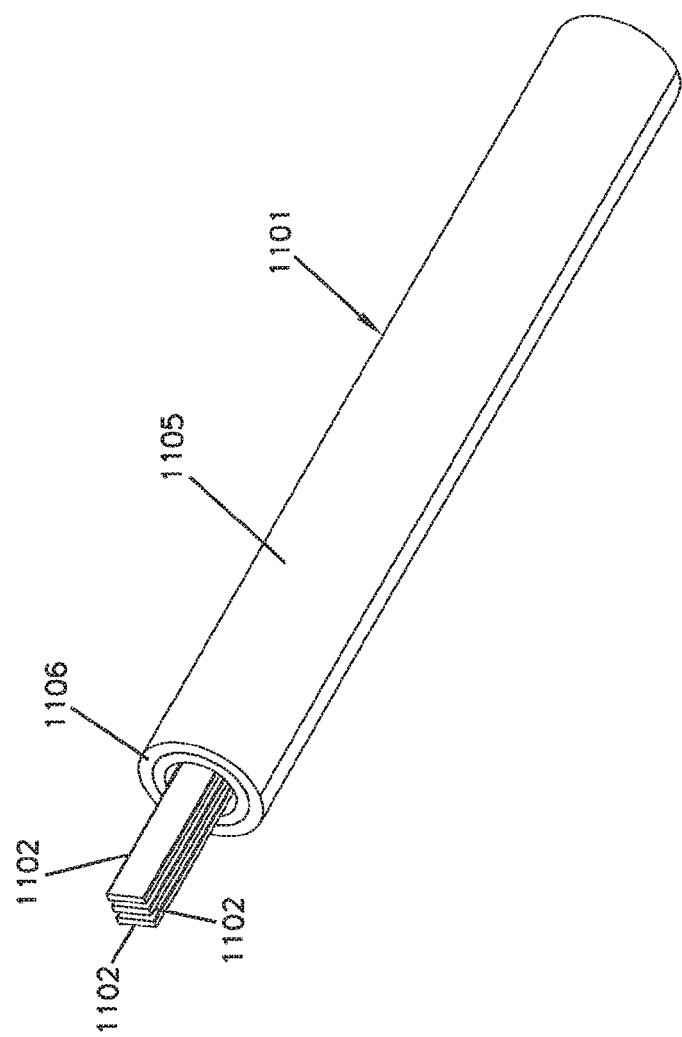
FIG. 22 is a perspective view of an example cable having a plurality of media segments extending beyond a terminated end of a cable jacket.

As shown in FIGS. 20 and 21, the fixation arrangement 1530 can include more than one configuration of fixation member 1531. Using different configurations of fixation members 1531 within the same fixation arrangement 1530 may enable the fixation members to fit together more compactly. Using different configurations of fixation members 1531 within the same fixation arrangement 1530 may enable each of the fixation members 1531 to attach to the cable 1101 while reducing the deflection/bending of the media segments 1102 routed therethrough.

FIG. 20 illustrates a first implementation of a fixation member 1531*a* and FIG. 21 illustrates a second implementation of a fixation member 1531*b*. Both fixation members 1531*a*, 1531*b* define oblong passageways 1532 bounded by longer walls 1535 and shorter walls 1536. In certain examples, the apertures 1533 are defined along the longer walls 1535. The leg 1534 of the first fixation member 1531*a* extends from one of the longer walls 1535. The leg 1534 of the second fixation member 1531*b* extends from one of the shorter walls 1536.

One process for assembling the fifth cable breakout assembly 1510 includes mounting the insert members 1521 and sleeves 1511 over the groups of media segments 1102. The first ends 1512 of the sleeves 1511 are positioned over the insert members 1521. The fixation members 1531 are slid over the sleeves 1511 until the fixation members 1531 are positioned over the insert members 1521. In certain examples, the fixation members 1531 snap over the insert members 1521. The mounting member 1539 is secured about the legs 1534 to hold the fixation members 1531 to the cable 1101.

Another process for assembling the fifth cable breakout assembly 1510 includes assembling separate sleeve arrangements and then sliding each sleeve arrangement over a corresponding group of media segments 1102. Each sleeve arrangement includes a sleeve 1511 having a first end 1512 clamped between an insert member 1521 and a fixation member 1531. Each sleeve arrangement is slid along the respective media segment group until the leg 1534 aligns with a desired location along the cable jacket 1105. The mounting member 1539 then secures the legs 1534 to the cable 1101.

FIGS. 22-38 illustrates cable breakout assemblies 1610, 1710 that include an insert arrangement 1620, 1720 and a fixation arrangement 1630, 1730 that couple together to sandwich the sleeves 1611, 1711 therebetween to hold the sleeves 1611, 1711 to the breakout assembly 1610, 1710. In certain implementations, the fixation arrangement 1630, 1730 slides laterally relative to the insert arrangement 1620, 1720 to couple to the insert arrangement 1620, 1720. For example, the fixation arrangement 1630, 1730 may define an interior accessible through an open side so that the insert arrangement 1620, 1720 can be inserted into the fixation arrangement 1630, 1730 by passing the insert arrangement 1620, 1720 laterally through the open side of the fixation arrangement 1630, 1730.

In certain implementations, the insert arrangement 1620, 1720 and the fixation arrangement 1630, 1730 cooperate to define a securement mechanism that holds the insert arrangement 1620, 1720 and the fixation arrangement 1630, 1730 together. For example, one of the insert arrangement 1620, 1720 and the fixation arrangement 1630, 1730 may define latches or other such structures; the other of the insert arrangement 1620, 1720 and the fixation arrangement 1630, 1730 may define holes into which the latches or other such structures may be received.

Each breakout assembly 1610, 1710 also couples to one end of a conduit 1650, 1750. The opposite end of the conduit 1650 couples to the cable 1101 (e.g., to the cable jacket 1105). Accordingly, the breakout assembly 1610, 1710 is spaced from the terminated end 1106 of the cable jacket 1105. The conduit 1650, 1750 protects the media segments 1102 as the media segments 1102 extend from the terminated end 1106 of the cable jacket 1105 to the breakout assembly 1610, 1710. The sleeves 1611, 1711 protect the media segments 1102 as the media segments 1102 extend away from the breakout assembly 1610, 1710. In certain implementations, the conduit 1650, 1750 is formed from the same material as the sleeves 1611, 1711, respectively.

Figure 23:
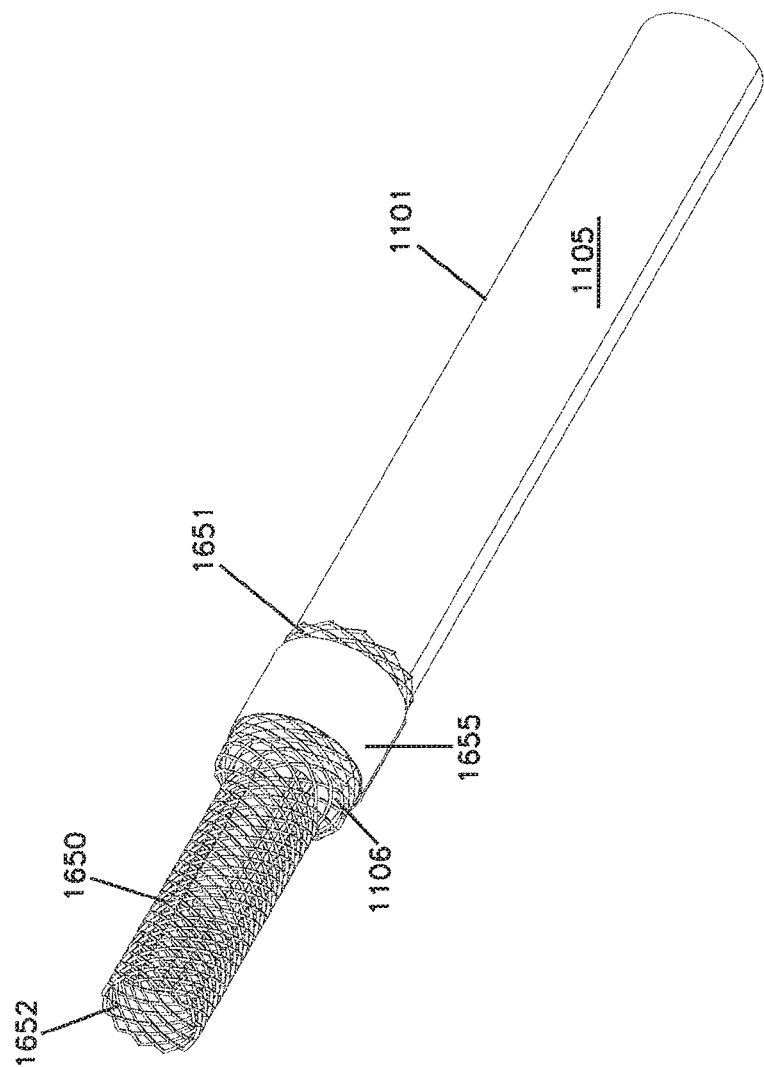
FIG. 23 is a perspective view of an example conduit having one end mounted over the terminated end of the cable jacket.
Figure 31:
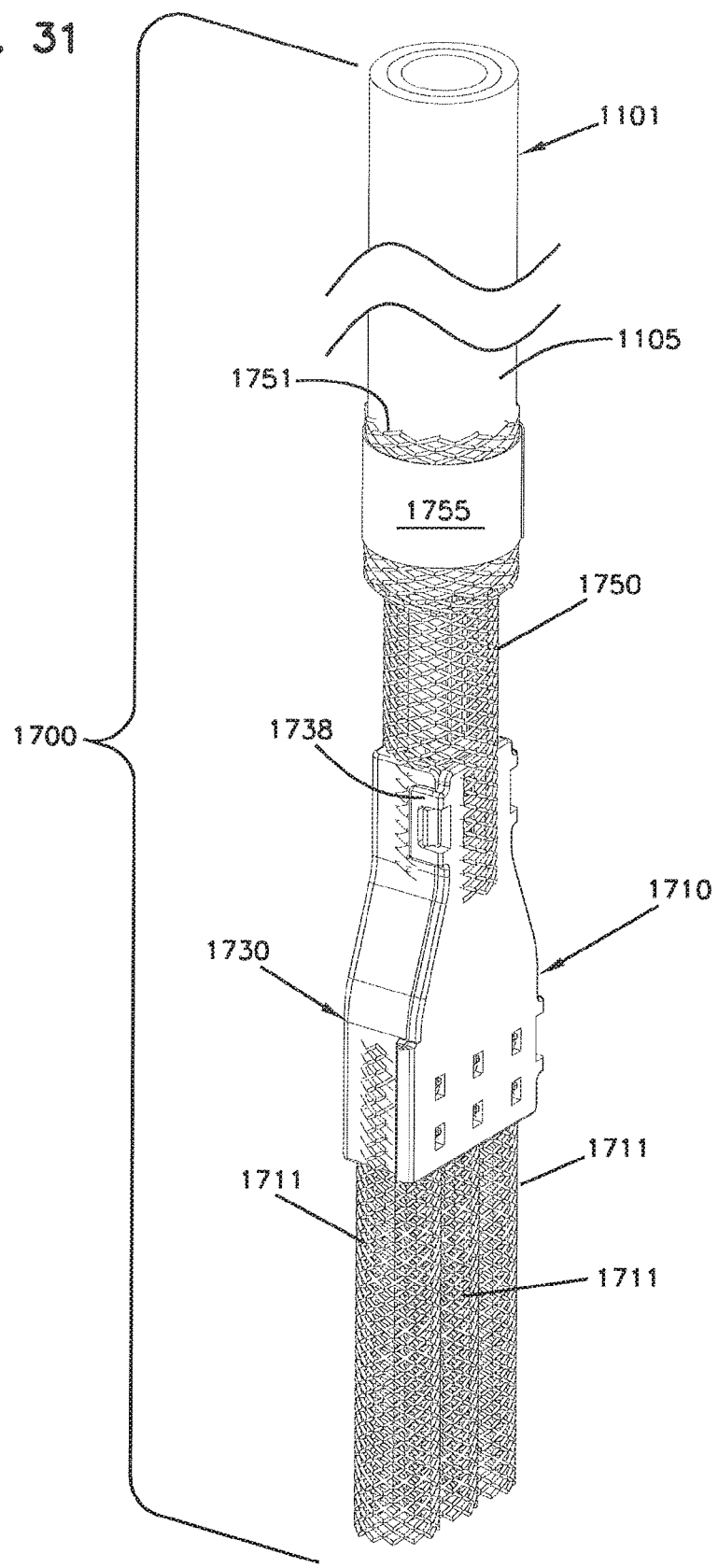
FIG. 31 is a perspective view of an example seventh cable assembly including a seventh cable breakout assembly.

A first end 1651, 1751 of the conduit 1650, 1750 is mounted over the terminated end 1106 of the cable jacket 1105 so that the media segments 1102 extend into the conduit 1650, 1750 (see FIGS. 23 and 31). The first end 1651, 1751 is secured to the cable 1101 (e.g., using tape 1655, 1755, one or more cable ties, etc.). In certain implementations, the conduit 1650, 1750 is formed of the same material as the sleeves 1611, 1711, respectively. In other implementations, the conduit 1650, 1750 is formed of any flexible material capable of protecting the optical fibers from snagging. In the example shown, the conduit 1650, 1750 is radially flexible so that a diameter of the first end covering the terminated end 1106 of the cable jacket 1105 is larger than a diameter of an intermediate portion that covers only the media segments 1102.

Figure 24:
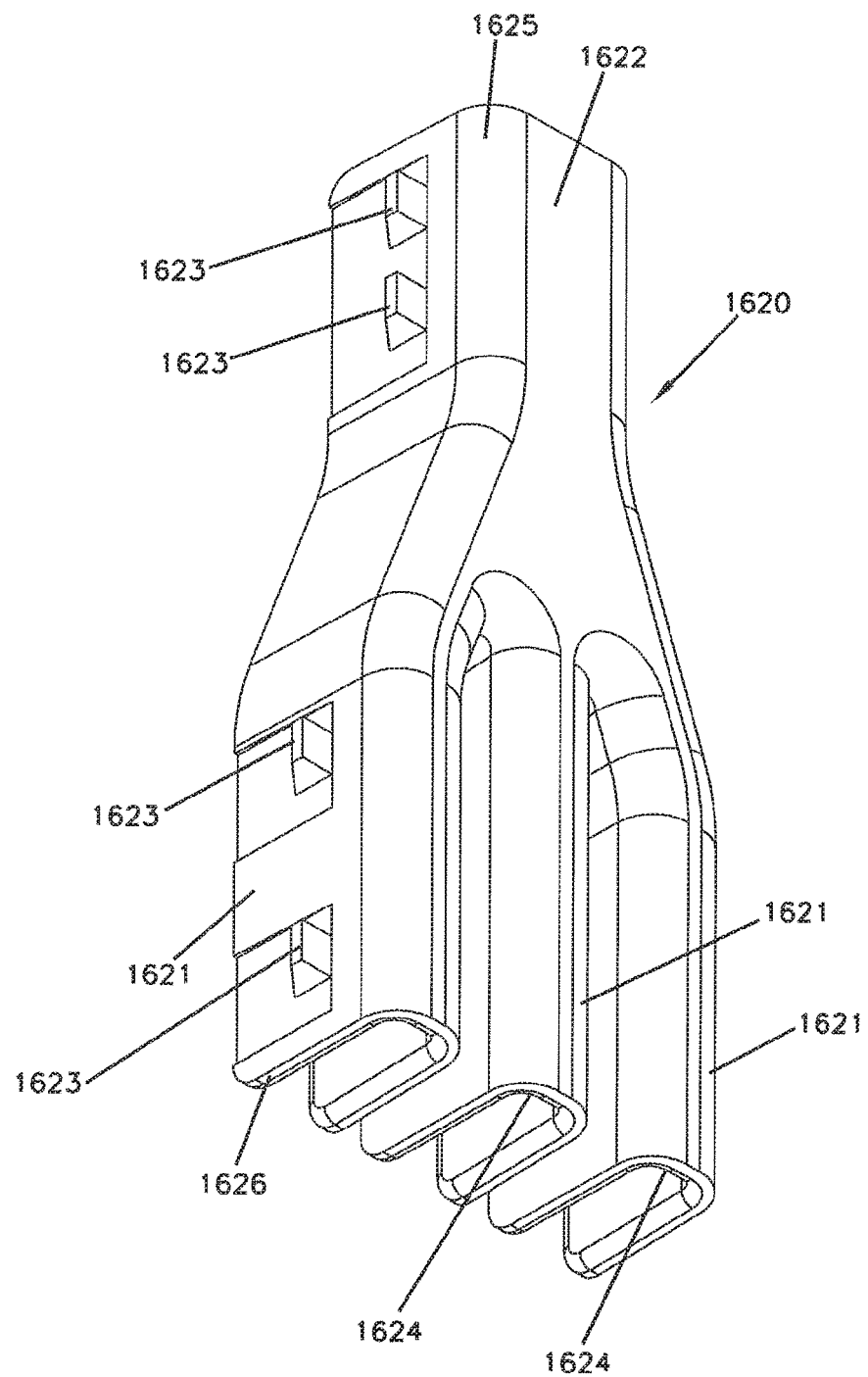
FIGS. 24 and 25 are perspective views of an example insert arrangement of a sixth cable breakout assembly.
Figure 25:
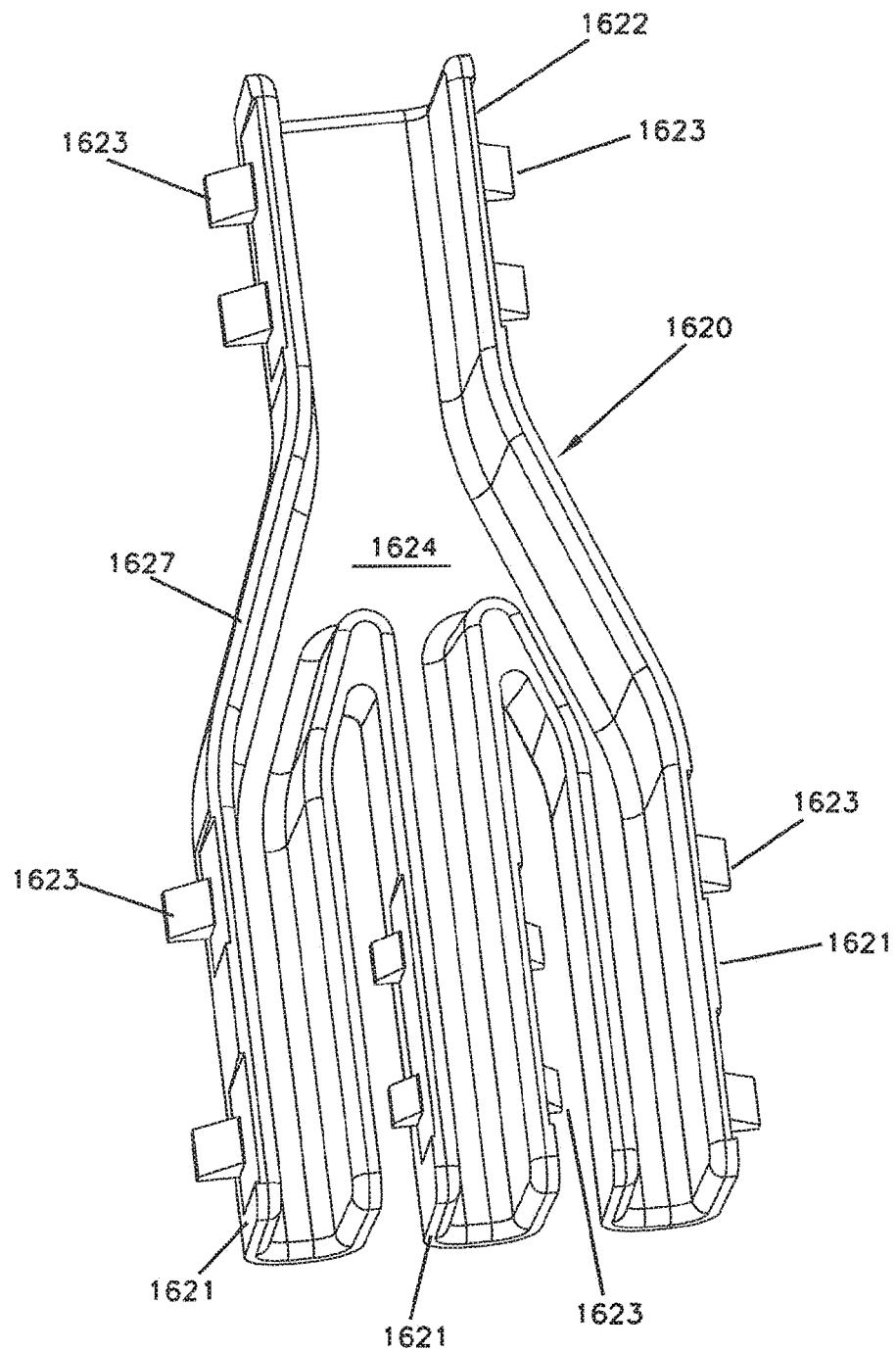

FIGS. 22-30 illustrates the sixth cable breakout assembly 1610 mounted to a cable 1101 to form a sixth cable assembly 1600. FIGS. 24-25 illustrate an example insert arrangement 1620 extending from an input end 1625 to an output end 1626. The insert arrangement 1620 defines a channel 1624 having an input at the input end 1625 and having a plurality of outputs at the output end 1626. The input of the channel 1624 is defined by a first housing part 1622. The outputs of the channel 1624 are defined by respective insert members 1621 that separately extend outwardly from the first housing part 1622. In certain implementations, the insert arrangement 1620 defines an open side 1627 providing access to an interior of the channel 1624 (see FIG. 25). In certain examples, the insert members 1621 are disposed in a row.

In certain examples, one or more latches 1623 extend outwardly from the insert arrangement 1620. In examples, the latches 1623 are disposed at opposite sides of the first housing part 1622. In examples, the latches 1623 are disposed at opposite sides of at least one of the insert members 1621. In the example shown, the latches 1623 are disposed at opposite sides of a middle insert member 1621. In examples, the latches 1623 are disposed at only one side of some insert members 1621. In the example shown, the latches 1623 are disposed at only the outer sides of the outer insert members 1621.

Figure 26:
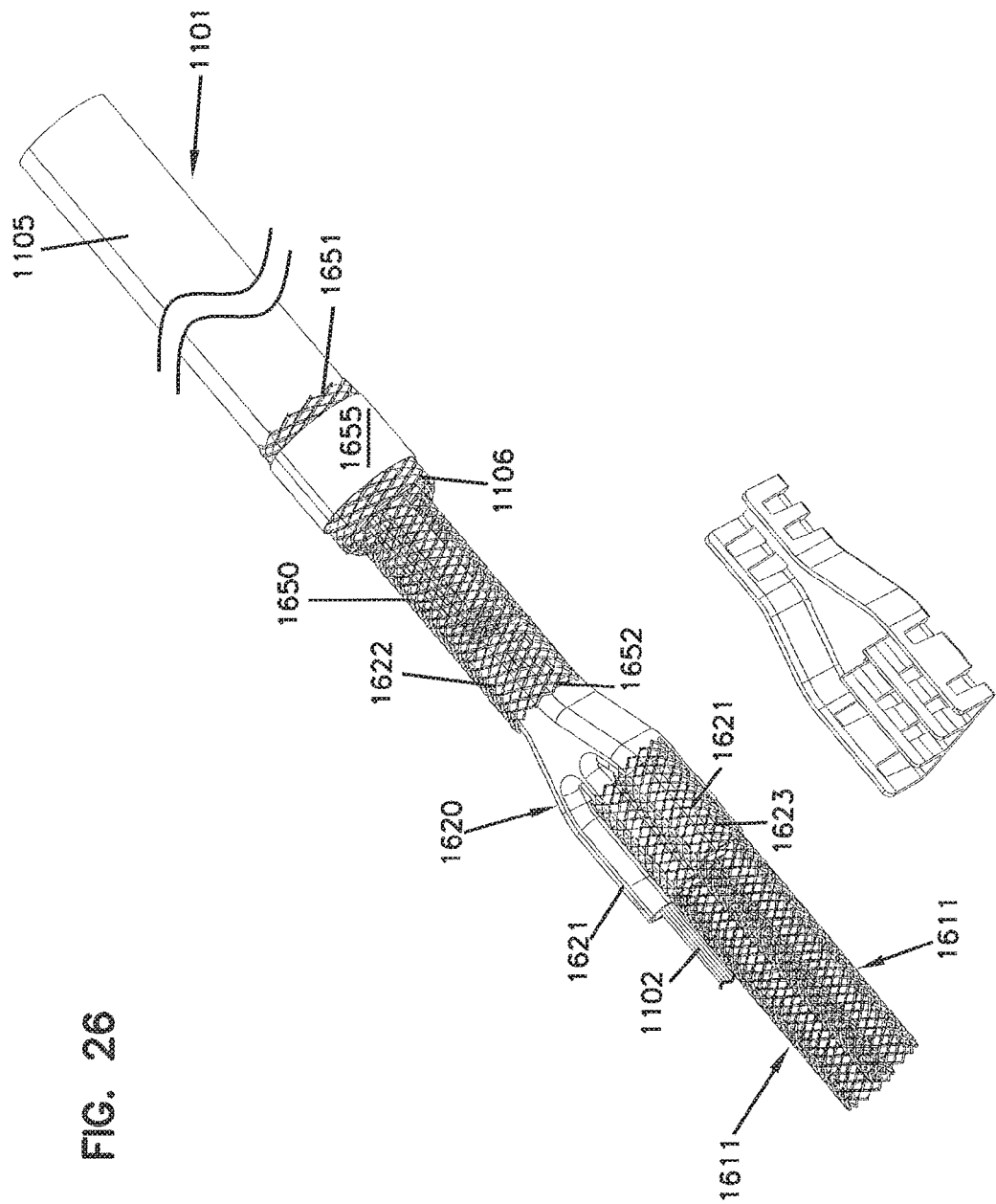
FIG. 26 is a perspective view of a sixth cable assembly including the sixth cable breakout assembly with the fixation arrangement exploded away from the insert arrangement.

As shown in FIG. 26, the first housing part 1622 of the insert arrangement 1620 slides into the second end 1652 of the conduit 1650 so that the media segments 1102 extend into the input of the channel 1624. Within the insert arrangement 1620, the media segments 1102 are separated into the three insert members 1621 so that one or more media segments 1102 are routed through each insert member 1621 and out each channel output.

Each of the sleeves 1611 is mounted to one of the insert members 1621. The one or more media segments 1102 routed through each insert member 1621 continue to extend through the respective sleeve 1611. In certain implementations, the sleeves 1611 are mesh sleeves. The latches 1623 extend through holes in the mesh to aid in retaining the sleeves 1611.

Figure 27:
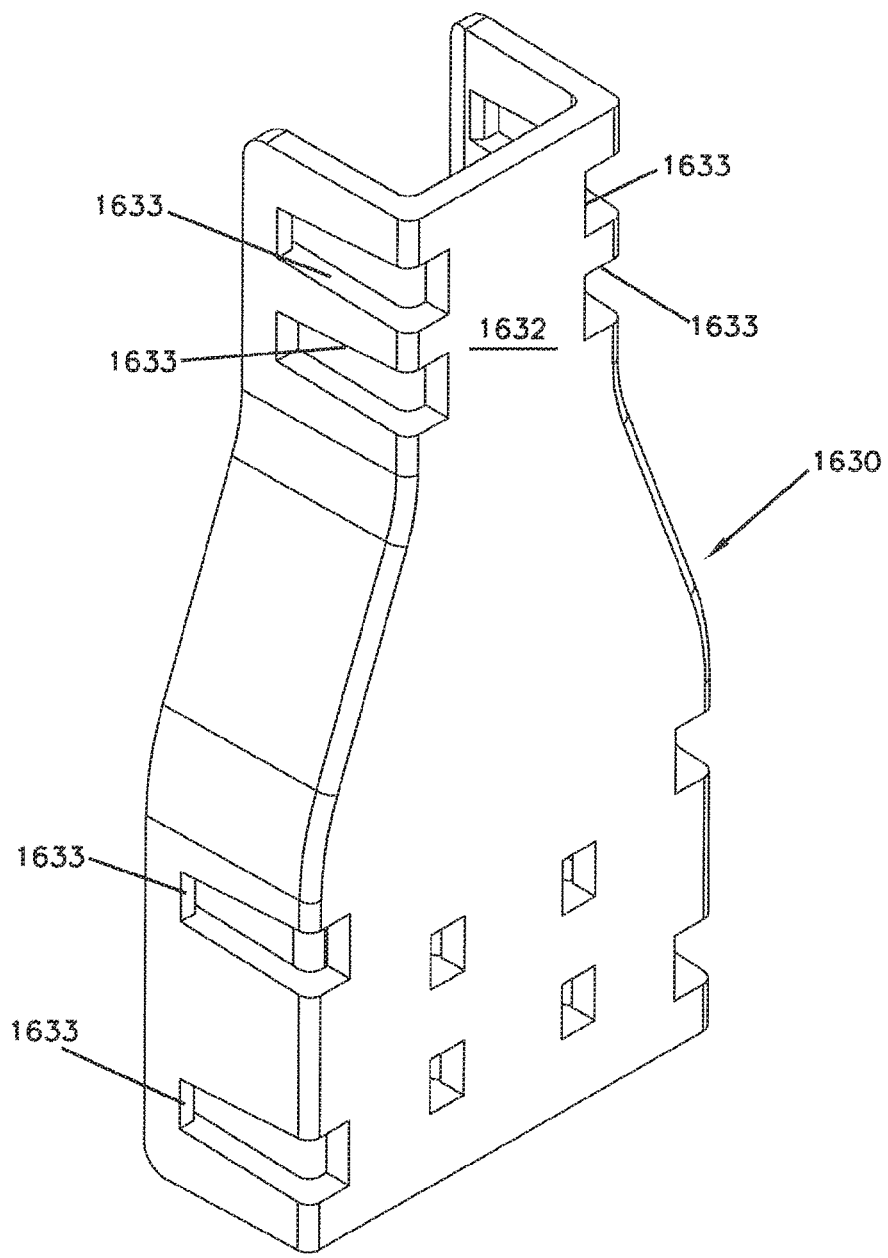
FIGS. 27 and 28 are perspective views of an example fixation arrangement of the sixth cable breakout assembly.
Figure 28:
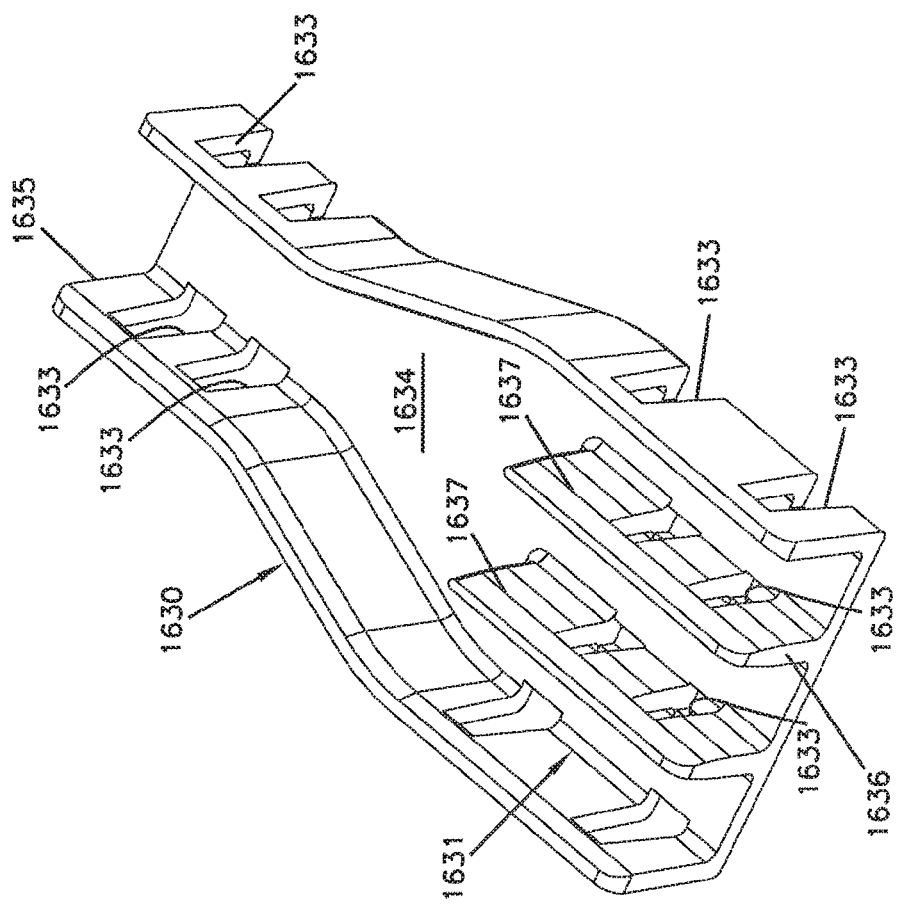

FIGS. 27-28 illustrate an example fixation arrangement 1630 extending from a first end 1635 to a second end 1636. The fixation arrangement 1630 defines an interior 1634 extending between the first end 1635 and the second end 1636. The first end 1635 of the fixation arrangement 1630 is defined by a first housing part 1632. Walls 1637 extend inwardly from the second end 1636 of the fixation arrangement 1630 to separate the interior 1634 into three sections 1631. In certain implementations, the fixation arrangement 1630 defines apertures 1633 at opposite sides thereof. The apertures 1633 are sized to receive the latches 1623 of the insert arrangement 1620.

Figure 29:
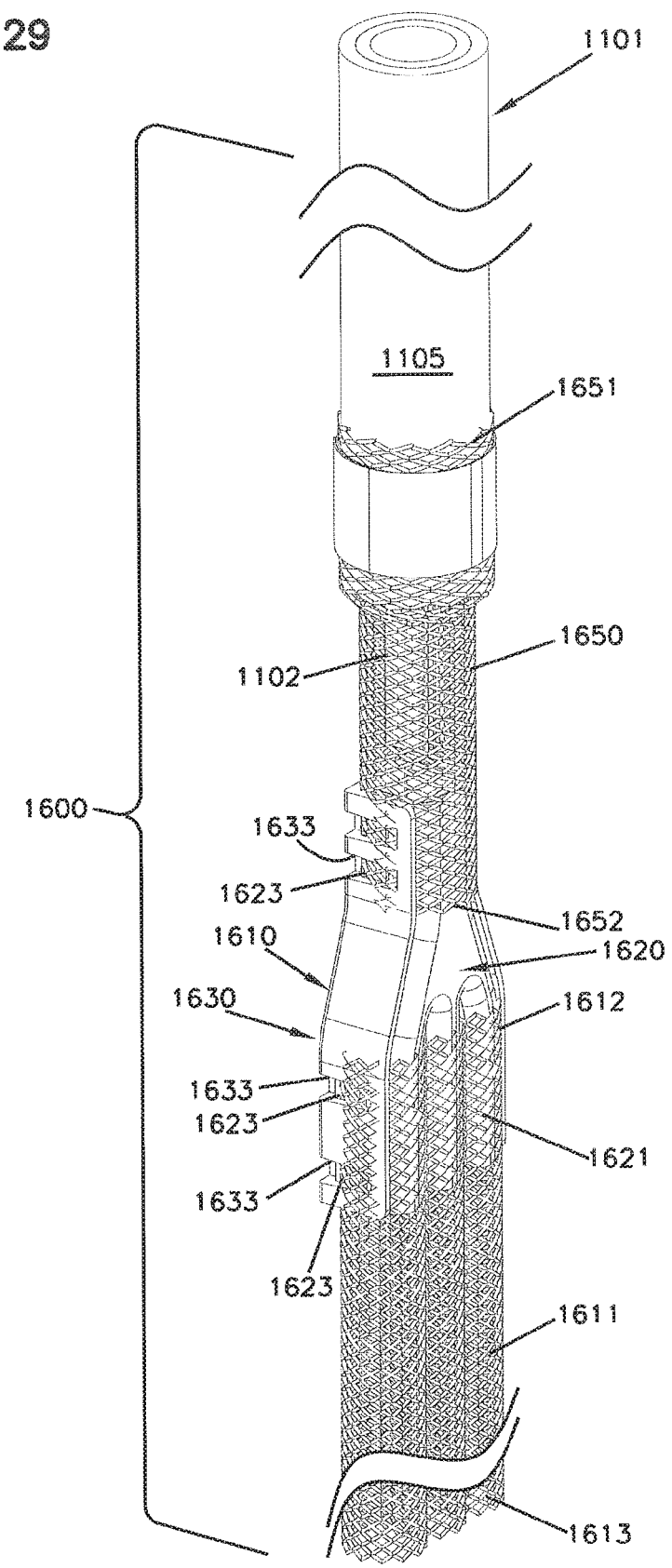
FIG. 29 is a perspective view of the sixth cable breakout assembly fully assembled.
Figure 30:
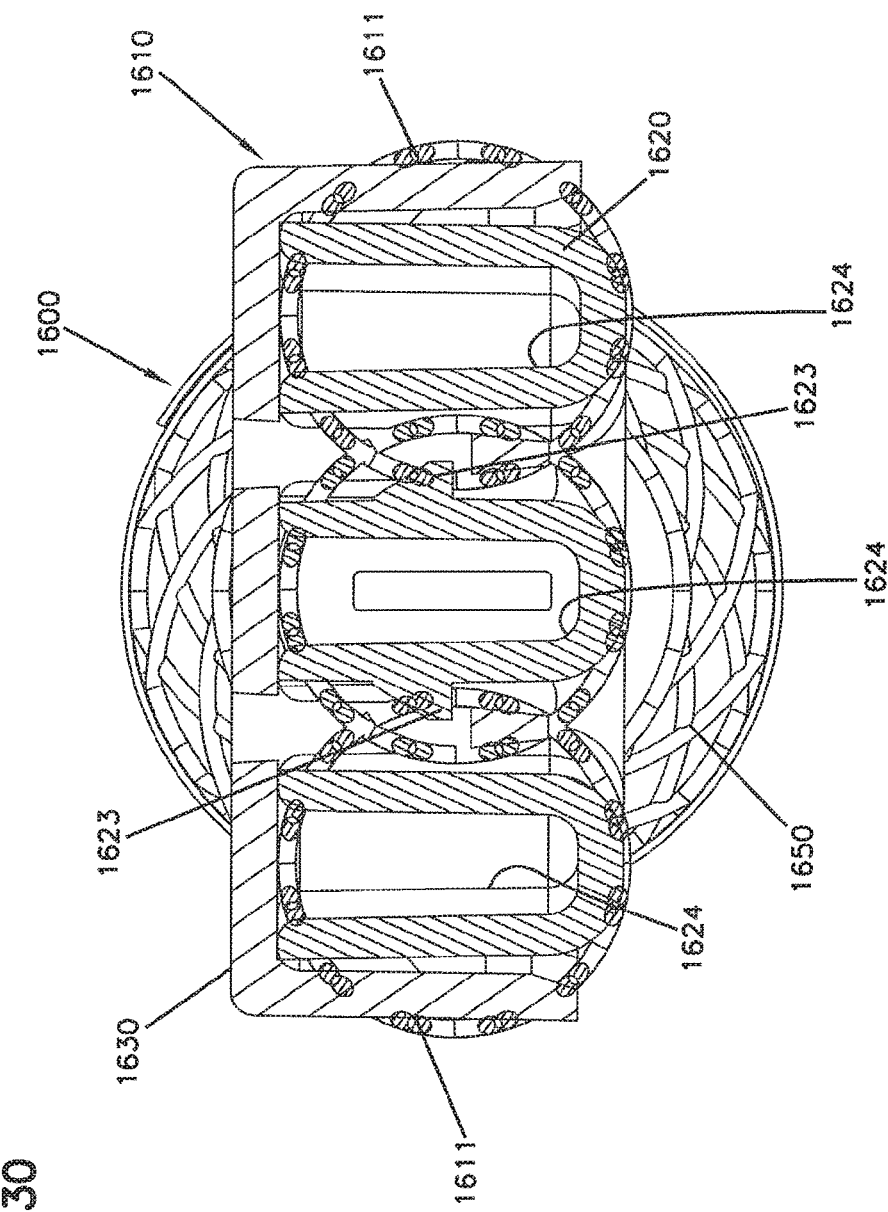
FIG. 30 is a transverse cross-sectional view of the sixth cable breakout assembly of FIG. 29.

As shown in FIGS. 29-30, the fixation arrangement 1630 mounts to the insert arrangement 1620 so that the insert arrangement 1620 is substantially disposed within the interior of the fixation arrangement 1630. The latches 1623 of the insert arrangement 1620 snap into the apertures 1633 of the fixation arrangement 1630 to hold the fixation arrangement 1630 to the insert arrangement 1620.

When the fixation arrangement 1630 slides over the insert arrangement 1620, a portion of the conduit 1650 is caught between the first housing part 1622 of the insert arrangement 1620 and the first housing part 1632 of the fixation arrangement 1630. In certain examples, the latches 1623 of the insert arrangement 1620 pass through apertures defined by the conduit 1650 to further secure the conduit 1650 to the breakout arrangement 1610. Portions of the first ends 1612 of the sleeves 1611 also are caught between the insert members 1621 and the fixation member 1630. For example, latches 1623 disposed on the outer insert members 1621 snap into apertures defined in the side walls of the fixation member 1630 (see FIG. 29). In certain examples, latches 1623 disposed on the inner insert member 1621 snap into apertures 1633 defined in the walls 1637 of the fixation arrangement 1630 (see FIG. 30).

FIGS. 31-38 illustrates a seventh cable breakout assembly 1710 mounted to a cable 1101 to form a seventh cable assembly 1700. The fixation arrangement 1730 is configured to fully surround the insert arrangement 1620, thereby fully capturing the second end 1752 of the conduit 1750 and the first ends 1712 of the sleeves 1711. In certain implementations, the fixation arrangement 1730 includes a base 1731 and cover 1732 to cooperate to surround the insert arrangement 1720. In the example shown, the base 1731 may be integral with the cover 1732 as will be discussed in more detail herein.

Figure 33:
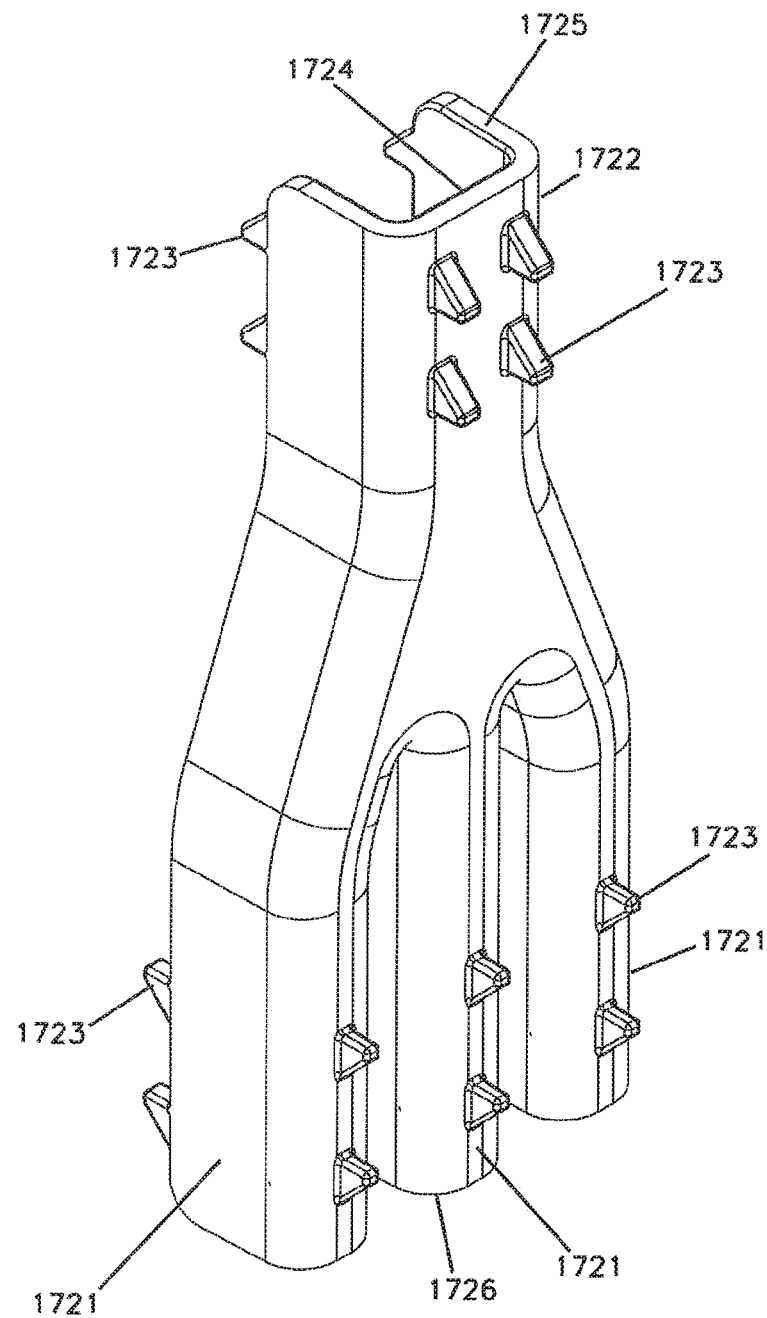

FIGS. 33-34 illustrate an example insert arrangement 1720 extending from an input end 1725 to an output end 1726. The insert arrangement 1720 defines a channel 1724 having an input at the input end 1725 and having a plurality of outputs at the output end 1726. The input of the channel 1724 is defined by a first housing part 1722. The outputs of the channel 1724 are defined by respective insert members 1721 that separately extend outwardly from the first housing part 1722. In certain implementations, the insert arrangement 1720 defines an open side 1727 providing access to an interior of the channel 1724 (see FIG. 34). In certain examples, the insert members 1721 are disposed in a row.

In certain examples, one or more latches 1723 extend outwardly from the insert arrangement 1720. In examples, the latches 1723 are disposed at the open side 1727 and at an opposite side from the open side 1727. In examples, each insert member 1721 includes at least one latch 1723 at the open side 1727 and at the opposite side. In the example shown, each insert member 1721 includes a plurality of latches 1723 at the opposite sides. In certain examples, the latches 1723 define a ramp at one side and a shoulder at the other side. In certain examples, the latches 1723 at the first housing part 1722 are oriented differently than the latches 1723 at the insert members 1721. In the example shown, the shoulders of the latches 1723 of the first housing part 1722 face the shoulders of the latches 1723 of the insert members 1721.

Figure 35:
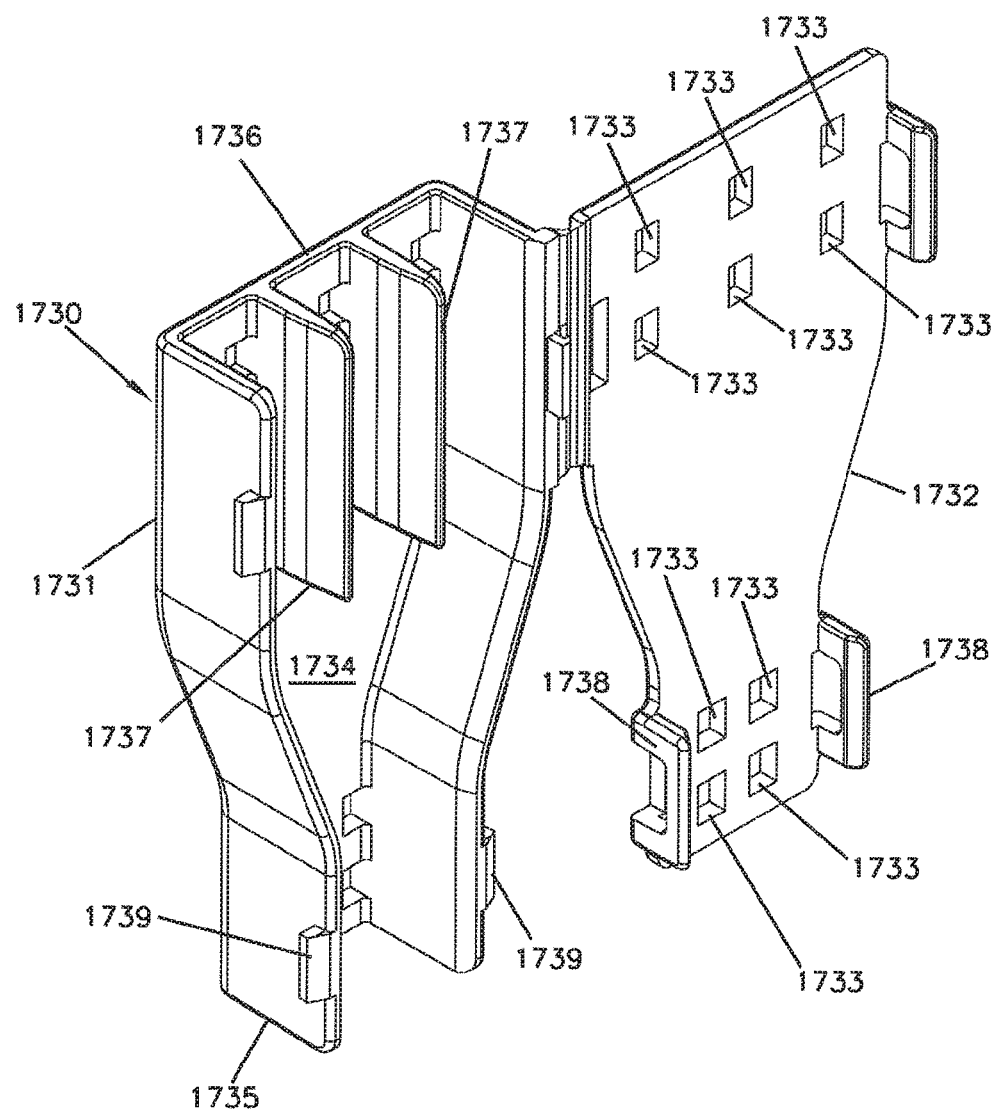
FIG. 35 is a perspective view of an example fixation arrangement of the seventh cable breakout assembly.

FIG. 35 illustrates an example fixation arrangement 1730 extending from a first end 1735 to a second end 1736. The fixation arrangement 1730 includes a base 1731 and a cover 1732 that cooperate to define an interior 1734. In certain implementations, the cover 1732 is integral with the base 1731. In the example shown, the cover 1732 is coupled to the base 1731 via a living hinge. In other examples, the cover 1732 may be a separate piece from the base 1731.

The cover 1732 and base 1731 cooperate to define a securement system that holds the cover 1732 to the base 1731. In the example shown, the base 1731 includes outwardly extending tabs 1739 and the cover 1732 includes retainers 1738 configured to snap over the tabs 1739 to hold the cover 1732 to the base 1731. In other examples, the tabs 1739 can be disposed on the cover 1732 and the retainers 1738 can be disposed on the base 1731.

Walls 1737 extend inwardly from the second end 1736 of the fixation arrangement 1730 to separate the interior 1734 into three sections at the second end 1736. In the example shown, the walls 1737 are carried by the base 1731. In other examples, the walls 1737 are carried by the cover 1732.

The fixation arrangement 1730 defines a plurality of apertures 1733. In certain implementations, some of the apertures 1733 are defined by the base 1731 and others of the apertures 1733 are defined by the cover 1732.

Figure 32:
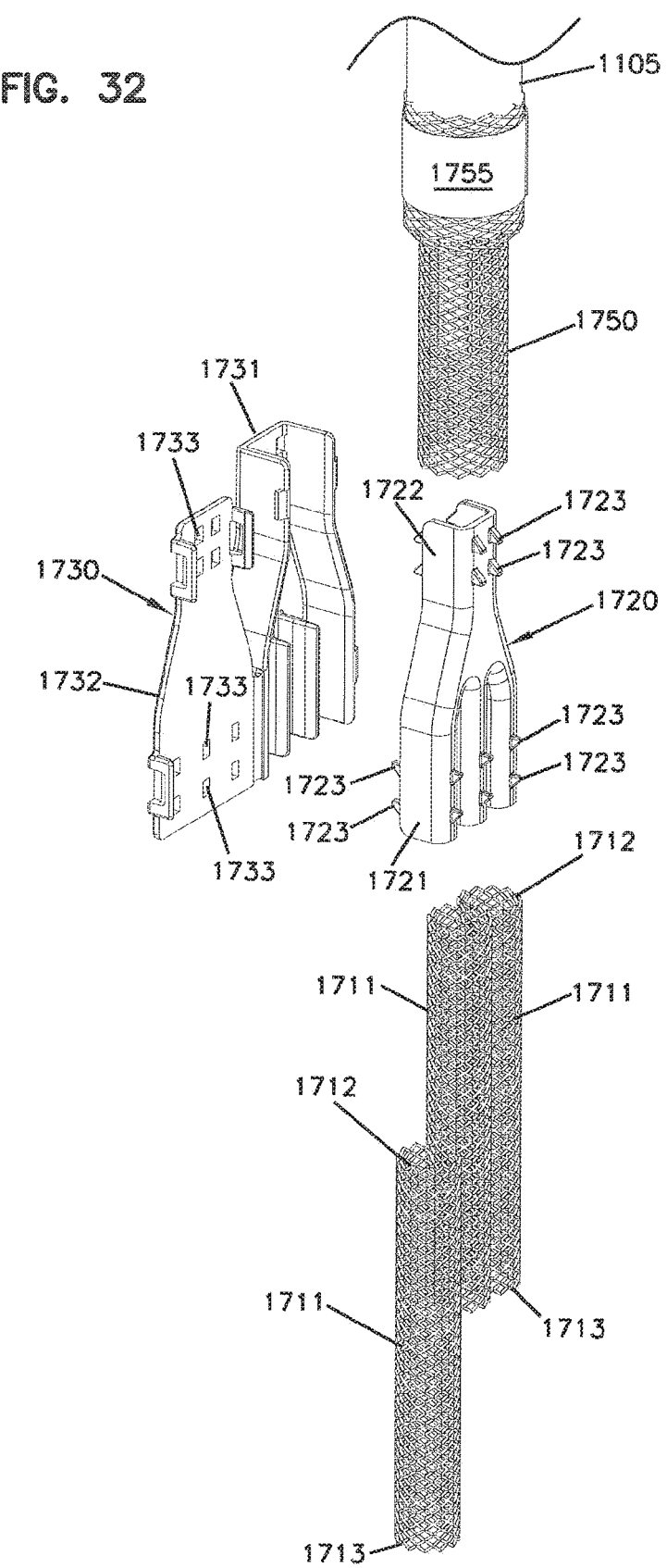
FIG. 32 shows the seventh cable breakout assembly of FIG. 31 with the components exploded from each other.

As shown in FIG. 32, the media segments 1102 are routed through the channel 1724 of the insert arrangement 1720 and out of the insert members 1721. The first housing part 1722 of the insert arrangement 1720 is inserted into the second end 1752 of the conduit 1750 so that the second end 1752 surrounds the first housing part 1722. Latches 1723 of the insert arrangement 1720 may pass through apertures in the conduit 1750 to inhibit axial movement of the conduit 1750 relative to the insert arrangement 1720. First ends 1712 of the sleeves 1711 are inserted over the insert members 1721 so that the media segments 1102 are routed into the respective sleeves 1711. Latches 1723 on the insert members 1721 may extend through apertures into the sleeves 1711 to inhibit axial movement of the sleeves 1711 relative to the insert arrangement 1720.

The fixation arrangement 1730 is mounted over the insert arrangement 1720, the second end 1752 of the conduit 1750, and the first ends 1712 of the sleeves 1711. For example, the cover 1732 of the fixation arrangement 1730 is arranged in an open position to provide access to the interior 1734 of the fixation arrangement 1730. The fixation arrangement 1730 is laterally slid relative to the insert arrangement 1720 until the insert arrangement 1720 is disposed substantially in the interior 1734 of the fixation arrangement 1730. The cover 1732 is then moved to enclose the insert arrangement 1720 within the interior 1734. The latches 1723 of the insert arrangement 1720 extend into the apertures 1733 of the fixation arrangement 1730. In certain implementations, the open side 1727 of the insert arrangement 1720 faces the base 1731 of the fixation arrangement 1730. The walls 1737 of the fixation arrangement 1730 extend between the insert members 1721 of the insert arrangement 1720.

Figure 33A:
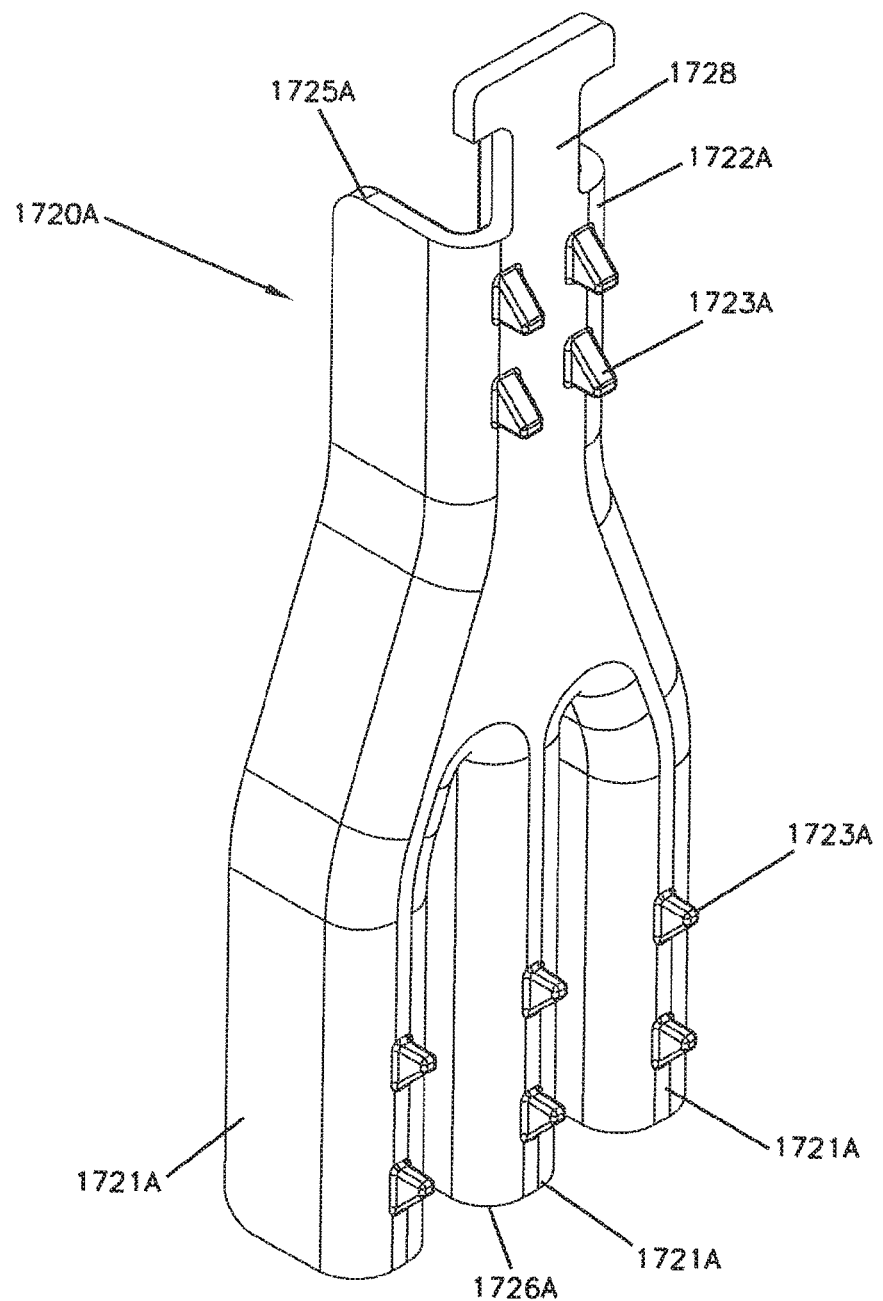
FIG. 33A illustrates another example insert arrangement suitable for use with the seventh cable breakout assembly.

FIG. 33A illustrates another example insert arrangement 1720A extending from an input end 1725A to an output end 1726A. The insert arrangement 1720A defines a channel having an input at the input end 1725A and having a plurality of outputs at the output end 1726A. In certain implementations, the insert arrangement 1720A defines an open side providing access to an interior of the channel. The input of the channel is defined by a first housing part 1722A. The outputs of the channel are defined by respective insert members 1721A that separately extend outwardly from the first housing part 1722A. In certain examples, the insert members 1721A are disposed in a row.

In certain examples, one or more latches 1723A extend outwardly from the insert arrangement 1720A. In examples, the latches 1723A are disposed at the side opposite from the open side. In examples, each insert member 1721A includes at least one latch 1723A. In the example shown, each insert member 1721A includes a plurality of latches 1723A. In certain examples, the latches 1723A define a ramp at one side and a shoulder at the other side. In certain examples, the latches 1723A at the first housing part 1722A are oriented differently than the latches 1723A at the insert members 1721A. In the example shown, the shoulders of the latches 1723A of the first housing part 1722A face the shoulders of the latches 1723A of the insert members 1721A. In the example shown in FIG. 33A, the latches 1723A are disposed only at the side of the insert arrangement 1720A opposite the channel.

The insert arrangement 1720A includes a cable fixation base 1728 extending outwardly from the input end 1725A. The cable fixation base 1728 provides a surface to which the cable extending into the channel from the input end 1725A can be secured (e.g., via a cable tie). In certain examples, the cable fixation base 1728 has a T-shape to aid in retaining the cable tie or other fixation member at the base 1728.

Figure 36:
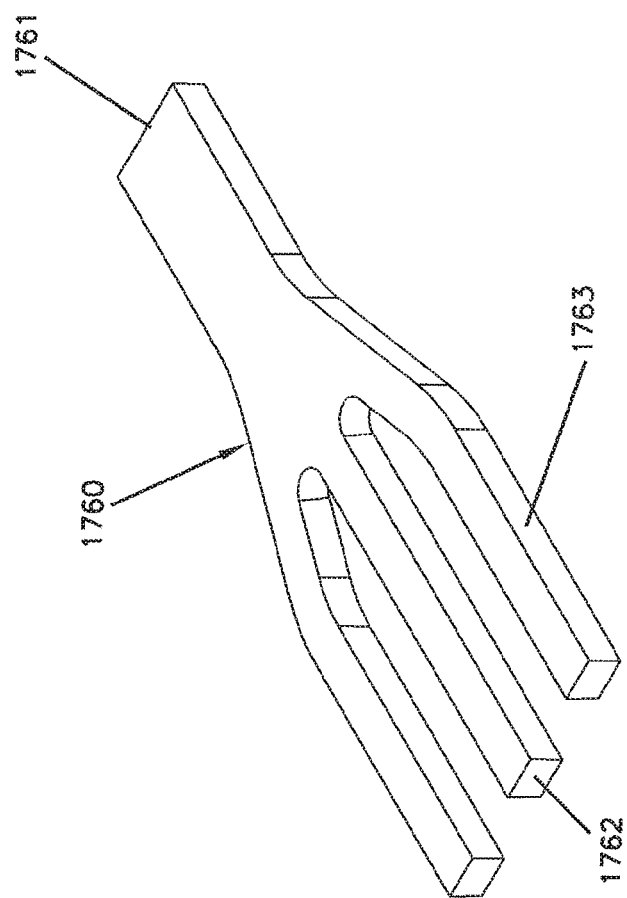
FIG. 36 is a perspective view of an example retainer insert of the seventh cable breakout assembly.
Figure 37:
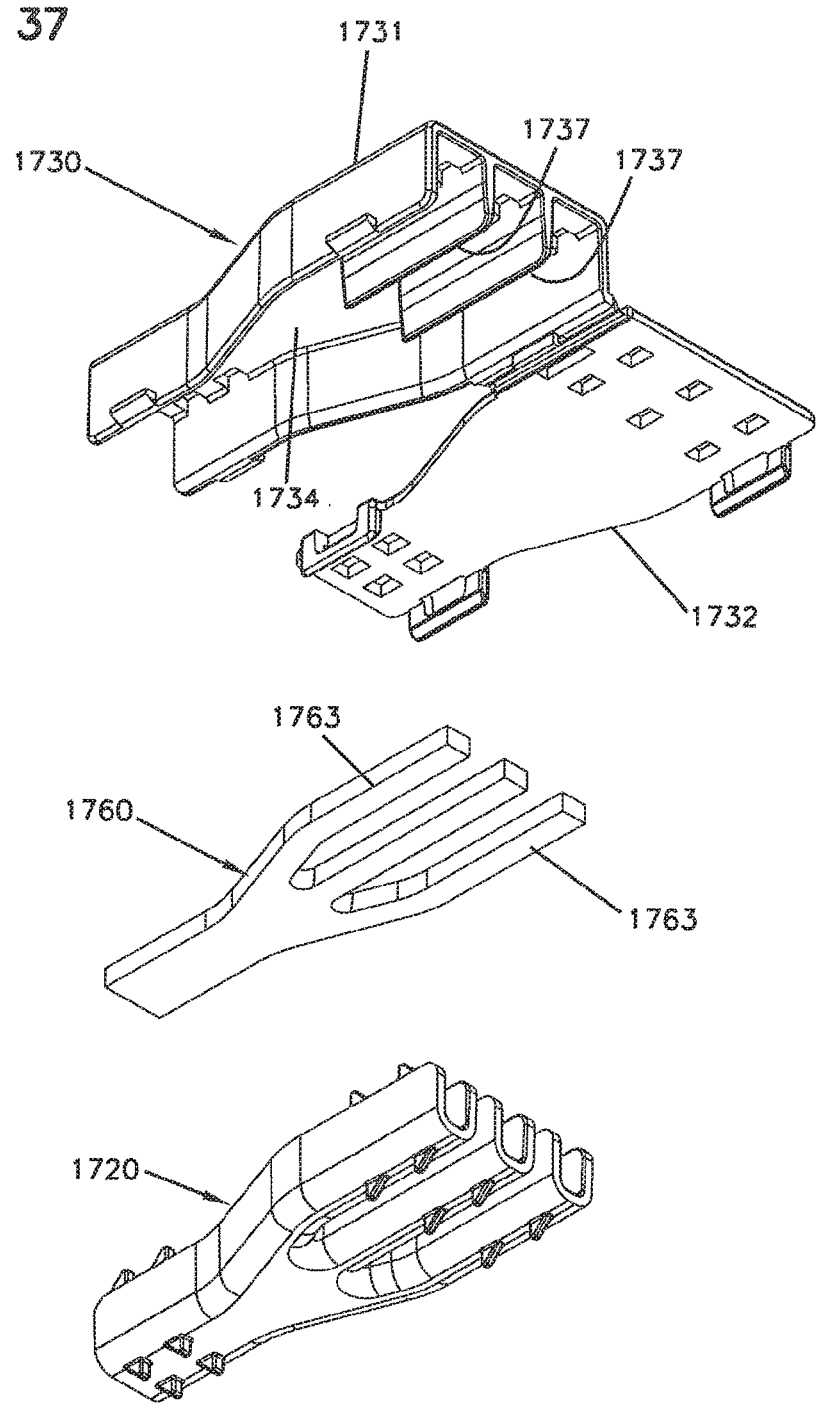
FIG. 37 is an exploded perspective view of the seventh cable breakout assembly with the sleeves and conduit removed for ease in viewing.
Figure 38:
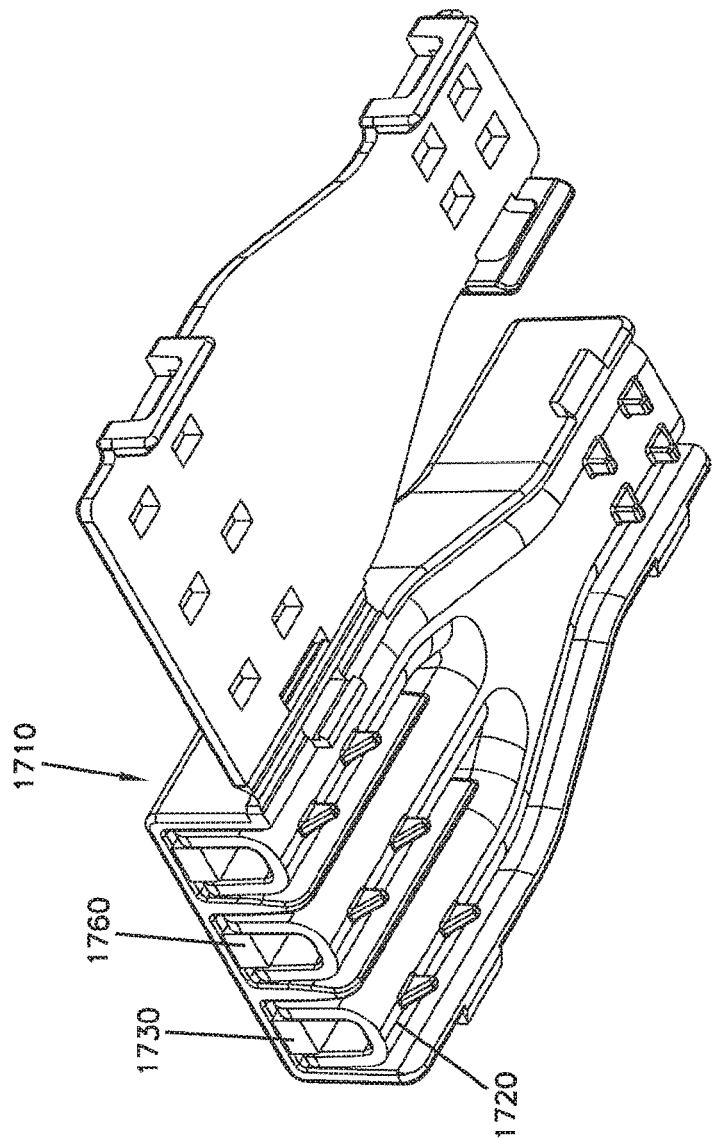
FIG. 38 is a perspective view of the seventh cable breakout assembly of FIG. 37 partially assembled.

FIGS. 36-38 illustrate a retainer insert 1760 that can be included with the fixation arrangement 1730. The retainer insert 1760 is disposed within the interior 1734 of the fixation arrangement 1730. In an example, the retainer insert 1760 is disposed in the base 1731. In certain implementations, the retainer insert 1760 cooperates with the insert arrangement 1720 to protect the media segments 1102 from the fixation arrangement 1730. In certain implementations, the retainer insert 1760 inhibits axial movement of the media segments 1102 relative to the insert arrangement 1720 and fixation arrangement 1730 even while the sleeves 1711 are assembled.

As shown in FIG. 36, the retainer insert 1760 branches into segments 1763 as the retainer insert 1760 extends from a first end 1761 to a second end 1762. Each segment 1763 is sized to be received within one of the sections of the fixation arrangement interior 1734 so that the walls 1737 extend between the segments 1763. In general, the retainer insert 1760 aligns with the open side 1727 of the insert arrangement 1720 (see FIG. 38).

In some implementations, the retainer insert 1760 is a separate piece from the fixation arrangement 1730. In other implementations, the retainer insert 1760 is secured to or integral with the fixation arrangement 1730. In some implementations, the retainer insert 1760 is formed of a softer material (e.g., has a lower Shore durometer measurement) than the fixation arrangement 1730. In an example, the retainer insert 1760 is formed of foam. In an example, the retainer insert 1760 is formed of elastomeric material. In other implementations, the retainer insert 1760 is formed of a material that is no softer than the fixation arrangement 1730.

Figure 39:
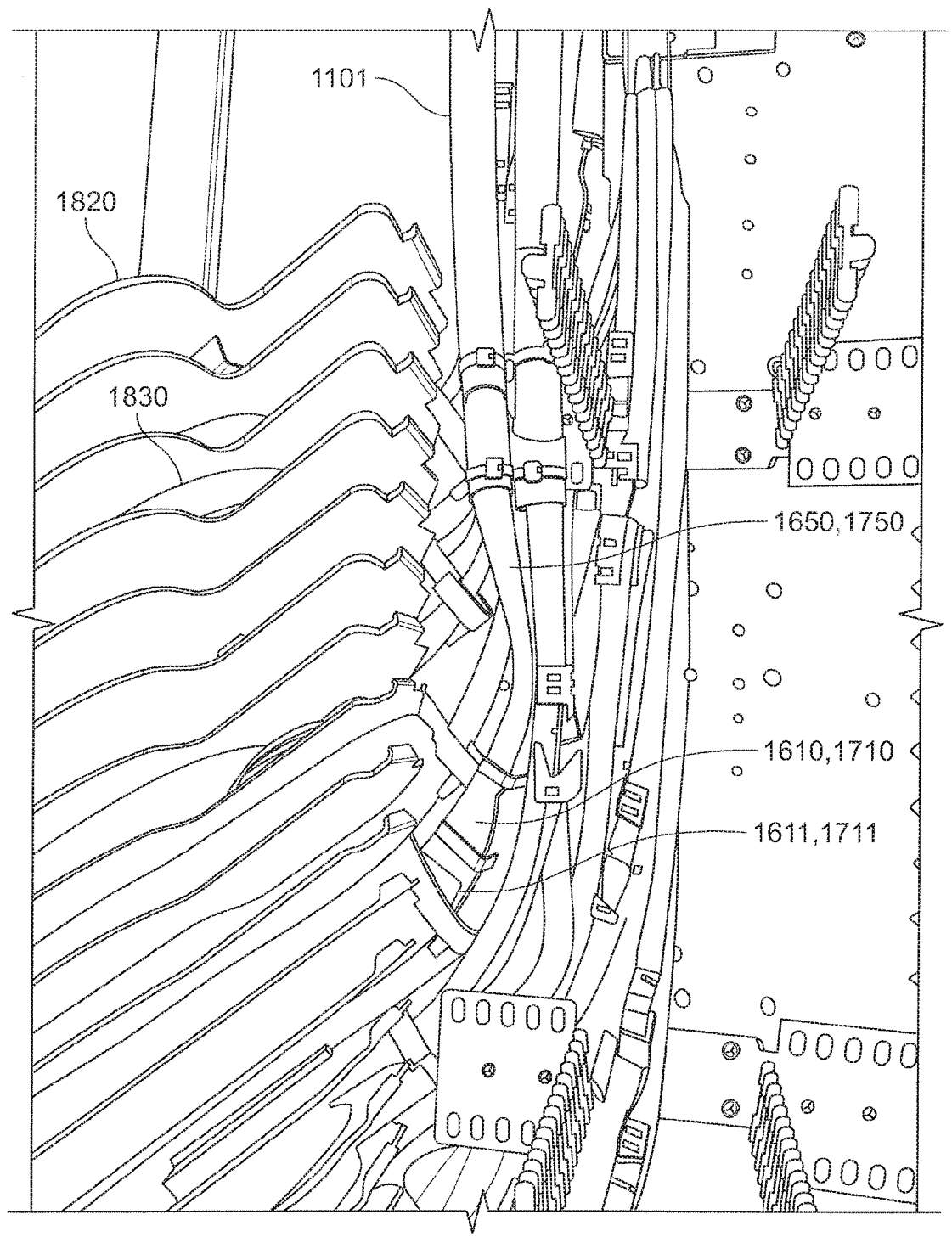
FIG. 39 illustrates an example rack including a splice region to which broken out media segments are routed from the cable breakout assemblies

FIG. 39 illustrates an example rack 1800 at which the cables 1101 can be broken out using a cable breakout assembly 1110, 1210, 1310, 1410, 1510, 1610, 1710. For ease in viewing, a cable breakout assembly similar to cable breakout assemblies 1610, 1710 is shown in FIG. 39. However, it will be understood that any of the cable breakout assemblies discussed herein could be used.

The rack 1800 has a splice region at which two or more optical splices can be stored. In certain implementations, one or more splice holders 1830 (e.g., splice wheels, splice trays, splice cassettes, etc.) can be stored at the splice region. In the example shown, multiple splice wheels 1830 are mounted on shelves 1820 at the rack 1800.

One or more of the cables 1101 are routed to the rack 1800. Two or more media segments 102 are broken out from the cables 1101 using one of the cable breakout assemblies 1110, 1210, 1310, 1410, 1510, 1610, 1710 disclosed herein. Sleeves 1111, 1211, 1311, 1411, 1511, 1611, 1711 extend from the breakout assembly 1110, 1210, 1310, 1410, 1510, 1610, 1710 to the splice holders 1830 or wherever else the media segments 1102 are routed. Excess length of the sleeves 1111, 1211, 1311, 1411, 1511, 1611, 1711 can be wrapped around the respective splice holder 1830.

In certain implementations, the optical fibers can extend between a rack-mounted cassette and a fiber optic cable in a data center or other location. The mesh sleeve includes first and second ends. The first end of the mesh sleeve can be secured to the rack-mounted cassette by a first sleeve anchor. The first sleeve anchor can include a reinforcing insert that fits within the first end of the mesh sleeve to reinforce the first end of the mesh sleeve, and a wrap-around style fastener that secures the reinforced end of the mesh sleeve to the rack-mounted cassette. The second end of the mesh sleeve can be secured to a fiber breakout bracket by a second sleeve anchor. An end of the fiber optic cable can also be anchored to the fiber breakout bracket. One or more optical fibers or fiber ribbons can be broken-out from the fiber optic cable at the breakout bracket. For example, one or more optical fibers or fiber ribbons can be routed from the anchored end of the fiber optic cable to the second end of the mesh sleeve. In certain examples, multiple mesh sleeves corresponding to different cassettes can have second ends anchored to the fiber breakout bracket and fibers from the anchored end of the fiber optic cable can fanned out and routed to the different mesh sleeves. The second sleeve anchor can include a reinforcing insert that fits within the second end of the mesh sleeve, and a clamping collar that secures the mesh sleeve to the reinforcing insert (e.g., through a clamping action). The second anchor can also include an attachment feature for securing the second anchor and the second end of the mesh sleeve, which has been fixed to the second anchor, to the breakout bracket. By extending the mesh sleeves along the length of the optical fibers, the mesh sleeves help reduce abrasion, dirt and dust penetration, and other wear that occurs.

Figure 40:
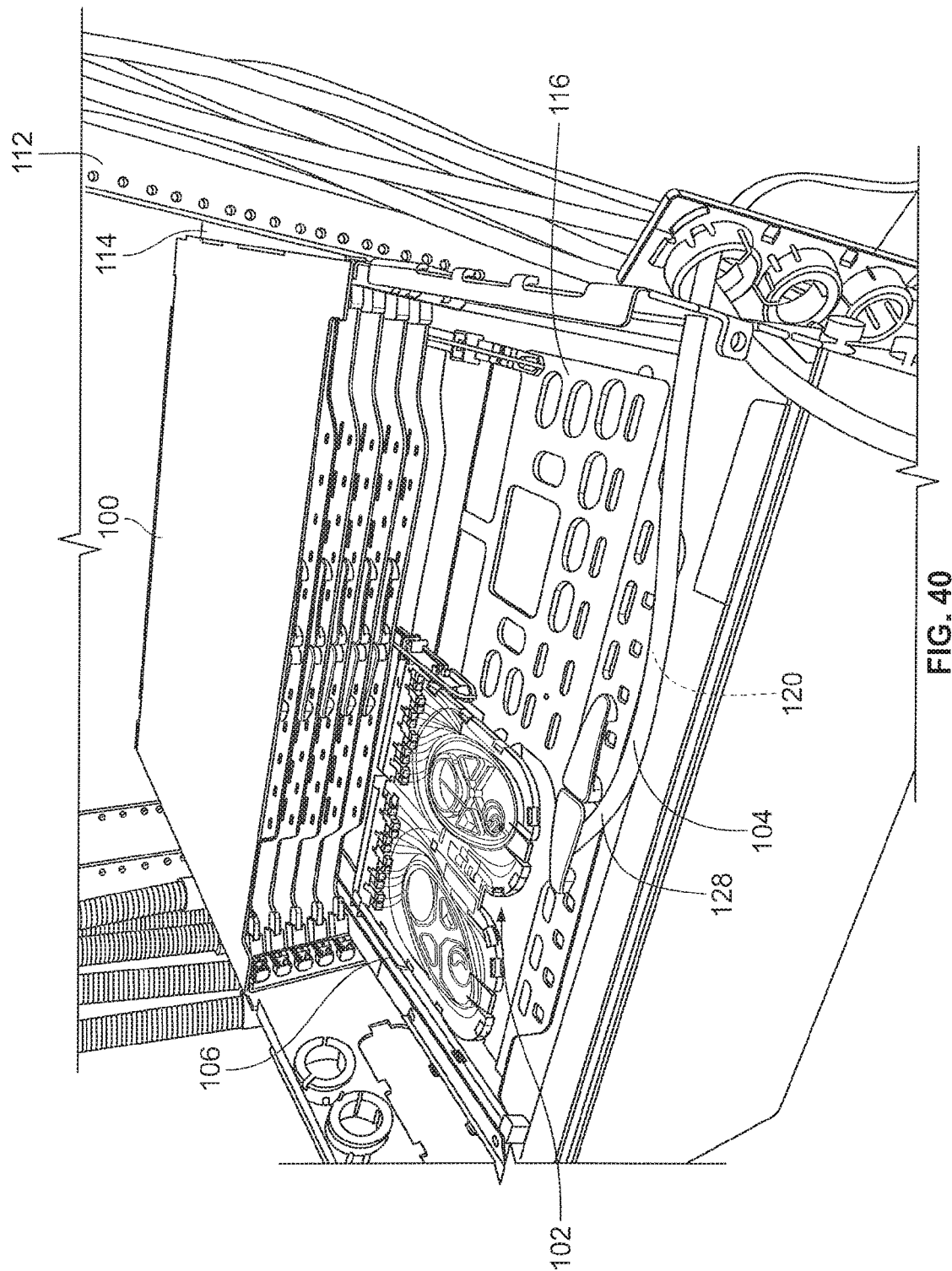
FIG. 40 is a perspective view of a fiber management chassis including a first end of a fiber routing system.
Figure 41:
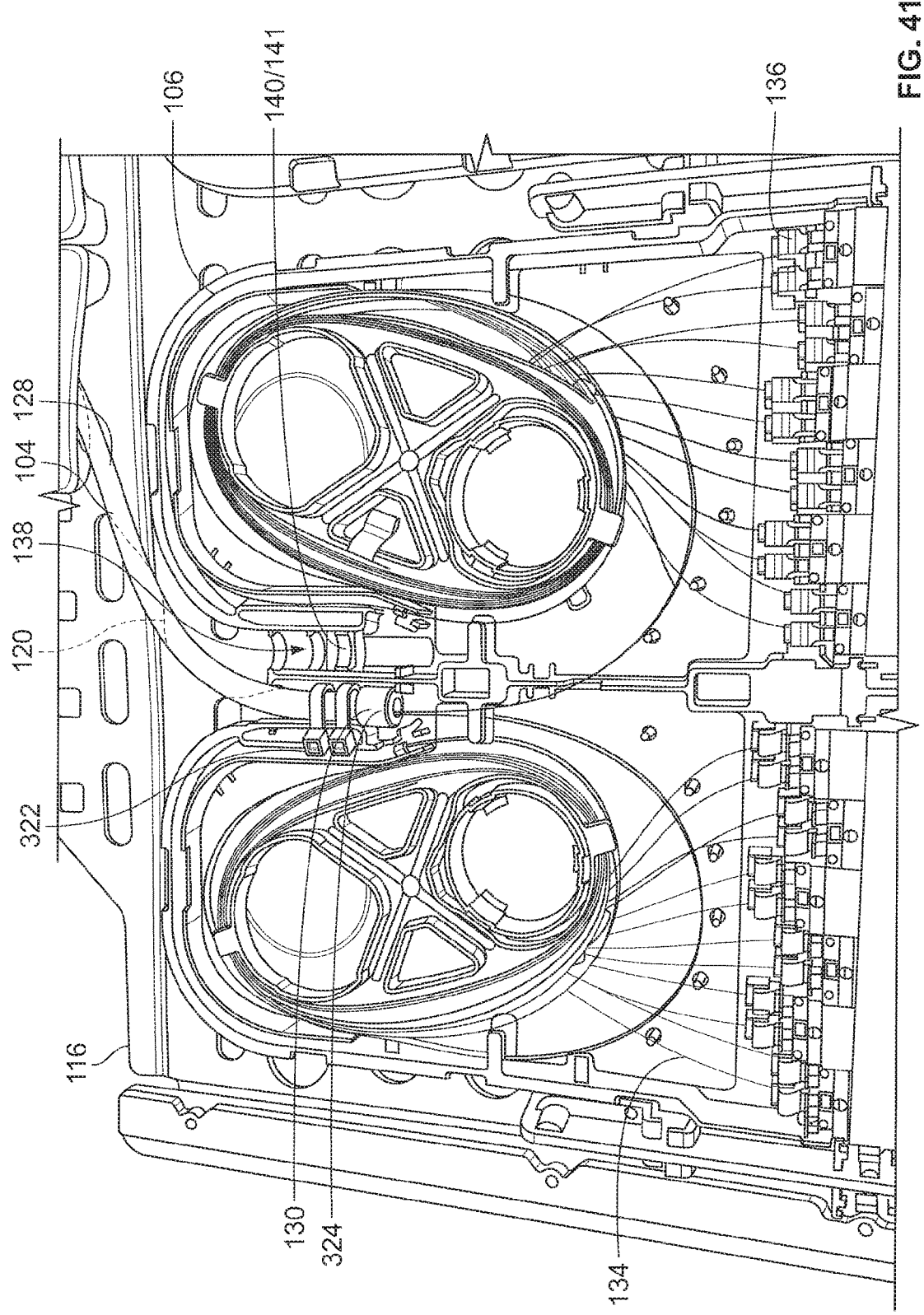
FIG. 41 is a top view of a cassette module of the fiber management chassis.
Figure 42:
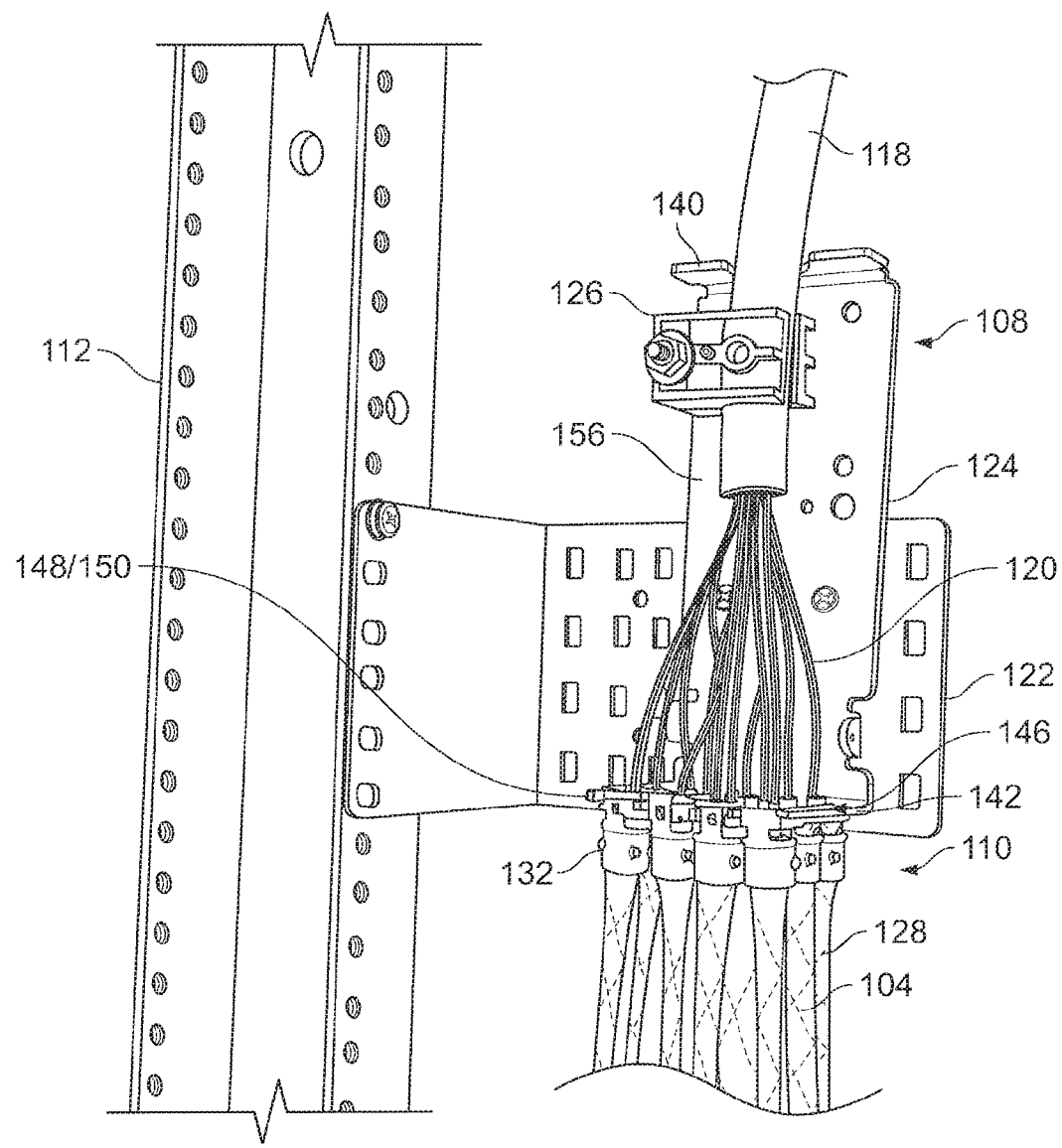
FIG. 42 is a perspective view of a breakout bracket including a second end of the fiber routing system shown in FIG. 40.
Figure 43:
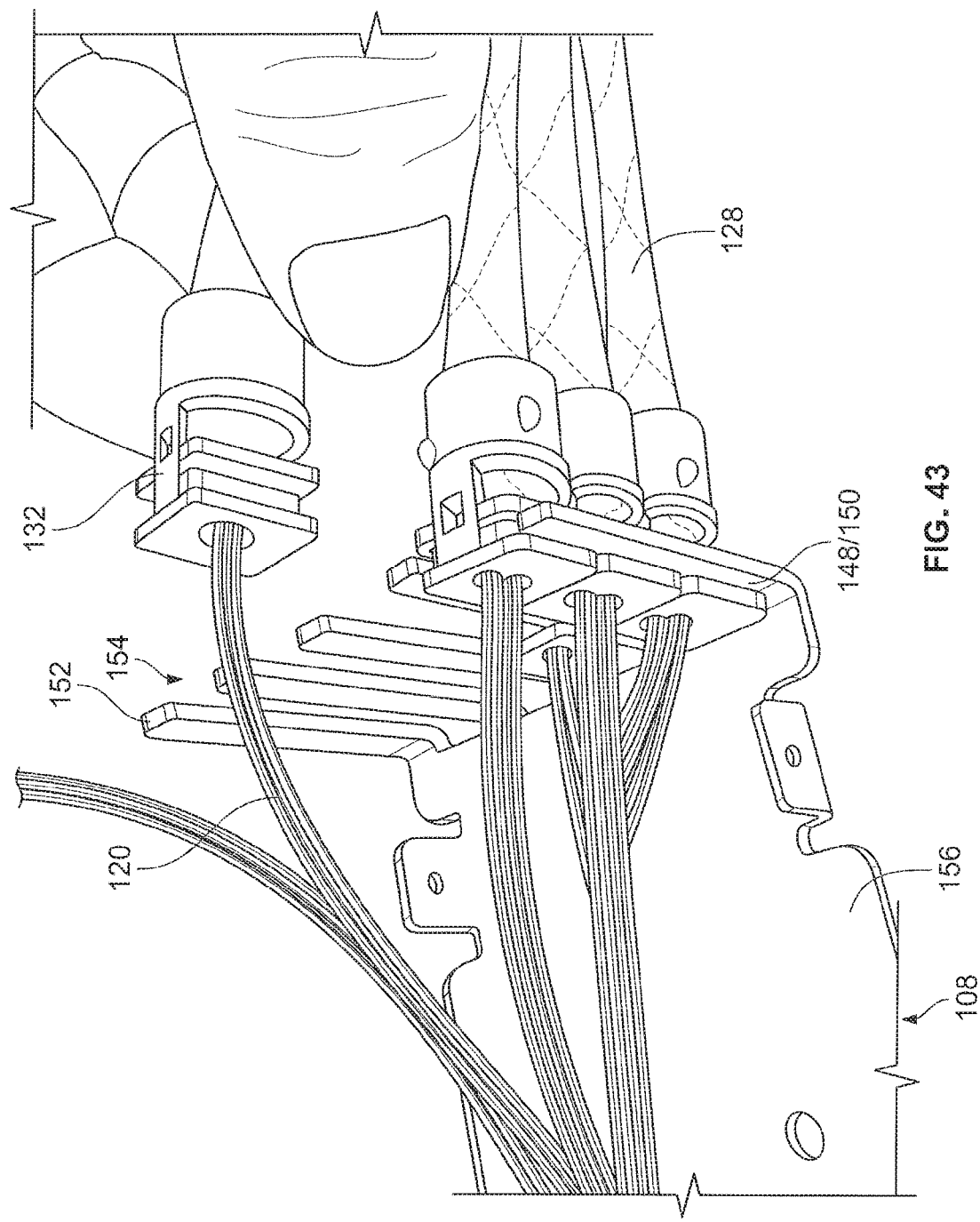
FIG. 43 is another perspective view of the breakout bracket shown in FIG. 42.

FIG. 40 is a perspective view of a fiber management chassis 100 including a first end 102 of a fiber routing system 104. The chassis 100 is shown mounted to a frame 112 of an equipment rack. The chassis 100 is configured to receive and hold a plurality of cassette modules 106. The cassette modules 106 can each include a plurality of fiber optic connection locations for supporting equipment patching and/or signal distribution. In certain examples, the connection locations can include an array (e.g., one or more rows) of fiber optic adapters each configured for coupling together two fiber optic connectors. In certain examples, the fiber optic adapters are located at front edges of the cassette modules 106 such that when the cassette modules 106 are loaded in the chassis the adapters form a fiber optic connection array at the front side of the chassis 100. FIG. 41 is a top view of one of the cassette modules 106 of the fiber management chassis 100. FIG. 42 is a perspective view of a breakout bracket 108 including a second end 110 of the fiber routing system 104. FIG. 43 is another perspective view of the breakout bracket 108.

Referring to FIGS. 40-43, when the cassette modules 106 are installed within the chassis 100 (e.g., at a blade 116), the front side of the chassis 100 can function as a fiber optic connection panel (e.g., a patch panel) that may be used in data centers or other locations where a demateable fiber optic connection fields are desired. Within the data center, the chassis 100 typically mounts to a vertically extending columns or posts of the equipment rack frame 112 via brackets 114. In alternative examples, the chassis 100 may be mounted within a cabinet (not shown).

An end of a fiber optic cable 1101 (shown in FIG. 42) is shown anchored (e.g., clamped) to a cable mounting location 126 that is adjacent a first end of the breakout bracket 108. The breakout bracket 108 can be mounted to a post of the equipment rack frame 112 within the data center. The fiber optic cable 1101 includes an outer jacket that encloses a plurality of optical fiber ribbons 120. The ribbons can each include a plurality of optical fibers (e.g., a row of optical fibers) encased within a polymeric material. The ribbons 120 exit the end of the fiber optic cable 1101 and are routed to the cassette modules 106 of the chassis 100. The breakout bracket 108 that is coupled to the frame 112 through an L-shaped extension bracket 122. The breakout bracket 108 can include a housing 124 (e.g., a top cover not shown), for enclosing a fiber breakout region of the breakout bracket 108. The cable mounting location 126 can include a clamp that at least partially surrounds the fiber optic cable 1101 and secures it to the breakout bracket 108. In the example, each chassis 100 may include a plurality of cassette modules 106, each with its own optical fiber ribbon 120 or ribbons extending thereto. As such, optical fiber ribbon 120 management is desirable within the data center.

The fiber routing system 104 receives each optical fiber ribbon 120 and extends between the cassette module 106, where the first end 102 is located, and the breakout bracket 108, where the second end 110 is located, to protect the ribbon or ribbons 120 from undesirable wear. The fiber routing system 104 includes a plurality of mesh sleeves 128 that surround each ribbon or ribbons 120 from the first end 102 to the second end 110. Each mesh sleeve 128 is secured to a corresponding one of the cassettes 106 at the first end 102 through a first sleeve anchor 130 and is secured to the breakout bracket 108 at the second end 110 through a second sleeve anchor 132. The sleeve anchors 130, 132 are discussed further below.

The cassette module 106 (shown in FIG. 41) receives the optical fiber ribbons 120 from the first end 102 of the fiber routing system 104. The cassette module 106 can include a tray that includes fiber management structures such as channels, fiber guides, spools, and the like for storing excess optical fiber length and for routing optical fibers 134 of the ribbons 120 to a connector location 136 for data center use. The connector location 136 can include a plurality of fiber optic connectors (e.g., LC fiber optic connectors) received within ports of the fiber optic adapters. The fiber optic connectors can include fiber stubs that are spliced to corresponding optical fibers of the fiber ribbons 120. In the example, the optical fiber ribbons 120 may include two ribbons each having twelve individual optical fibers 134, which the cassette module 106 channels to left and right sets of twelve connectors secured within corresponding adapters. In alternative examples, the optical fiber ribbon 120 may have any other number of optical fibers 134 as required or desired by the data center.

The cassette module 106 includes a sleeve anchoring location 138 that is defined by a mounting fixture 140 having a sleeve anchoring interface 141, for example a recess defined within the cassette module 106, that is sized and shaped to receive the sleeve anchor 130 of the first end 102 and couple the fiber routing system 104 to the cassette module 106. In one example, cables ties are used to secure a reinforced end of the mesh sleeve 128 to the sleeve anchoring location 138 at a central region of the cassette module 106. The cassette module 106 can include a channel or passage for receiving the reinforced end of the mesh sleeve 128 and one or more slots or other opening structures through the channel wall for receiving the cable ties used to secure the end of the mesh sleeve 128 in the channel.

The cable mounting location 126 of the breakout bracket 108 (shown in FIGS. 42 and 43) is positioned at a first end 142 of the bracket 108. At an opposite second end 144 of the bracket 108, a sleeve anchoring location 146 is defined by a mounting fixture 148 having a sleeve anchoring interface 150 that is sized and shaped to receive the sleeve anchor 132 of the second end 110 and couple the fiber routing system 104 to the breakout bracket 108. The anchoring interface 150 of the mounting fixture 148 includes at least two retention flanges 152 that cooperate to define a mounting channel 154 therebetween. The sleeve anchor 132 of the second end 110 may be slid into the mounting channel 154 and couple the fiber routing system 104 to the cassette module 106. In certain examples, the sleeve anchor 132 may mechanically interlock with the sleeve anchoring interface 150. For example, the sleeve anchor 132 may define slots/grooves that receive opposite retention flanges 152 when the sleeve anchor 132 is slid into one of the mounting channels 154.

For example, as illustrated in FIG. 43, the second end 144 of the breakout bracket 108 includes five retention flanges 152 that extend substantially perpendicular from a back wall 156. As such, four mounting channels 154 are defined at the anchoring interface 150, with each mounting channel 154 being able to receive and secure three sleeve anchors 132. The breakout bracket 108 enables each optical fiber ribbon 120 within the cable 1101 to be transitioned from the end of the cable 1101 into a corresponding sleeve anchor 132 and mesh sleeve 128. In alternative example, the mounting fixture 148 may have any other configuration that enables the breakout bracket 108 to function as described herein.

Figure 44:
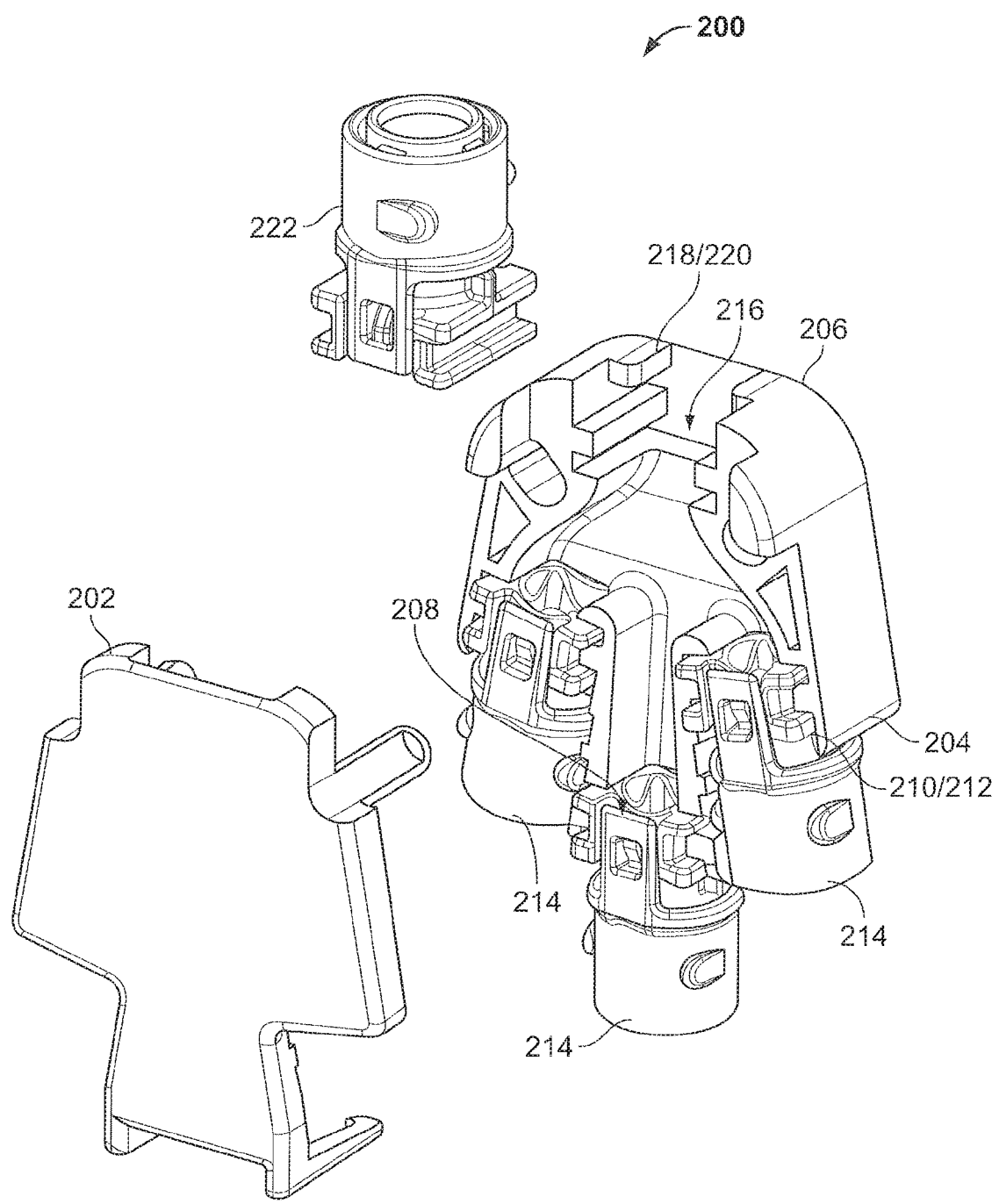
FIG. 44 is an exploded perspective view of a breakout block that may be used with the fiber routing system shown in FIGS. 40-43.

FIG. 44 is an exploded perspective view of a breakout block 200 that may be used with the fiber routing system 104 (shown in FIGS. 40-43). The breakout block 200 includes a housing 202 having a first end 204 and an opposite second end 206. At the first end 204, a sleeve anchoring location 208 is defined by a mounting fixture 210 having a plurality of sleeve anchoring interfaces 212 that are sized and shaped to receive a plurality of sleeve anchors 214 and couple the fiber routing system 104 (shown in FIGS. 40-43) to the breakout block 200. At the second end 206, another sleeve anchoring location 216 is defined by a mounting fixture 218 having a single sleeve anchoring interface 220 that is sized and shaped to receive a single sleeve anchor 222 and couple the fiber routing system 104 to the breakout block 200.

In the example, the first end 204 of the breakout block 200 enables a plurality of mesh sleeves (not shown) to be coupled to the breakout block 200 via the sleeve anchors 214, while the second end 206 enables a single mesh sleeve to be coupled to the breakout block 200 via the sleeve anchor 222. As such each optical fiber ribbon (not shown) within the plurality of mesh sleeves can be transitioned into a single sleeve anchor 222 and corresponding single mesh sleeve while covered by the housing 202. In some examples, the breakout block 200 may be used with the fiber routing system 104 and be positioned between the cassette module and the breakout bracket for further optical fiber management and transitioning between separately sleeved optical fiber ribbons and a single sleeve ribbons. Thus, optical fibers within a mesh sleeve routed from the breakout bracket 108 can be broken out into further mesh sleeves by the breakout block 200. Of course, the breakout block 200 can be used at any location where it is desired to transition optical fibers from a lower number of conduits (e.g., mesh sleeves) to a higher number of conduits as part of a fiber distribution and routing architecture.

As illustrated in FIG. 44, each sleeve anchor 214, 222 may be similarly shaped to the sleeve anchors 132 of the second end 110 (shown in FIGS. 42 and 43) of the fiber routing system 104. In alternative embodiments, the sleeve anchors 214, 222 may have a different configuration from the sleeve anchor 132.

Figure 45:
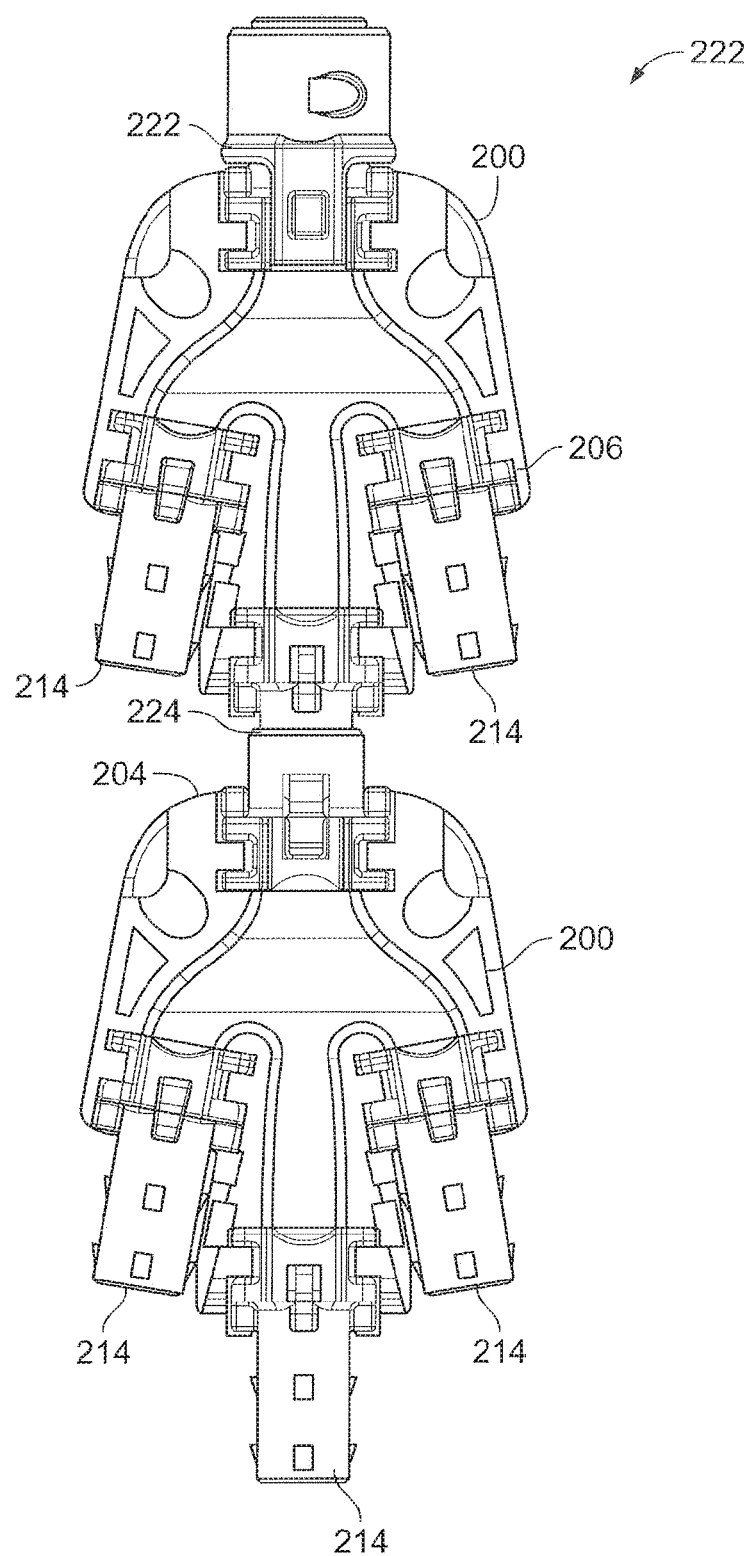
FIG. 45 is an interior view of a series of breakout blocks.

FIG. 45 is an interior view of a series of breakout blocks 224. In the example, two breakout blocks 200 are coupled together in series via a breakout block coupler 226. The breakout block coupler 226 enables the first end 204 of one block 200 to be coupled to the second end 206 of another block 200 by engaging both anchoring locations 208, 216 (shown in FIG. 44). By using a series of breakout blocks 224, a plurality of optical fiber ribbons (not shown) may be transitioned from a plurality of mesh sleeves (not shown) into a single sleeve anchor 222 and corresponding mesh sleeve while covered by the housings. For example, as illustrated in FIG. 45, three sleeve anchors 214 are coupled to the first breakout block and two sleeve anchors 214 are coupled to the second breakout block, thus five optical fiber ribbons or sets of ribbons each having its own mesh sleeve are transitioned to a single mesh sleeve by the series of breakout blocks 224.

Figure 46:
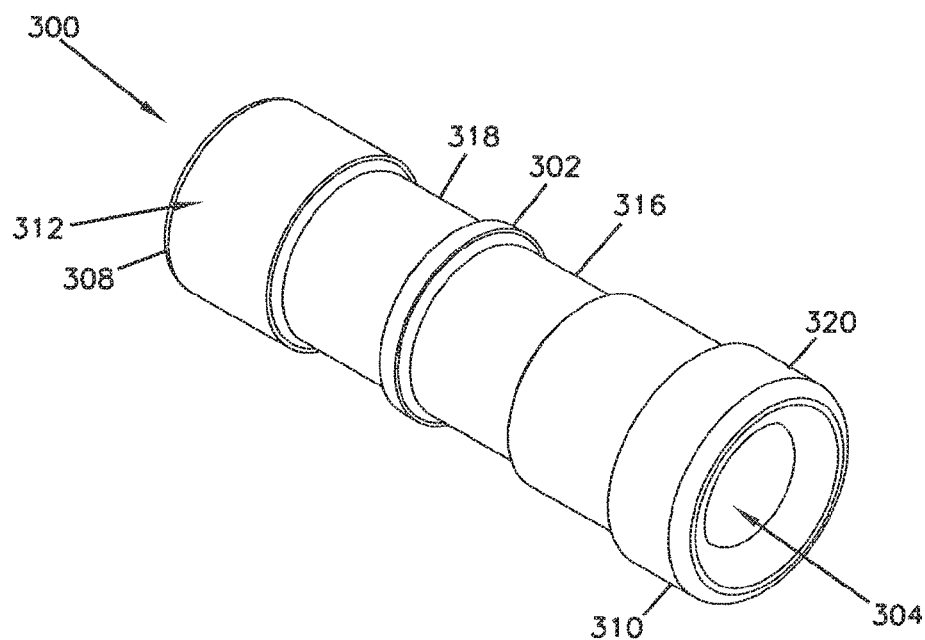
FIG. 46 is a perspective view of a first sleeve anchor for use with the cassette module shown in FIG. 41.
Figure 47:
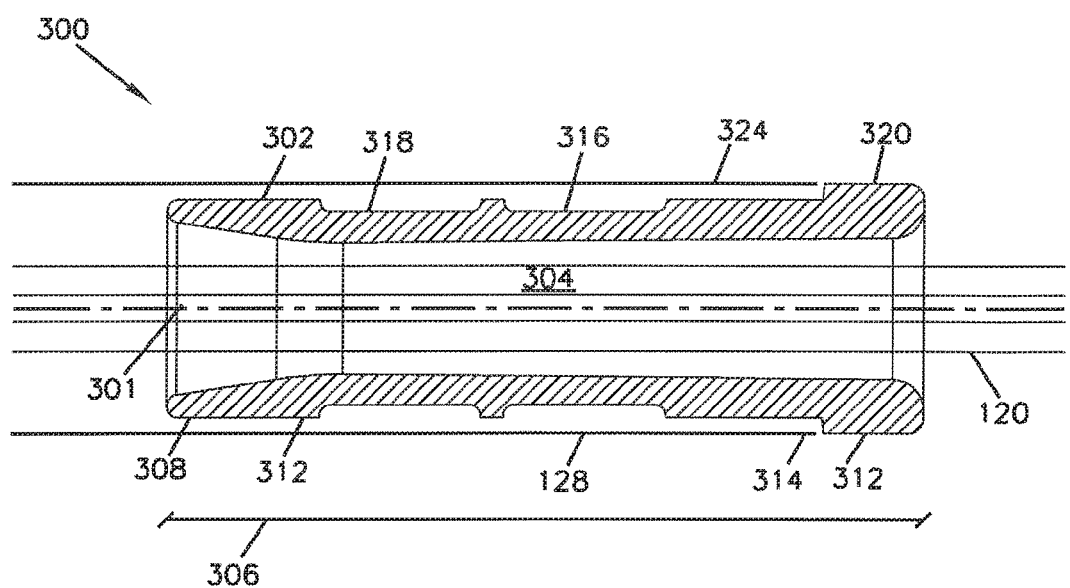
FIG. 47 is a cross-sectional view of the first sleeve anchor shown in FIG. 46.

FIG. 46 is a perspective view of a first sleeve anchor 300 for use with the cassette module 106 (shown in FIG. 41). FIG. 47 is a cross-sectional view of the first sleeve anchor 300. Referring to FIGS. 46 and 47, the sleeve anchor 300 includes a substantially cylindrical reinforcing insert 302 having an internal fiber passage 304 defined therethrough. The passage 304 extends through a length 306 of the reinforcing insert 302 from a first end 308 to a second end 310 along a longitudinal axis 301. The passage 304 is sized and shaped to receive the optical fiber ribbon 120 such that the reinforcing insert 302 may be positioned around the ribbon 120. In some examples, the passage 304 is sized to allow for the optical fiber ribbon 120 to twist within the reinforcing insert 302. In certain examples, the passage 304 to accommodate twisting of at least one twelve-fiber ribbon, or at least two stacked twelve-fiber ribbons, or at least three stacked twelve-fiber ribbons, or at least four stacked twelve-fiber ribbons. In some examples, the passage 304 can accommodate twelve or more stacked twelve-fiber ribbons and can allow for twisting of the ribbon stack.

The reinforcing insert 302 also has an outer side 312 that is at least partially received within a sleeve end 314 of the mesh sleeve 128. At least one annular channel 316, 318 is defined on the outer side 312. In the example, the outer side 312 includes two annular channels, with one channel 316 positioned near a midpoint of the insert 302 and the other channel 318 positioned towards the first end 308. At the second end 310, an annular flange 320 extends from the outer side 312 such that an outer diameter of the second end 310 is greater than an outer diameter of the first end 308.

The reinforcing insert 302 can have a plastic or metal construction and can be sized to fit within the end 314 of the mesh sleeve 128. Additionally, the insert 302 can be provided with hoop strength for radially supporting an interior of the mesh sleeve 128 to prevent the mesh sleeve from collapsing when a structure, such as a wrap-around style fastener, a clamp, a compression collar, a crimp, or like structure, is compressed about an exterior of the mesh sleeve 128.

The optical fiber ribbon 120 is routed through the mesh sleeve 128 and through the internal fiber passage 304 of the reinforcing insert 302, such that the sleeve end 314 of the mesh sleeve 128 is positioned around at least a portion of the outer side 312. As such, the reinforcing insert 302 is positioned between the mesh sleeve 128 and the ribbon 120. For example, the sleeve end 314 extends along the outer side 312 from the first end 308 towards the second end 310, past the annular channels 316, 318, and adjacent the annular flange 320 so that a portion of the second end 312 remains uncovered by the mesh sleeve 128.

The sleeve anchor 300 also includes one or more wrap-around style fasteners 322 (shown in FIG. 41) that are used to secure the sleeve end 314 on the reinforcing insert 302 and to the sleeve anchoring location 138 (shown in FIG. 41). The fastener 322 is tightened about an exterior 324 of the mesh sleeve 128 at a location in alignment with the annular channels 316, 318 of the reinforcing insert 302 such that a portion of the mesh sleeve 128 is compressed into the annular channels 316, 318 by the wrap-around style fastener 322. The wrap-around style fastener 322 is a fastening structure that wraps at least partially around a component desired to be secure in place. Example structures include tie-wraps, cable ties, cable clamps, hose clamps, wires, cinches, crimps, and like structures.

Additionally, before securing the sleeve end 314 on the reinforcing insert 302, a tape 326 such as an adhesive tape can be used to temporarily hold the reinforcing insert 302 within the sleeve end 314 and to prevent unraveling of the mesh prior to securing the sleeve end 314 to the cassette module with the wrap-around style fastener 322.

In the example, the sleeve anchor 300 may be the sleeve anchor 130 (shown in FIG. 41) at the first end 102 of the fiber routing system 104, and is sized and shaped to be received at the mounting fixture 140 (shown in FIG. 41). As such, the mesh sleeve 128 extends to the cassette module 106 and protects the optical fiber ribbon 120. The slim profile of the sleeve anchor 300 and the mounting fixture 140 also allows for the cassette module 106 to be stackable within the chassis. In the example, the wrap-around style fasteners 322 may also wrap-around a portion of the mounting fixture 140 such that the sleeve anchor 300 is secured within the sleeve anchoring interface 141 (shown in FIG. 41).

While the reinforcing insert 302 has been depicted as a cylindrical piece having a circular transverse cross-sectional profile, other shapes can also be used. For example, the reinforcing insert 302 can alternatively include another transverse cross-sectional profile such as an oval profile, an elliptical profile, and obround profile, a race-track shaped profile or other transverse cross-sectional profile.

Figure 48:
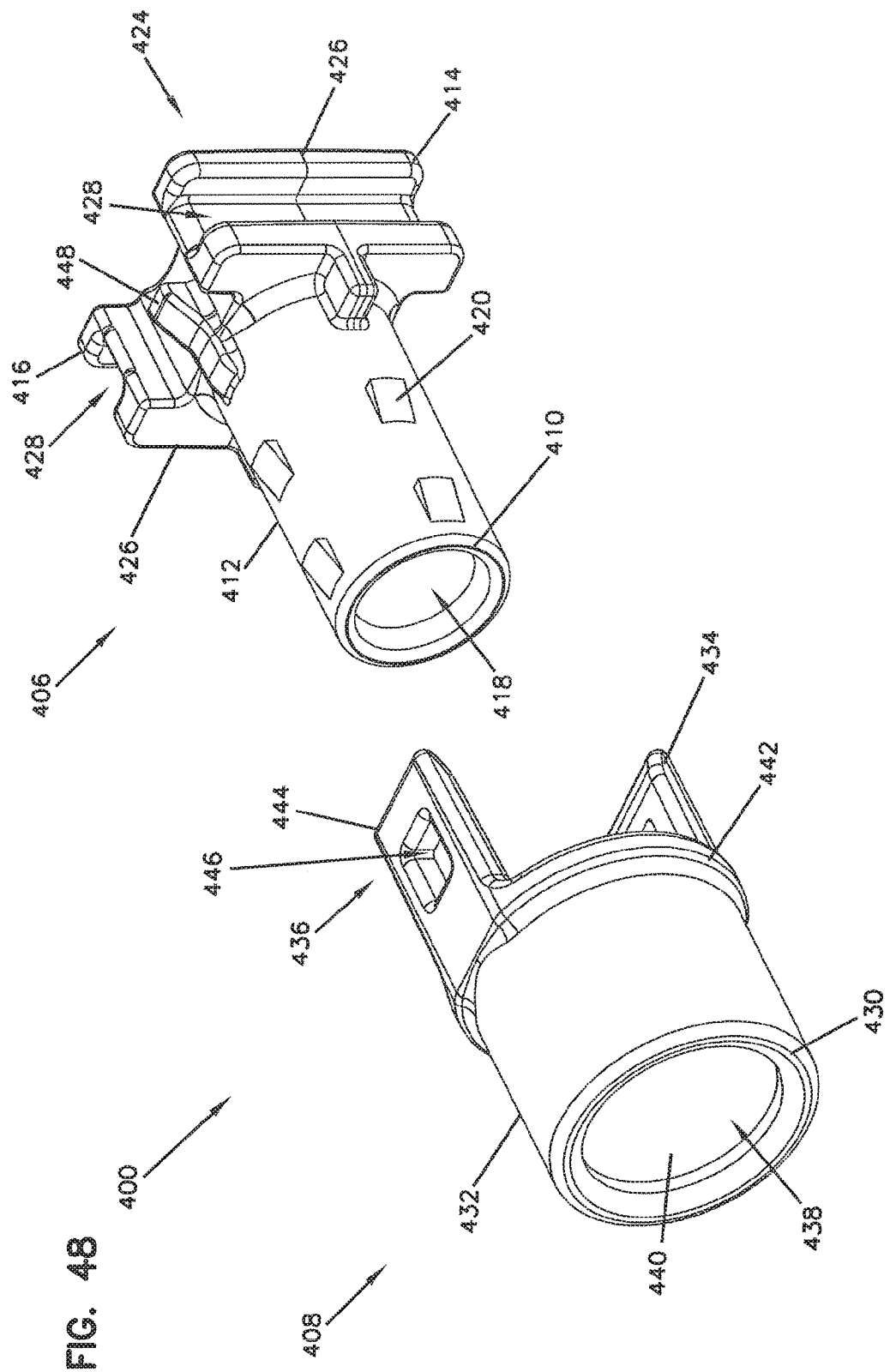
FIG. 48 is an exploded perspective view of a second sleeve anchor for use with the breakout bracket shown in FIGS. 42 and 43 and/or the breakout block shown in FIGS. 44 and 45.
Figure 49:
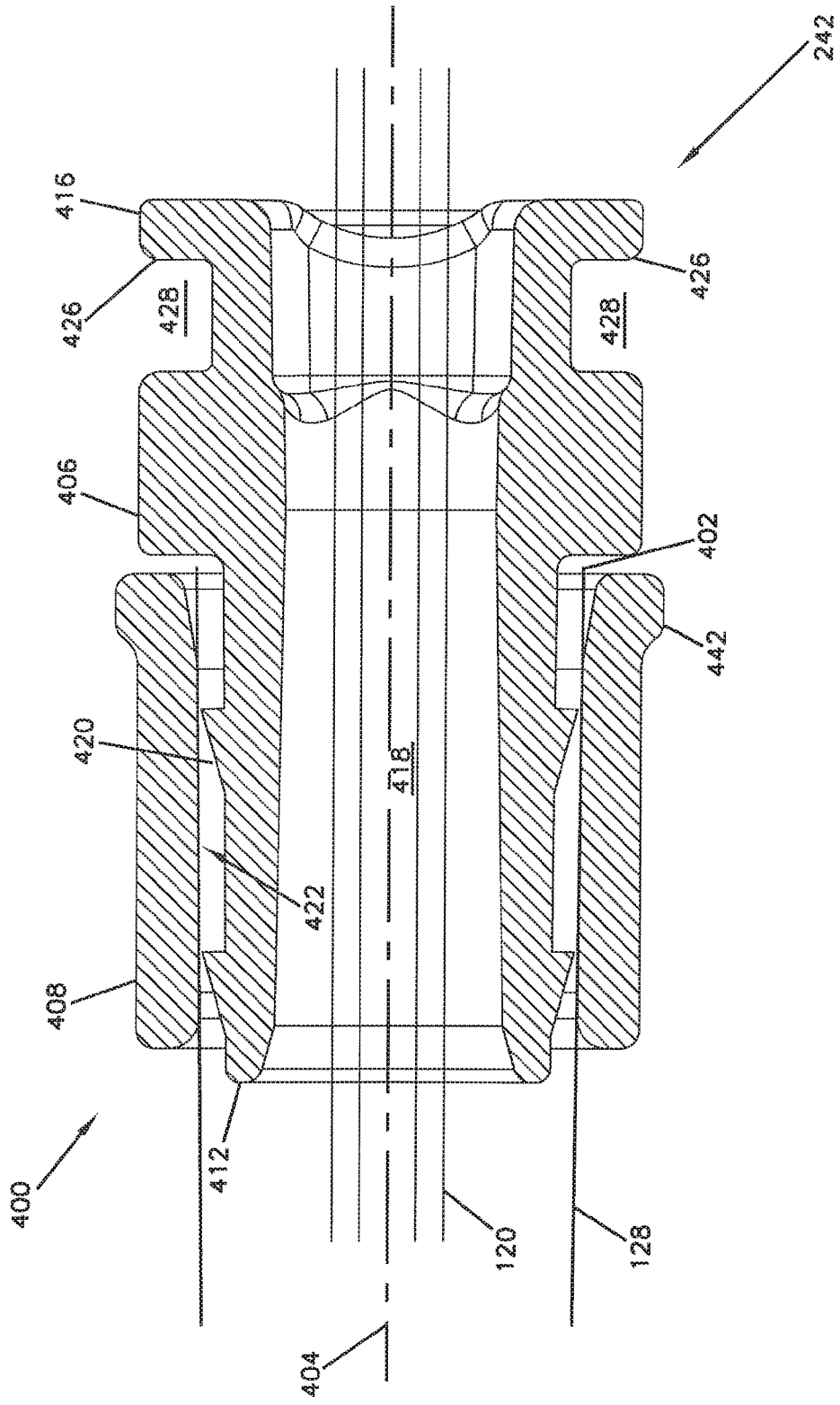
FIG. 49 is a cross-sectional view of the second sleeve anchor shown in FIG. 48.
Figure 50:
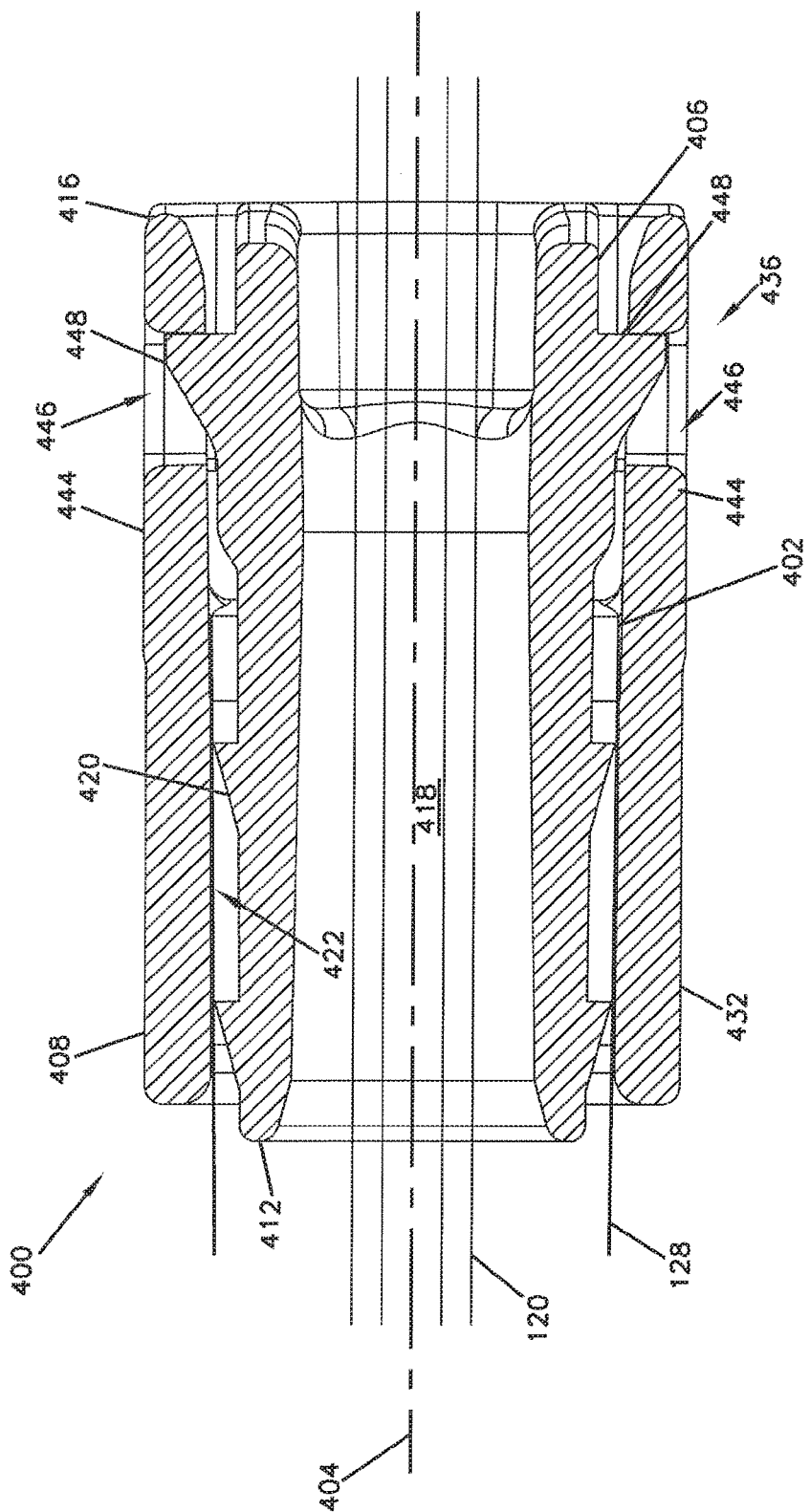
FIG. 50 is another cross-sectional view of the second sleeve anchor shown in FIG. 48.

FIG. 48 is an exploded perspective view of a second sleeve anchor 400 for use with the breakout bracket 108 (shown in FIGS. 42 and 43) and/or the breakout block 200 (shown in FIGS. 44 and 45). FIG. 49 is a cross-sectional view of the second sleeve anchor 400. FIG. 50 is another cross-sectional view of the second sleeve anchor 400. Referring to FIGS. 48-50, the sleeve anchor 400 is mounted at a sleeve end 402 of the mesh sleeve 128 and extends along a longitudinal axis 404. The sleeve anchor 400 includes a reinforcing insert 406 and a clamping collar 408 that radially clamps the sleeve end 402 therebetween and secures the mesh sleeve 128 to the sleeve anchor 400.

The reinforcing insert 406 includes a first end 410 having a stem 412 and a second end 414 having a base 416. The reinforcing insert 406 also defines an internal fiber passage 418 of the sleeve anchor 400 that extends through the reinforcing insert 406 from the first end 410 to the second end 414. In some examples, the passage 418 is sized to allow for the optical fiber ribbon 120 to twist within the reinforcing insert 406. In certain examples, the passage 418 to accommodate twisting of at least one twelve-fiber ribbon, or at least two stacked twelve-fiber ribbons, or at least three stacked twelve-fiber ribbons, or at least four stacked twelve-fiber ribbons. In some examples, the passage 418 can accommodate twelve or more stacked twelve-fiber ribbons and can allow for twisting of the ribbon stack.

The stem 412 is sized and shaped to fit within the sleeve end 402 of the mesh sleeve 128 such that the base 416 remains outside of the sleeve end 402. The stem 412 includes a plurality of outer projections 420 that engage an inner surface 422 of the sleeve end 402 to enhance retention of the sleeve end 402 when clamped radially between the reinforcing insert 406 and the clamping collar 408. For example, the outer projections 420 may include teeth that extend radially outwards from the stem 412, and the teeth may further include barbs that project into and embed with the mesh of the mesh sleeve 128. The projections 420 can include discrete separate teeth spaced circumferentially and axially along/about the stem 412, a plurality of axially spaced-apart annular projections/ribs that extend circumferentially about the stem 412, or other types of projections. In some examples, the projections 420 are relatively small and can embed or project into/through the weave/fabric of the mesh sleeve 128 for enhanced retention.

As depicted, the stem 412 is cylindrical and has a circular transverse cross-sectional profile. In other examples, the stem 412 can have other transverse cross-sectional shapes. For example, the stem 412 can alternatively include another transverse cross-sectional profile such as an oval profile, an elliptical profile, and obround profile, a race-track shaped profile or other transverse cross-sectional profile.

The base 416 of the reinforcing insert 406 defines an anchoring feature 424 that is accessible from the outside of the sleeve end 402 when the mesh sleeve 128 is clamped radially between the reinforcing insert 406 and the clamping collar 408. The anchoring feature 424 enables the sleeve anchor 400 to be secured at a sleeve anchoring location, for example, the sleeve anchoring location 146 of the breakout bracket 108 (shown in FIG. 42) and/or the sleeve anchoring locations 208, 216 of the breakout block 200 (shown in FIG. 44). The anchoring feature 242 can include a snap-fit interface, a latch, a threaded interface, a channel, multiple channels, a bayonet-type interface, latches, catches, openings, receptacles, or any other configuration.

In the example, the base 416 is rectangular and the anchoring feature 424 includes a pair of flange receivers 426 defined by two sides of the base 416. The flange receivers 426 have open sides that face in opposite directions, for example, the flange receivers 426 are slots 428 that are straight and are parallel relative to one another. The flange receivers 426 may be received in the retention flanges 152 of the breakout bracket 108 such that one or more sleeve anchor 400 may be slid into the mounting channel 154 and anchor to the breakout bracket 108 (shown in FIG. 43). In another example, the flange receivers 426 may be received in the sleeve anchoring interface 212, 222 of the breakout block 200 to anchor to the breakout block 200 (shown in FIG. 44).

The clamping collar 408 includes a first end 430 having a sleeve 432 and a second end 434 having a portion of a mechanical interface 436. The sleeve 432 defines an opening 438 having an interior surface 440 such that the clamping collar 408 mounts over the sleeve end 402 and the stem 412, and the sleeve end 402 is clamped radially between the interior surface 440 and the outside of the stem 412. The sleeve 432 has a chamfered end at the first end and an annular flange 442 that supports the mechanical interface 436.

The clamping collar 408 is secured to the reinforcing insert 406 by the mechanical interface 436. The mechanical interface 436 between the clamping collar 408 and the reinforcing insert 406 can include a threaded interface, a bayonet-style interface, a snap-fit interface, or any other configuration. In the example, the mechanical interface 436 includes a snap interface that includes a pair of flexible latching arms 444 that extends from the sleeve 432 of the clamping collar 408. The latching arms 444 include a latch opening 446 defined on the free end of the latching arms 444. The snap interface also includes a pair of radial tabs 448 that extend from the base 416 of the reinforcing insert 406 between the flange receivers 426. The radial tabs 448 are shaped and sized to be received within the latch opening 446 of the latching arms 444 to secure the clamping collar 408 to the reinforcing insert 406.

In the example, the sleeve anchor 400 may be the sleeve anchor 132 (shown in FIG. 42) at the second end 110 of the fiber routing system 104, and is sized and shaped to be received at the mounting fixture 148 (shown in FIG. 42). As such, the mesh sleeve 128 extends to the breakout bracket and protects the optical fiber ribbon 120 that extends through the mesh sleeve 128 and through the fiber passage 418 of the sleeve anchor 400. Additionally, the sleeve anchor 400 may be the sleeve anchor 214, 222 (shown in FIGS. 44 and 45) of the breakout block 200.

Figure 51:
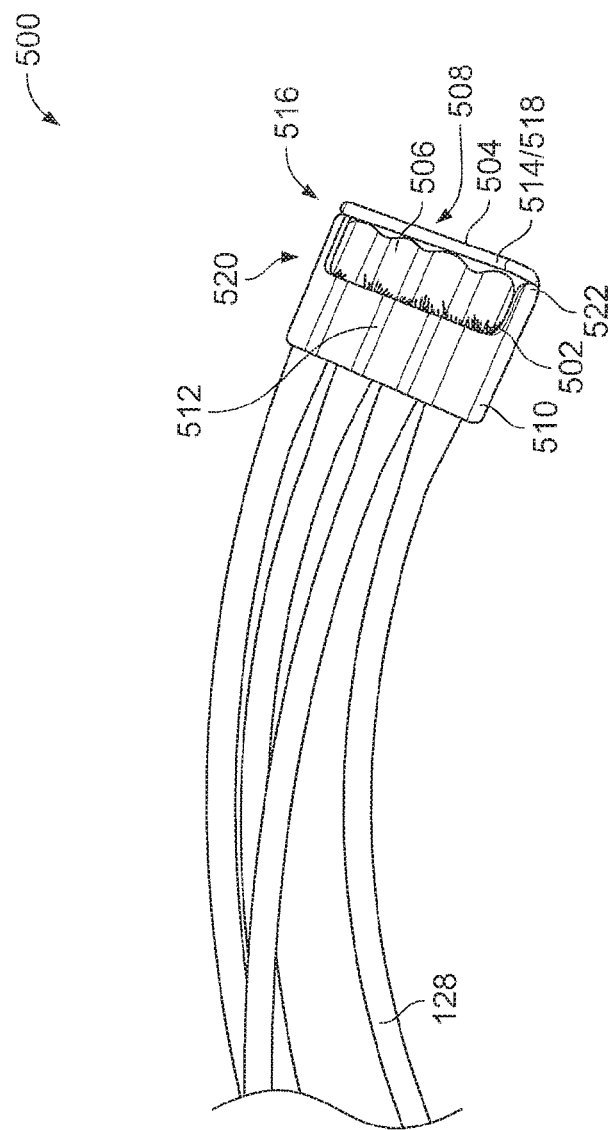
FIG. 51 is a perspective view of a sleeve mount for use with the breakout bracket shown in FIGS. 42 and 43.

FIG. 51 is a perspective view of a sleeve mount 500 for use with the breakout bracket 108 (shown in FIGS. 42 and 43). The sleeve mount 500 facilitates securing a plurality of sleeve ends 502 of the mesh sleeves 128 at a single anchor. In this example, the sleeve mount 500 includes a reinforcing insert piece 504 that includes a plurality of reinforcing inserts 506 arranged in a gaged configuration. Each of the reinforcing inserts 506 fit within a corresponding one of the sleeve ends 502 as discussed in further detail above. Each reinforcing insert 506 also defines separate internal fiber passages 508.

The sleeve mount 500 also includes a clamping piece 510. The clamping piece 510 includes a plurality of clamping collars 512 each that mount over a corresponding reinforcing insert 506 such that the sleeve ends 502 of the mesh sleeves 128 are clamped radially between the clamping collar 512 and their corresponding reinforcing inserts 506 as discussed in further detail above.

Similar to the sleeve anchor 400, described above in FIGS. 48-50, the reinforcing insert piece 504 includes a base 514 that defines an anchoring feature 516 that is accessible from the outside of the sleeve ends 502 when the mesh sleeves 128 are clamped radially between the reinforcing insert piece 504 and the clamping piece. The anchoring feature 516 enables the sleeve mount 500 to be secured at a sleeve anchoring location, for example, the sleeve anchoring location 146 of the breakout bracket 108 (shown in FIG. 42). In the example, the base 514 is a flange plate 518 that may be received in the retention flanges 152 such that the sleeve mount 500 may be slid into the mounting channel 154 and anchor to the breakout bracket 108 (shown in FIG. 43). For example, the flange plate 518 can define opposite slots for receiving the retention flanges 152, or alternatively the edges of the flange plate can be received within corresponding opposing slots defined by a complementary mechanical interface of a mesh sleeve anchoring location (e.g., an anchoring location defined by a breakout).

Additionally, the sleeve mount 500 includes a mechanical interface 520 to secure the clamping piece 510 and the reinforcing insert piece 504 together. In the example, the mechanical interface 436 includes a snap interface that includes a pair of flexible latching arms 522. Furthermore, the sleeve mount 500 may be the sleeve anchor 132 (shown in FIG. 42) at the second end 110 of the fiber routing system 104, and is sized and shaped to be received at the mounting fixture 148 (shown in FIG. 42). As such, the plurality of mesh sleeves 128 extend to the breakout bracket and protects the optical fiber ribbon 120 that extends through the mesh sleeves 128 and through the fiber passage 508 of the sleeve mount 500.

Figure 52:
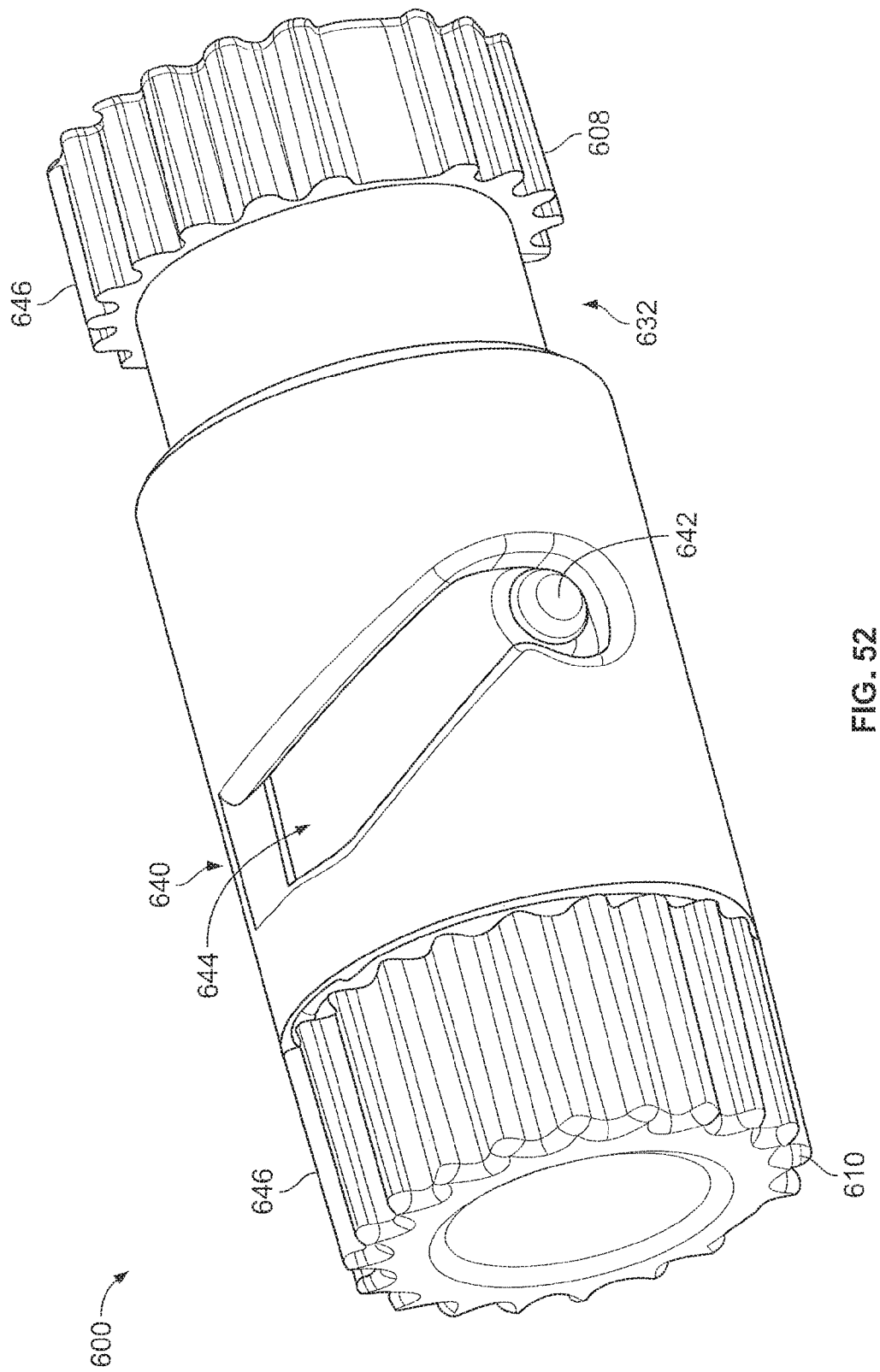
FIG. 52 is a perspective view of a third sleeve anchor for use with the breakout bracket shown in FIGS. 42 and 43 and/or the breakout block shown in FIGS. 44 and 45.
Figure 53:
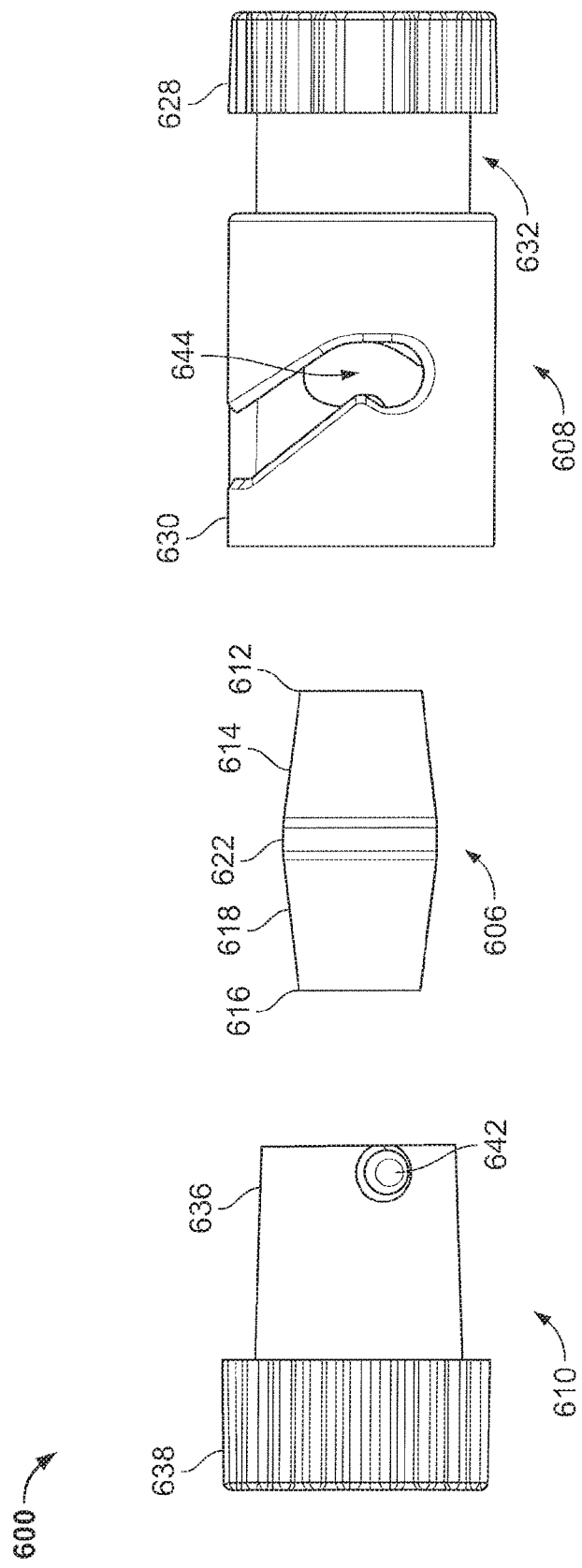
FIG. 53 is an exploded side view of the third sleeve anchor shown in FIG. 52.
Figure 54:
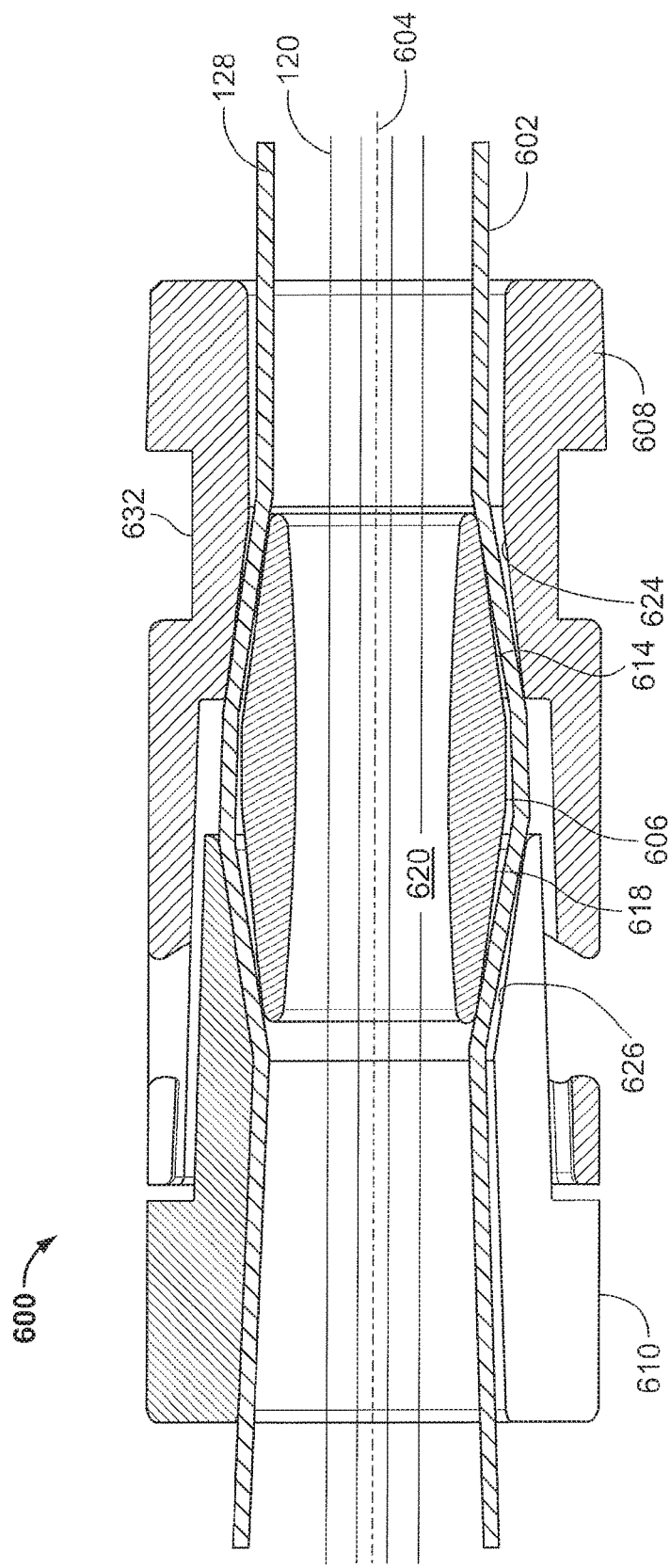
FIG. 54 is a cross-sectional view of the third sleeve anchor shown in FIG. 52.

FIG. 52 is a perspective view of a third sleeve anchor 600 for use with the breakout bracket 108 (shown in FIGS. 42 and 43) and/or the breakout block 200 (shown in FIGS. 44 and 45). FIG. 53 is an exploded side view of the third sleeve anchor 600. FIG. 54 is a cross-sectional view of the third sleeve anchor 600. Referring to FIGS. 52-54, the sleeve anchor 600 is mounted at a sleeve end 602 of the mesh sleeve 128 and extends along a longitudinal axis 604. The sleeve anchor 600 includes a reinforcing insert 606, a first clamping collar 608, and a second clamping collar 610 that radially clamps the sleeve end 602 between the reinforcing insert 606 and the clamping collars 608, 610 and secures the mesh sleeve 128 to the sleeve anchor 600.

The reinforcing insert 606 includes a first end 612 having a first outer tapered section 614 and a second end 616 having a second outer tapered section 618. The reinforcing insert 606 also defines an internal fiber passage 620 of the sleeve anchor 600 that extends through the reinforcing insert 606 from the first end 612 to the second end 616. The reinforcing insert 606 is sized and shaped to fit within the sleeve end 602 of the mesh sleeve 128 such that the entire insert 606 is within the sleeve end 402. The first and second outer tapered sections 614, 618 taper radially outwardly as the first and second outer tapered sections 614, 618 extend toward a central region 622 of the reinforcing insert 606. In some examples, the passage 620 is sized to allow for the optical fiber ribbon 120 to twist within the reinforcing insert 620. In certain examples, the passage 304 to accommodate twisting of at least one twelve-fiber ribbon, or at least two stacked twelve-fiber ribbons, or at least three stacked twelve-fiber ribbons, or at least four stacked twelve-fiber ribbons. In some examples, the passage 620 can accommodate twelve or more stacked twelve-fiber ribbons and can allow for twisting of the ribbon stack.

The first clamping collar 608 mounts over the sleeve end 602 at a location corresponding to the first outer tapered section 614 of the reinforcing insert 606 such that the sleeve end 602 is clamped radially between the first clamping collar 608 and the first outer tapered section 614. The first clamping collar 608 includes a first inner tapered section 624 adapted to nest relative to the first outer tapered section 614 of the reinforcing insert 606.

The second clamping collar 610 also mounts over the sleeve end 602 at a location corresponding to the second outer tapered section 618 of the reinforcing insert 606 such that the sleeve end 602 is clamped radially between the second clamping collar 610 and the second outer tapered section 618. The second clamping collar 610 includes a second inner tapered section 626 adapted to nest relative to the second outer tapered section 618 of the reinforcing insert 606.

The first clamping collar 608 has a first end 628 and a second end 630. The first end 628 of the first clamping collar 608 defines an anchoring feature 632 that is accessible from the outside of the sleeve end 602 when the mesh sleeve 128 is clamped radially between the reinforcing insert 606 and the clamping collars 608, 610. The anchoring feature 632 enables the sleeve anchor 600 to be secured at a sleeve anchoring location, for example, the sleeve anchoring location 146 of the breakout bracket 108 (shown in FIG. 42) and/or the sleeve anchoring locations 208, 216 of the breakout block 200 (shown in FIG. 44). In the example, the anchoring feature 632 includes an annular channel 634 defined in the first clamping collar. The annular channel 634 may be received in the retention flanges 152 such that one or more sleeve anchor 600 may be slid into the mounting channel 154 and anchor to the breakout bracket 108 (shown in FIG. 43). In another example, the annular channel 634 may be received in the sleeve anchoring interface 212, 222 of the breakout block 200 to anchor to the breakout block 200 (shown in FIG. 44).

The second clamping collar 610 includes a first end 636 and a second end 638. The first end 636 is received within the second end 630 of the first clamping collar 608 such that the second clamping collar 610 is secured to the first clamping collar 608 by a mechanical interface 640. In the example, the mechanical interface 640 includes a bayonet interface that includes a pair bayonet pins 642 that radially extend from the first end 636 of the second clamping collar 610, while a pair of corresponding bayonet slots 644 are defined on the circumferential perimeter of the first clamping collar 608 at the second end 630. The bayonet pins 642 are shaped and sized to be received within the bayonet slots 644 to secure the second clamping collar 610 to the first clamping collar 608 and radially clamp the reinforcing insert 606. The first and second clamping collars 608, 610 may also include a textured gripping surface 646 to help facilitate rotating the mechanical interface 640 for a secure fit.

In alternative examples, the mechanical interface 640 between the first and second clamping collars 608, 610 406 can include any other configuration such as a threaded interface or a snap-fit interface.

In the example, the sleeve anchor 600 may be the sleeve anchor 132 (shown in FIG. 42) at the second end 110 of the fiber routing system 104, and is sized and shaped to be received at the mounting fixture 148 (shown in FIG. 42). As such, the mesh sleeve 128 extends to the breakout bracket and protects the optical fiber ribbon 120 that extends through the mesh sleeve 128 and through the fiber passage 620 of the sleeve anchor 600. Additionally, the sleeve anchor 600 may be the sleeve anchor 214, 222 (shown in FIGS. 44 and 45) of the breakout block 200.

Figure 55:
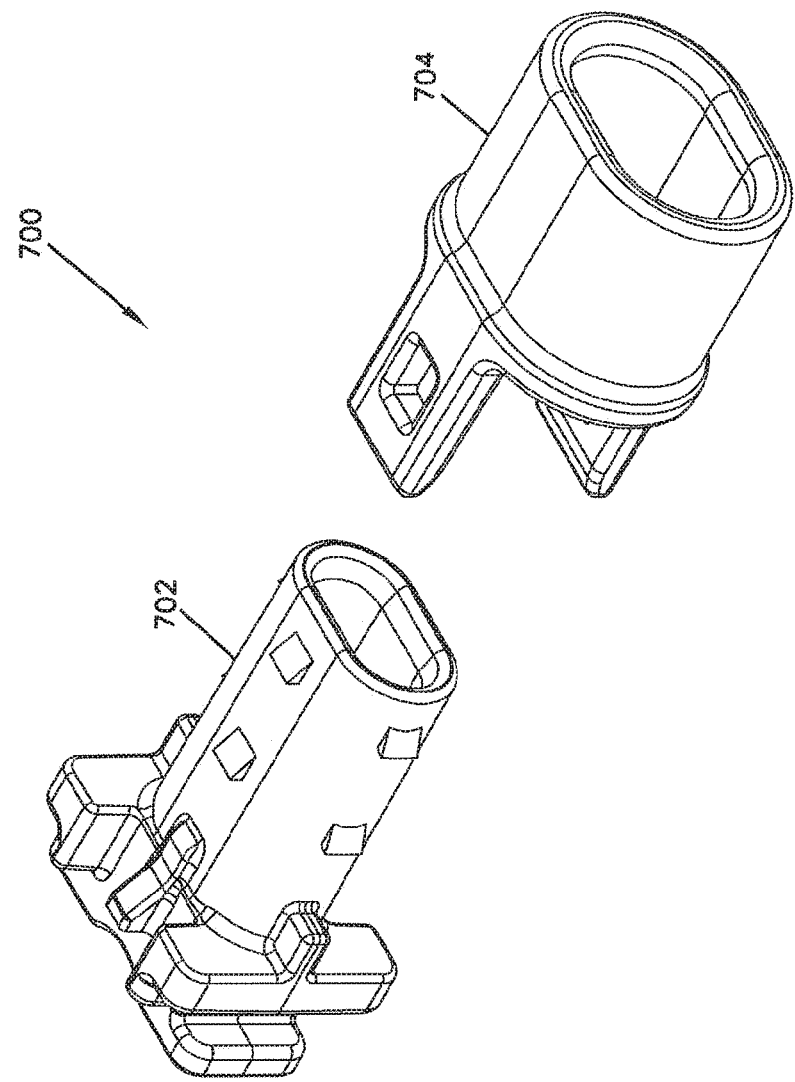
FIG. 55 is an exploded perspective view of a fourth sleeve anchor for use with the breakout bracket shown in FIGS. 42 and 43 and/or the breakout block shown in FIGS. 44 and 45.
Figure 56:
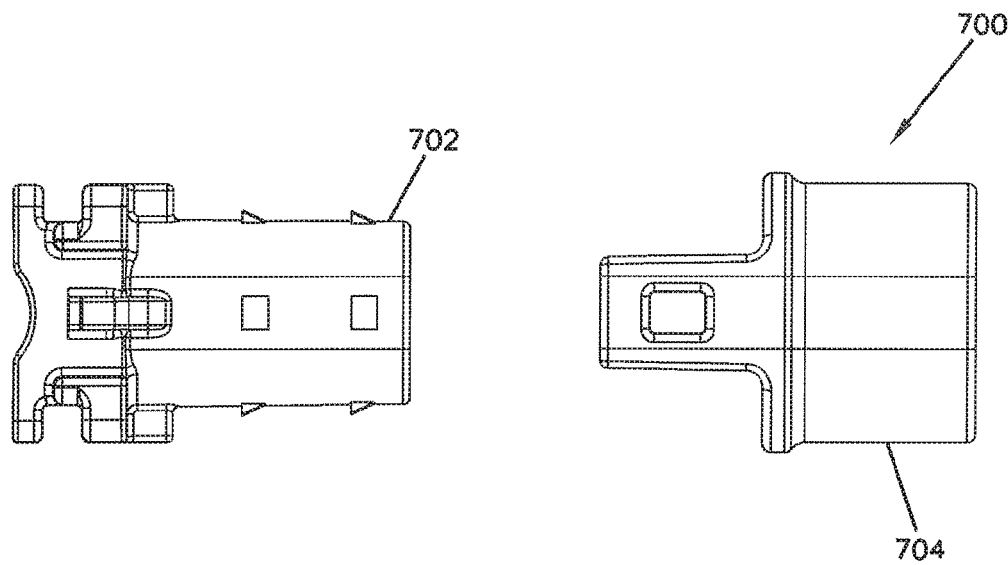
FIG. 56 is an exploded side view of the fourth sleeve anchor shown in FIG. 55.
Figure 57:
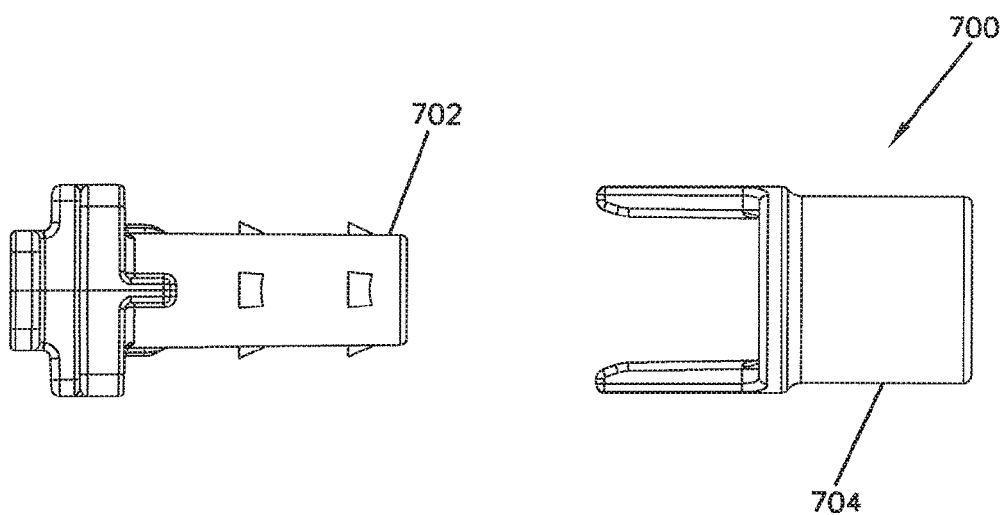
FIG. 57 is another exploded side view of the fourth sleeve anchor shown in FIG. 55

FIG. 55 is an exploded perspective view of a fourth sleeve anchor 700 for use with the breakout bracket 108 (shown in FIGS. 42 and 43) and/or the breakout block 200 (shown in FIGS. 44 and 45). FIG. 56 is an exploded side view of the fourth sleeve anchor 700. FIG. 57 is another exploded side view of the fourth sleeve anchor 700. Referring to FIGS. 55-57, the sleeve anchor 700 is similar to the sleeve anchor 400 (shown in FIGS. 48-50) and is mounted at a sleeve end of a mesh sleeve. For example, the sleeve anchor 700 includes a reinforcing insert 702 and a clamping collar 704 that radially clamps the sleeve end therebetween and secures the mesh sleeve to the sleeve anchor 700. However, in this example, the reinforcing insert 702 has a non-circular cross-sectional profile (e.g., a flattened profile that is longer along a major axis as compared to a minor axis) and the clamping sleeve 704 within an inner non-circular cross-sectional profile that matches/complements the non-circular cross-sectional profile of the reinforcing insert 702. By flattening the profile of the sleeve anchor 700, the overall height of the sleeve anchor 700 along the minor axis is reduced, thus allowing more sleeve anchors to be received at the breakout bracket 108 and/or reduce the size of the breakout bracket 108 and the breakout block 200.

Figure 58:
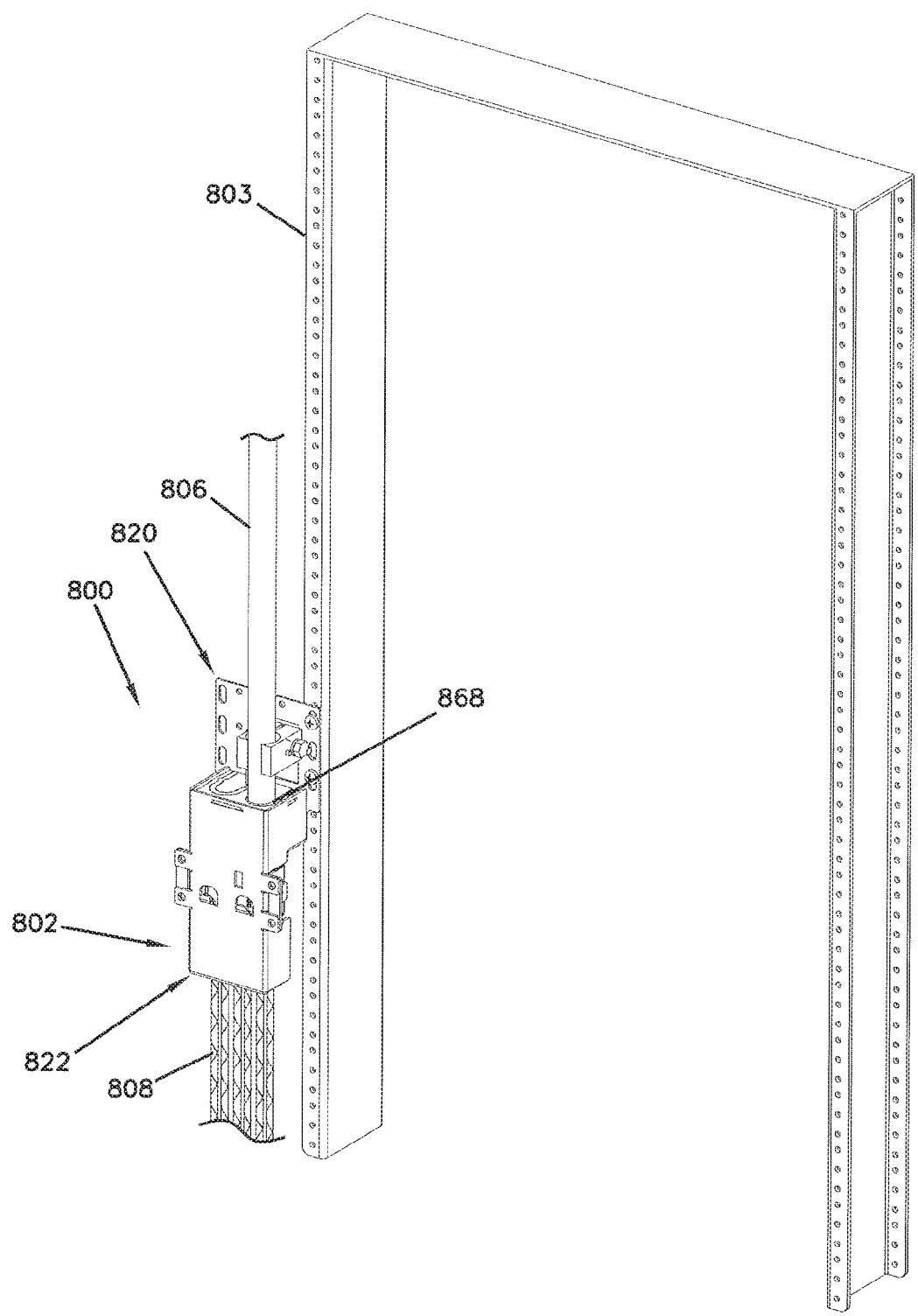
FIG. 58 depicts a fiber routing system in accordance with the principles of the present disclosure, the fiber routing system includes a cable breakout assembly shown attached to a telecommunications rack.

FIG. 58 depicts a fiber routing system 800 in accordance with the principles of the present disclosure. The fiber routing system 800 includes a cable breakout assembly 802 shown fastened to a telecommunications component such as a telecommunications rack 803 (i.e., a telecommunications frame). The cable breakout assembly 802 is configured for breaking out (i.e., fanning out) optical fibers such as optical fiber ribbons 804 (see FIG. 59) from a fiber optic cable 806 to a plurality of protective mesh sleeves 808. The protective mesh sleeves 808 have first ends 810 secured within a sleeve anchor 812 and second ends (not shown) that can be routed to a piece of fiber optic equipment such as the fiber management chassis 100 of FIG. 40. The sleeve anchor 812 is configured to accommodate a plurality of the protective mesh sleeves 808. The protective mesh sleeves 808 can be arranged in a row within the sleeve anchor 812. In the depicted example, the sleeve anchor 812 has a rectangular modular or cassette-like configuration. Openings 814 are defined by the sleeve anchor 812 for allowing the optical fiber ribbons 804 to be fed through the sleeve anchor 812 and into the protective mesh sleeves 808. The cable breakout assembly 802 includes a cable anchoring location 816 at which an end of the fiber optic cable 806 is secured and a sleeve anchor mounting location 818 for mounting the sleeve anchor 812. The cable anchoring location 816 and the sleeve anchor mounting location 818 are relatively positioned such that the optical fiber ribbons 804 can be readily routed from the end of the fiber optic cable 806 to the openings 814 of the sleeve anchor 812 when the sleeve anchor 812 is mounted at the sleeve anchor mounting location 818. It will be appreciated that the sleeve anchor mounting location 818 is sized to receive a plurality of the sleeve anchors 812 to accommodate the optical fibers of additional fiber optic cables and/or fiber optic cables having higher fiber counts. In certain examples, the sleeve anchors 812 can stack relative to one another and can include mating features that mate when the sleeve anchors 812 are stacked so as to ensure alignment between the stacked sleeve anchors 812.

The cable breakout assembly 802 includes a breakout bracket 820 and a breakout cover 822 that can be secured to the breakout bracket 820. The breakout bracket 820 includes a main plate portion 824 including a first section 826 corresponding to the cable anchoring location 816, a second section 828 corresponding to the sleeve anchor mounting location 818, and an offset section 830 that extends transversely between the first and second sections 826, 828. The offset section 830 forwardly offsets the second section 828 from the first section 826. The first section 826 of the main plate portion 824 defines fastener openings 832 for receiving fasteners 834 used to secure the breakout bracket 820 to the telecommunications rack 803.

The breakout bracket 820 also includes a cable anchoring flange 836. The cable anchoring flange 836 projects forwardly from the first section 826 of the main plate portion 824. In certain examples, the cable anchoring flange 836 can include features for facilitating mounting a cable anchoring device (e.g., straps, clamps, tie wraps, etc.) thereto. Example structures can include openings, snap-fit structures, loops, channels, rails, and other structures. In the depicted example, a cable clamp 838 is shown secured to the cable anchoring flange 836 by fasteners 840. The cable clamp 838 is depicted as including first and second half-yokes 842 that are drawn together by fasteners 840 to clamp the fiber optic cable 806 in place. The fasteners 840 also secure the clamp 830 to the flange 836. The half-yokes 842 cooperate to define an opening 843 in which the fiber optic cable 806 is clamped. Other types of clamps such as strap clamps or band clamps could also be used. The cable clamp 838 and the cable anchoring flange 836 forwardly offset the fiber optic cable 806 from the first section 826 of the main plate portion 824. It will be appreciated that the offset section 830 forwardly offsets the sleeve anchoring mounting location 818 to facilitate routing the optical fiber ribbons 804 from the end of the fiber optic cable 806 to the openings 814 of the sleeve anchor 812 without requiring substantial bending of the optical ribbons 804.

In certain examples, a grommet or other type of insert can be included with the cable clamp 838 to allow the cable clamp 838 to accommodate cables of different diameters and cross-sectional shapes.

The breakout bracket 820 further includes oppositely positioned sidewalls 844 that project forwardly from the second section 828 of the main plate portion 824. The sidewalls 844 cooperate to define a receptacle 846 at the sleeve anchor mounting location 818 for receiving one or more of the sleeve anchors 812. The sidewalls 844 define parallel rails 848 adapted to slideably interface with corresponding channels 850 defined by minor sides of the sleeve anchor 812. The rails 848 and channels 850 provide a slidable mechanical interface that allows the sleeve anchor 812 to be slidably loaded and mounted into the receptacle 846. Interference between the rails 848 and the channels 850 prevents upward or downward movement of the sleeve anchor 812 when the sleeve anchor 812 is mounted within the receptacle 846. The sidewalls also include centrally located cover alignment channels 852 as well as front flanges 854. The front flanges 854 define fastener openings 856.

The breakout cover 822 is adapted to mount over the front side of the breakout bracket 820 and forms a protective housing for covering the end of the fiber optic cable 806 and the sleeve anchor 812 or anchors mounted at the cable anchoring location 816. In certain examples, the breakout cover 822 can block an open front side of the receptacle 846 of the sleeve anchor mounting location 818 when the cover 822 is mounted to the breakout bracket 820. In this way, the breakout cover 822 can block the front open side of the receptacle 846 to prevent the sleeve anchor 812 or anchors from being displaced forwardly from the receptacle 846.

Figure 59:
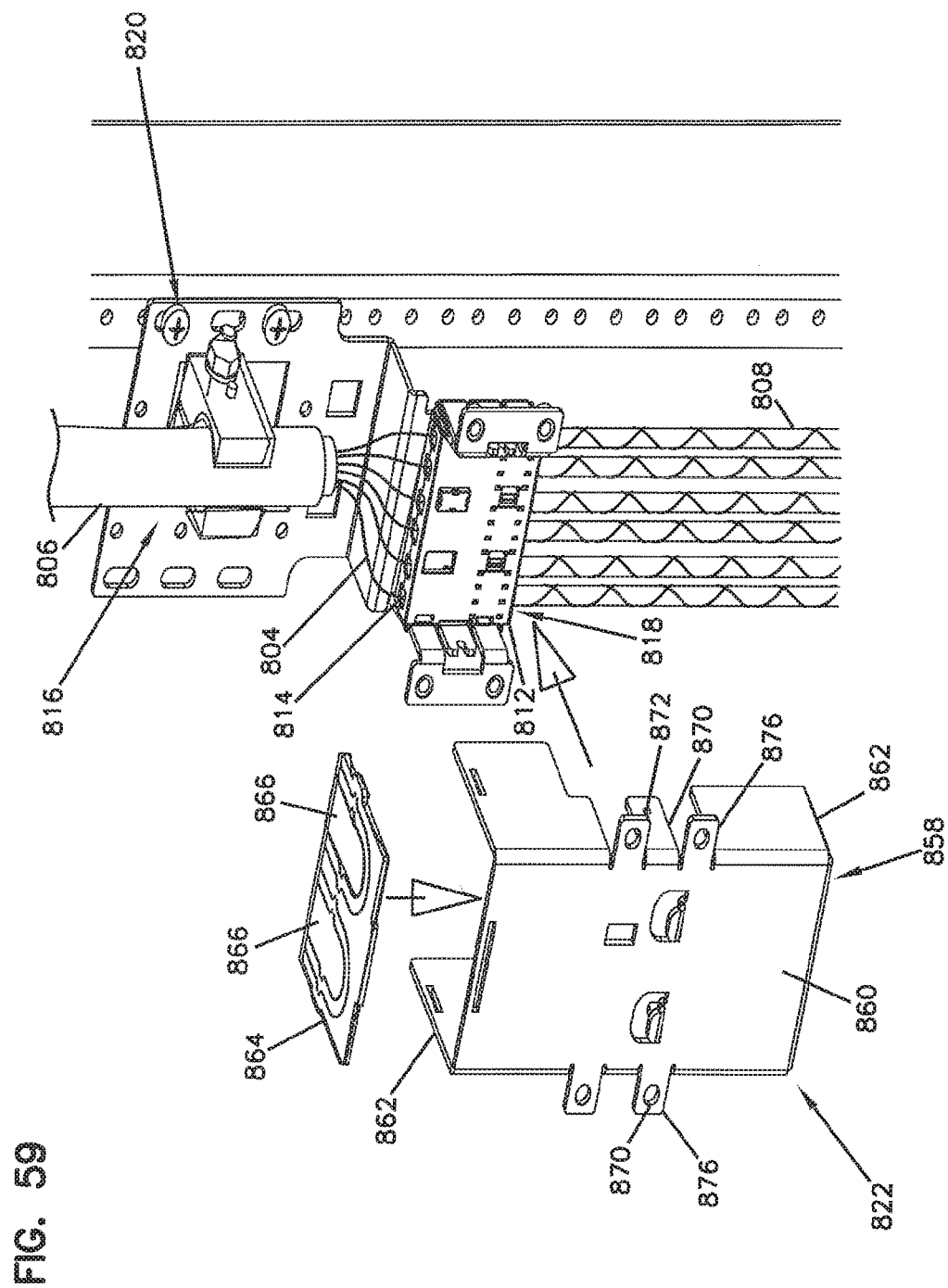
FIG. 59 is an enlarged view of the cable breakout assembly of FIG. 58 with a cover of the breakout assembly exploded outwardly from a breakout bracket of the breakout assembly.

Referring to FIG. 59, the breakout cover 822 includes a main cover piece 858 having a front wall 860 and opposite sidewalls 862. The main cover piece 858 defines an open back side. A top cover plate 864 mounts to a top end of the main cover piece 858. The top cover plate 864 defines knock-outs 866 that can be removed such that the top cover plate 864 can define an opening or openings for receiving a cable or cables. As shown at FIG. 58, one of the knock-outs 866 has been removed such that the top cover plate 864 defines an opening 868 for receiving the fiber optic cable 806. The sidewalls 862 include rearwardly extending guides 870 that fit within the cover alignment channels 852 of the sidewalls 844 when the breakout cover 822 is installed on the breakout bracket 820. The interface between the guides 870 and the channels 850 assist in properly positioning and aligning the breakout cover 822 relative to the breakout bracket 820. In certain examples, the guides 870 can include dimples 872 that fit within corresponding openings 874 within arms 876 of the sidewalls 844. The breakout cover 822 also includes mounting tabs 876 defining fastener openings 878 that align with the fastener openings 856 of the breakout bracket 820 when the breakout cover 822 is mounted to the breakout bracket 820. Fasteners such as bolts or screws can be installed through the fastener openings 870, 856 to secure the breakout cover 822 to the breakout bracket 820.

Figure 61:
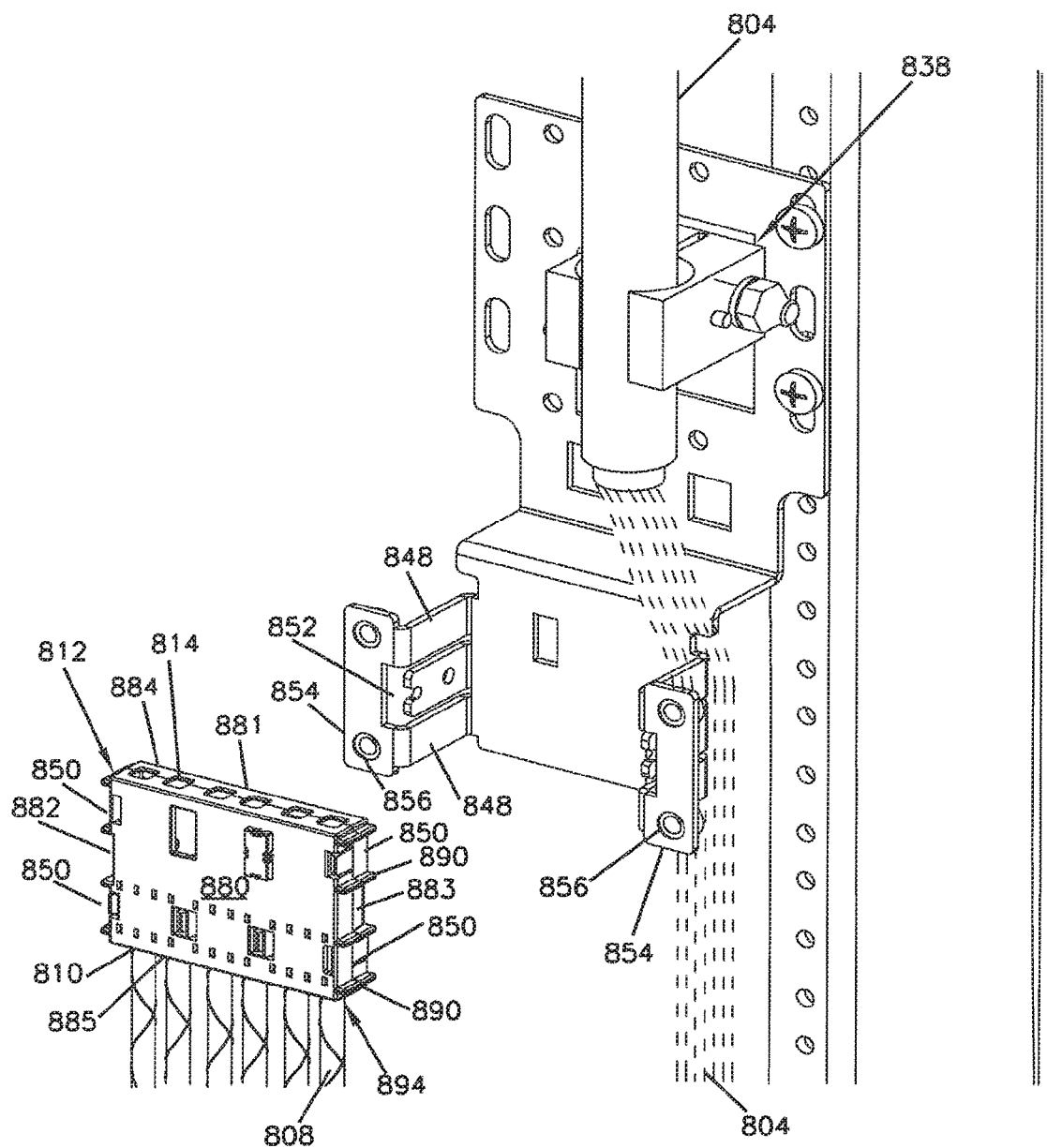
FIG. 61 shows the breakout bracket of FIGS. 59 and 60 with a fiber optic cable clamped at the cable mounting location and with optical fiber ribbons of the fiber optic cable positioned at a stowed location in which the optical fiber ribbons are offset from a sleeve anchor mounting location of the breakout bracket.

Referring to FIG. 61, the sleeve anchor 812 can include a generally rectangular or block-like configuration. In certain examples, the sleeve anchor 812 can be referred to as an anchoring cassette. As depicted, the sleeve anchor 812 is adapted for securing the ends of plurality of the protective mesh sleeves 808 (e.g., as depicted the sleeve anchor 812 accommodates six of the protective mesh sleeves 808 which typically each accommodate two 12-fiber optical ribbons). The sleeve anchor 812 can include opposite major sides 880, 881; opposite minor sides 882, 883; and opposite minor ends 884, 885. The minor end 884 can be an upper end and can define the openings 814 for receiving the optical ribbons 804. The minor end 885 can be a lower end defining openings for 886 for receiving the protective mesh sleeves 808. The sleeve anchor 812 can include parallel internal channels 887 that extend and are aligned between the openings 814, 886. The channels 850 adapted to interface with the rails 848 of the sleeve anchor mounting location 818 are positioned at the minor sides 882, 883. The channels 850 extend between the major sides 880, 881 and are defined between rails 890 that project outwardly from the minor sides 882, 883.

The major sides 880, 881 each include a projection 891 and a receptacle 892. It will be appreciated that in certain examples, it may be desirable to stack multiple sleeve anchors 812 together in a stack. When two of the sleeve anchors 812 are stacked together, the projections 891 and receptacles 892 of the sleeve anchors 812 mate together to ensure proper alignment between the stacked sleeve anchors 812. For example, the projection 891 of a first one of the sleeve anchors 812 fits within the receptacle 892 of a second one of the sleeve anchors 812, and the projection 891 of the second one of the sleeve anchors 812 is received within the receptacle 892 of the first one of the sleeve anchors 812.

Figure 62:
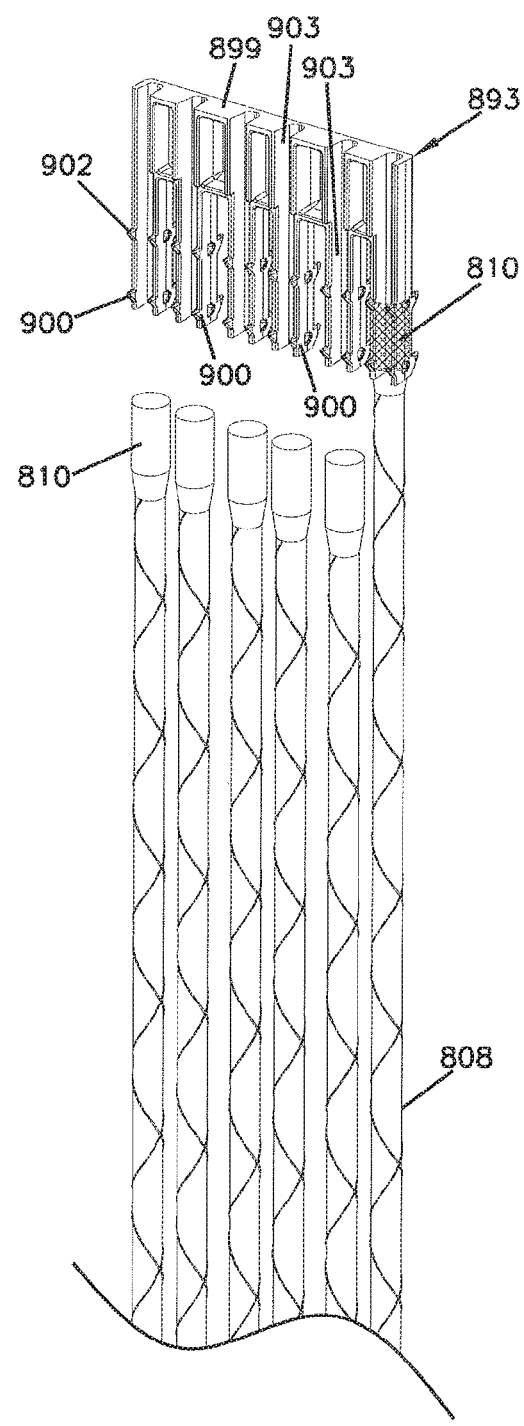
FIG. 62 is a perspective view showing a reinforcing insert of a sleeve anchor in accordance with the principles of the present disclosure, mesh tubes having end portions adapted to receive insert portions (e.g., tines, projections, extensions, etc.) of the reinforcing insert are depicted coaxially aligned with their corresponding insert portion.
Figure 63:
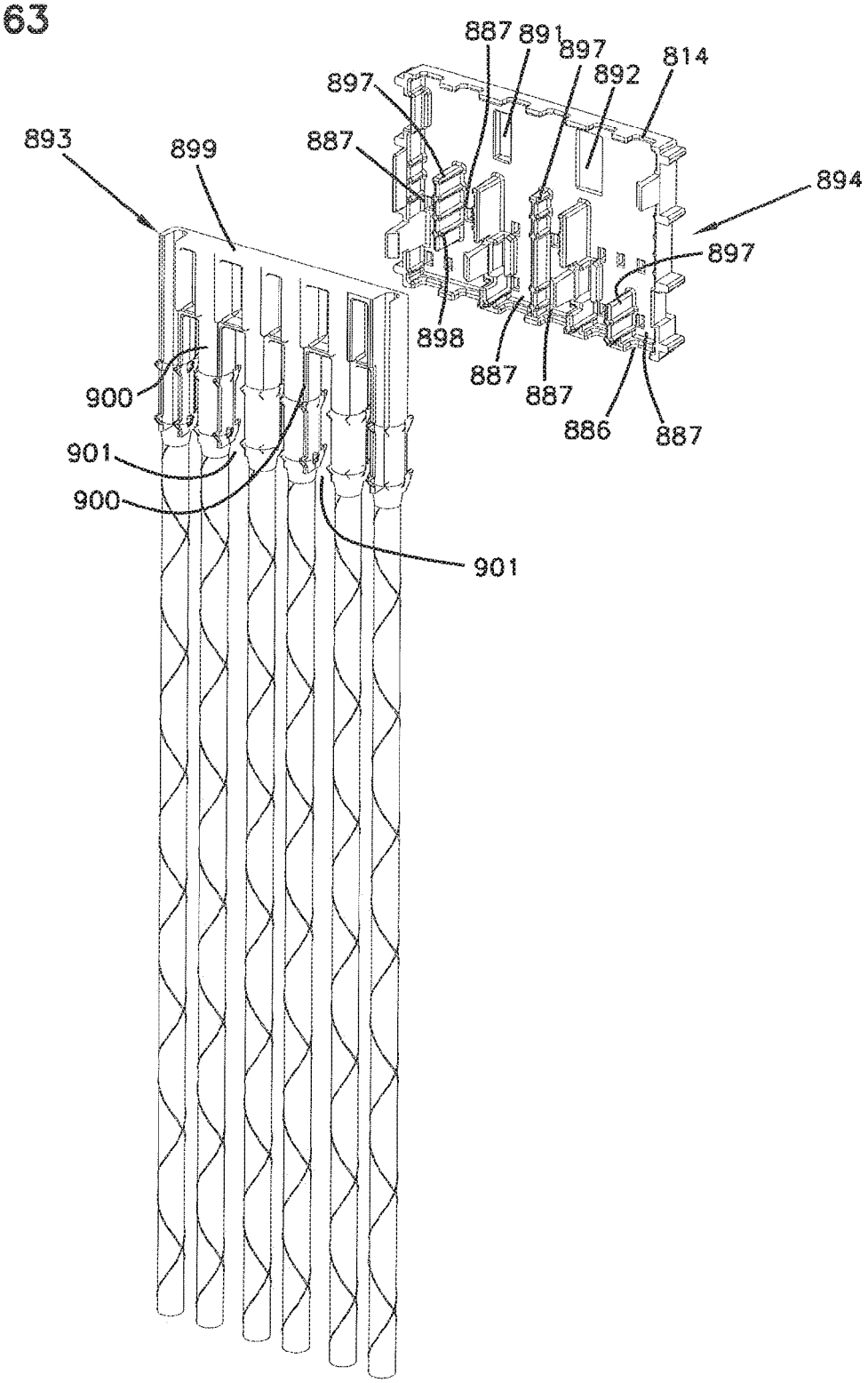
FIG. 63 shows the reinforcing insert of FIG. 62 with the ends of the mesh sleeves inserted over the insert portions and with a half-piece of a clamping housing of the sleeve anchor positioned to receive the reinforcing insert.
Figure 64:
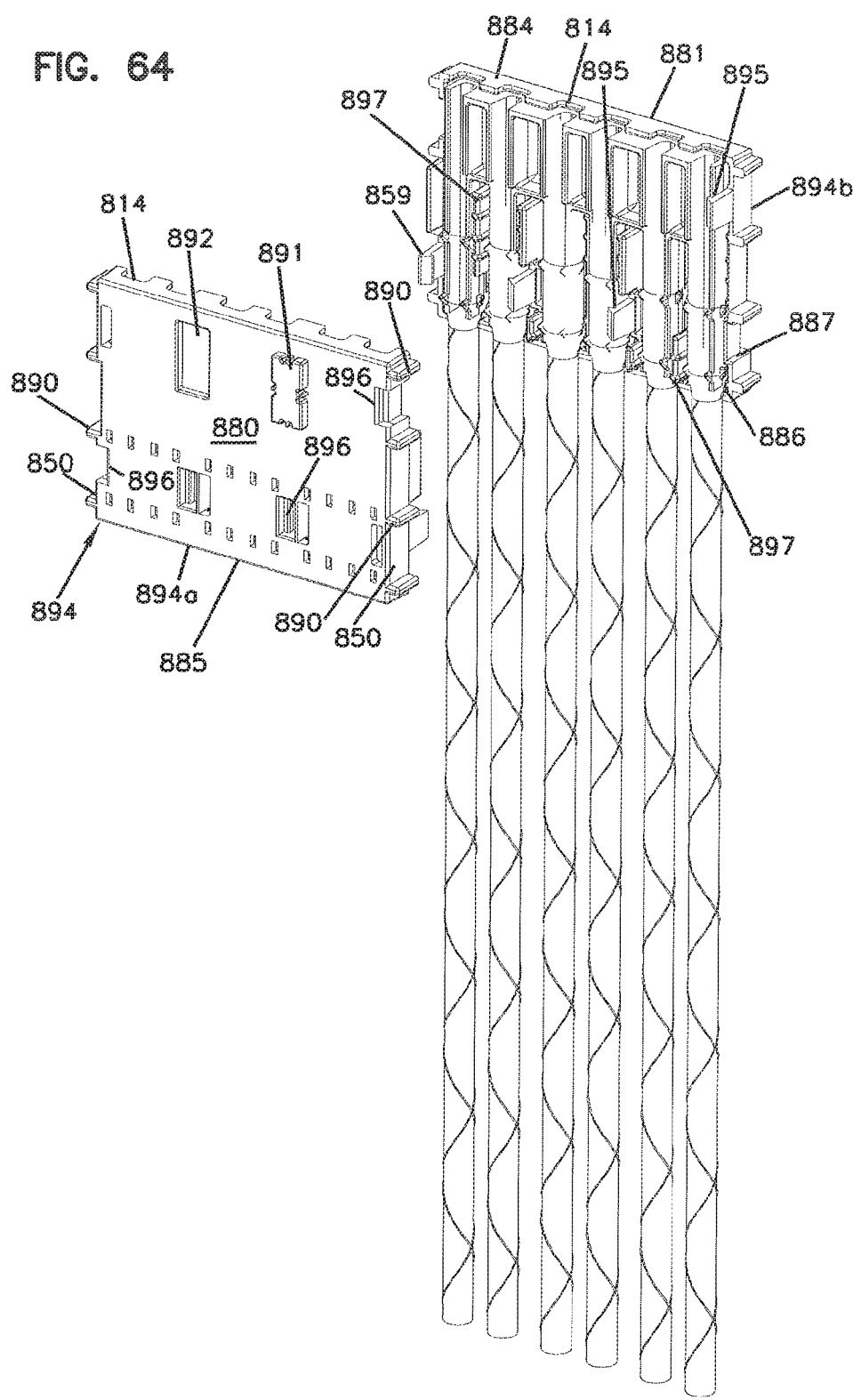
FIG. 64 depicts the half-piece of the clamping housing with the reinforcing insert mounted therein and with a second half-piece of the clamping housing positioned in alignment with the assembled first half-piece and the reinforcing insert.
Figure 65:
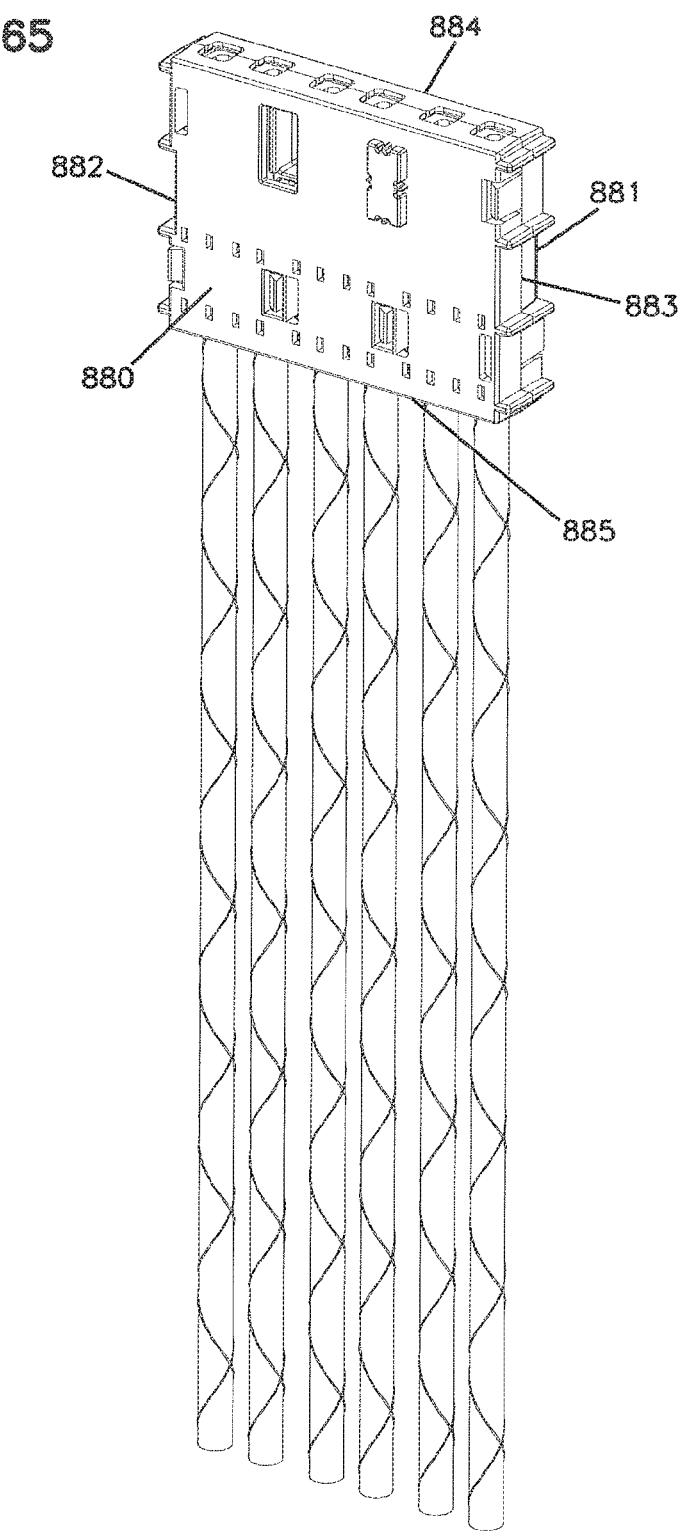
FIG. 65 depicts the sleeve anchor of FIG. 64 with the first and second half-pieces of the clamping housing fastened together such that the sleeve anchor is captured between the two half-pieces and the ends of the mesh sleeves are clamped between the insert portions of the reinforcing insert and the clamping housing.

Referring to FIGS. 62-64, the sleeve anchor 812 includes a reinforcing insert 893 that mounts within a clamping housing 894. The clamping housing 894 is defined by mating clamping housing pieces 894a, 894b that respectively define the major sides 880, 881 of the sleeve anchor 812 and cooperatively define the minor sides 882, 883 and minor ends 884, 885 of the sleeve anchor 812. In certain examples, the clamping housing pieces 894a, 894b are half-pieces and each has an identical construction. In certain examples, clamping housing pieces 894a, 894b can be secured together by a snap-fit interface. As depicted, the snap-fit interface can include flexible latches 895 that interlock with corresponding catches 896. The clamping housing pieces 894a, 894b also cooperatively define the openings 814 at the minor end 884 and the openings 886 at the minor end 885. The clamping housing pieces 894a, 894b also include internal dividers 897 (i.e., walls, barriers, etc.) that cooperate to define the internal channels 887 of the sleeve anchor 812. It will be appreciated that the dividers 897 extend only partially between the minor ends 884, 885 and thus the internal channels 887 extend only partially between the opposite minor ends 884, 885. In certain examples, the dividers 897 can include retaining ribs 898 that project from the dividers 897 to facilitate securing the protective mesh sleeves 808 in the internal channels 887. In the depicted example, the ribs 898 are arranged generally perpendicular relative to the major sides 880, 881.

Referring to FIG. 62, the reinforcing insert 893 includes a base portion 899 and a plurality of insert portions 900 that project from the base portion 899. In the depicted example, insert portions 900 include base ends that are integrally (e.g., unitarily) connected with a base portion 899. In one example, the reinforcing insert 893 is manufactured as one-piece molded plastic part. The insert portions 900 can also be referred to as projections, tines, extensions or like terms. The insert portions 900 are separated from one another by spacings 901 and are adapted to be received within the first ends 810 of the protective mesh sleeves 808. In certain examples, the insertion portions 900 can include retention features that project outwardly from the insertion portions 900. Example retention features can include barbs 902 adapted to embed within the mesh of the protective mesh sleeves 808 when the first ends 810 of the protective mesh sleeves 808 are mounted over the insert portions 900. The reinforcing insert 893 also defines fiber passages 903 for receiving the optical fiber ribbons 804 as the optical fiber ribbons 804 are routed between the openings 814, 886 through the sleeve anchor 812 to the protective mesh sleeves 808. The fiber passages 903 are shown passing through each of the insert portions 900. Additionally, each of the fiber passages 903 has a portion that extends through the base portion 899 of the reinforcing insert 893.

Referring to FIGS. 63 and 64, the reinforcing insert 893 is adapted to nest within the clamping housing 894 so as to be captured between the clamping housing pieces 894a, 894b. In certain examples, the insertion portions 900 are adapted to fit within the internal channels 887 defined by the dividers 897 and the base portion 899 fits within a region of the interior of the clamping housing 894 that is free of dividers 897. During installation of the fiber routing system 800, the first ends 810 of the protective mesh sleeves 808 are initially inserted over the insert portions 900 of the reinforcing insert 893 as shown at FIG. 63. As so installed, the barbs 902 can assist in temporarily retaining the first ends 810 of the protective mesh sleeves 808 on the insert portions 900. The reinforcing insert 893 is then loaded into the clamping housing piece 894b as shown at FIG. 64. As so loaded, the first ends 810 of the mesh sleeves 808 are positioned between the insert portion 900 and the dividers 897. The clamping housing piece 894a is then secured to the clamping housing piece 894b (e.g., by a snap-fit connection) such that the first ends 810 of the protective mesh sleeves 808 are clamped within the internal channels 887. As so assembled, the protective mesh sleeves 808 exit the sleeve anchor 812 through the openings 886 at the minor end 885. The fiber passages 903 align with the openings 814 at the minor end 884 of the sleeve anchor 812 and the fiber passages 903 are also in communication with internal passages of the protective mesh sleeves 808 which extend through the openings 886.

In certain examples, the sleeve anchor 812 can be secured to the sleeve anchor mounting location 818 by various mechanical means such as sliding interfaces, mating rails and channels, snap-fit connections, fastener-based connections, flanges, fastener openings for receiving fasteners for allowing attachment of the sleeve anchor, latches, catches, hooks, straps, clamps and the like. In certain examples, the sleeve anchor can be adapted for connection to a breakout bracket or other type of telecommunications component. In other examples, sleeve anchors in accordance with the principles of the present disclosure can be adapted for connection directly to a cable. For example, sleeve anchors can be clamped or otherwise secured to fiber optic cables to provide fiber breakout locations at the ends of the fiber optic cables. Example cable-mounted sleeve anchors are disclosed by U.S. Provisional Patent Application No. 62/523,050 which was filed on Jun. 21, 2017, and which is hereby incorporated by reference in its entirety.

Figure 60:
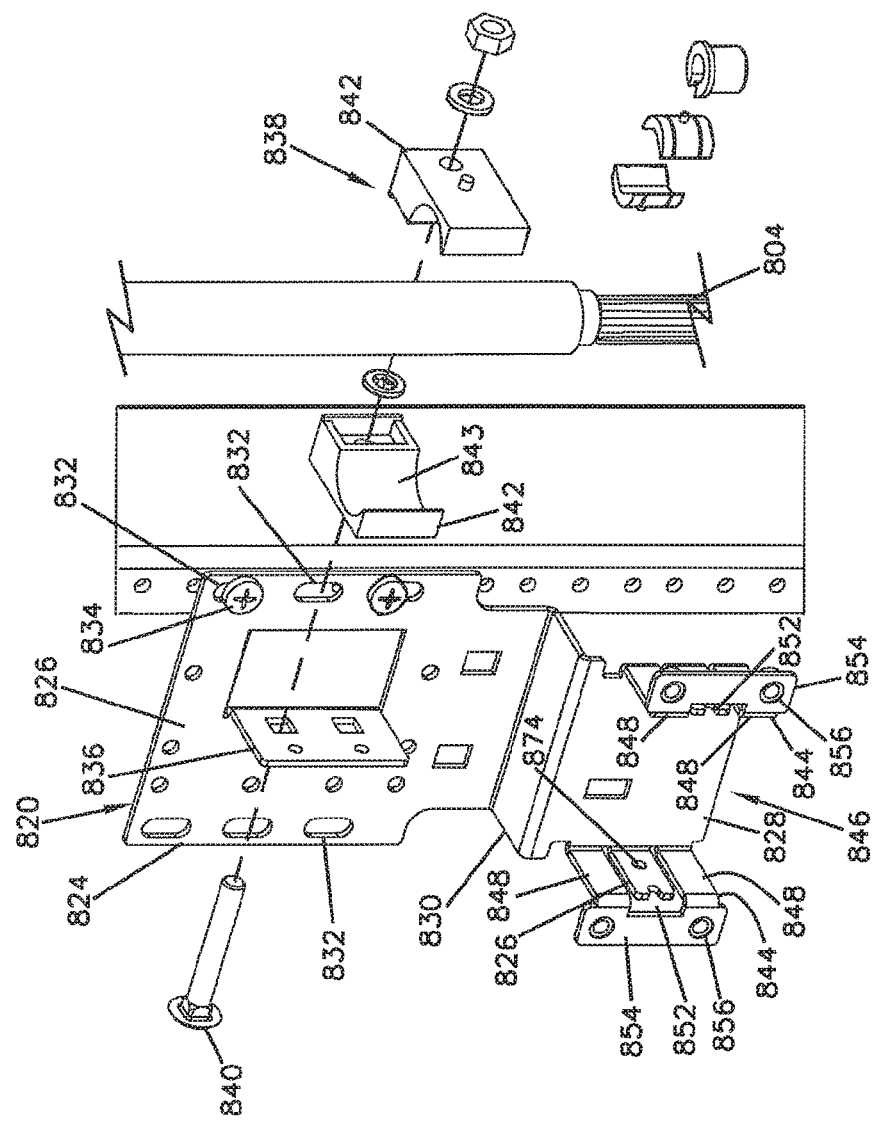
FIG. 60 is an exploded view showing a cable clamp that is fastened to a cable mounting location of the breakout bracket of FIG. 59.
Figure 66:
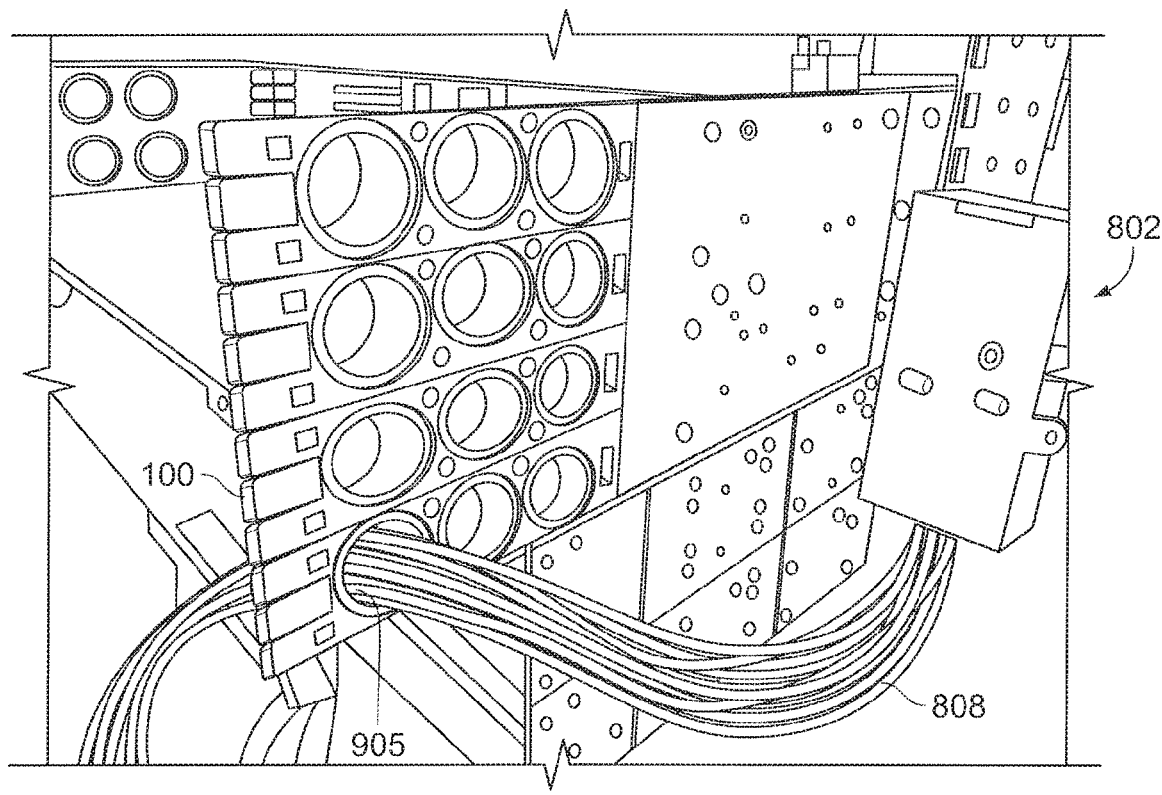
FIG. 66 shows the breakout assembly of FIG. 48 with the mesh tubes routed from the breakout assembly to a port at the side of a fiber management chassis such as the fiber management chassis of FIG. 40.
Figure 67:
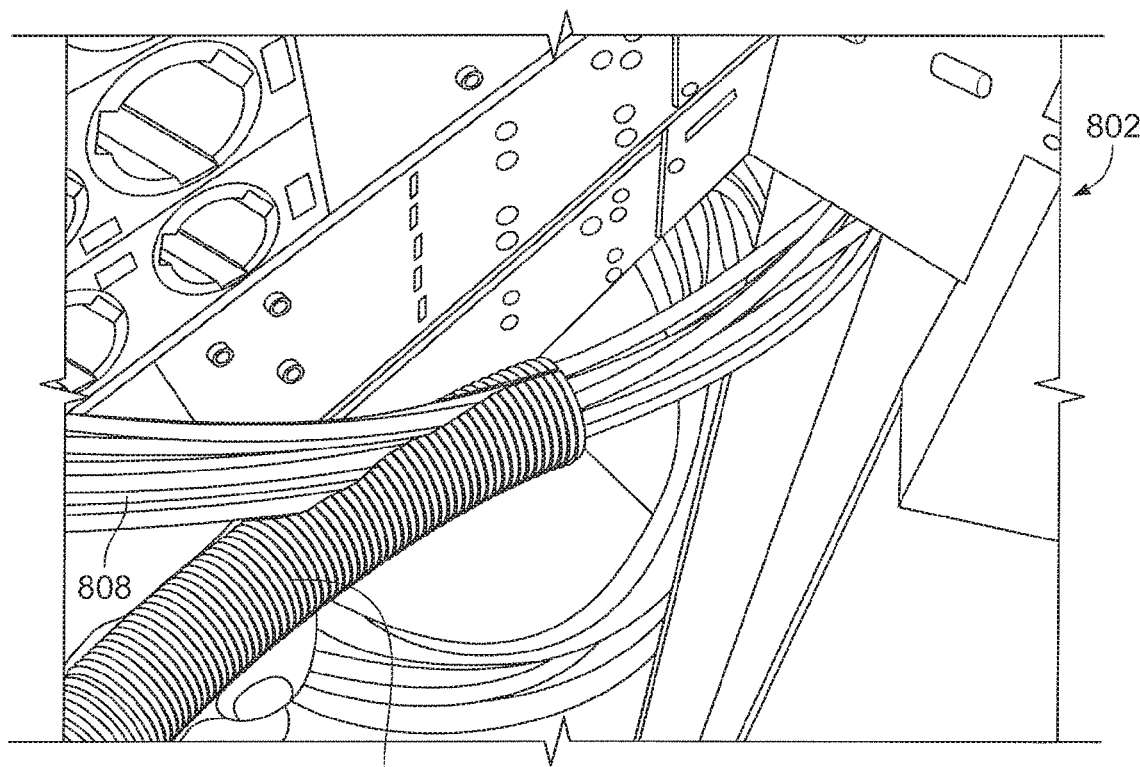
FIG. 67 shows a corrugated tube being mounted over the mesh sleeves of FIG. 66 in the region between the breakout assembly and the side port of the fiber management chassis.
Figure 68:
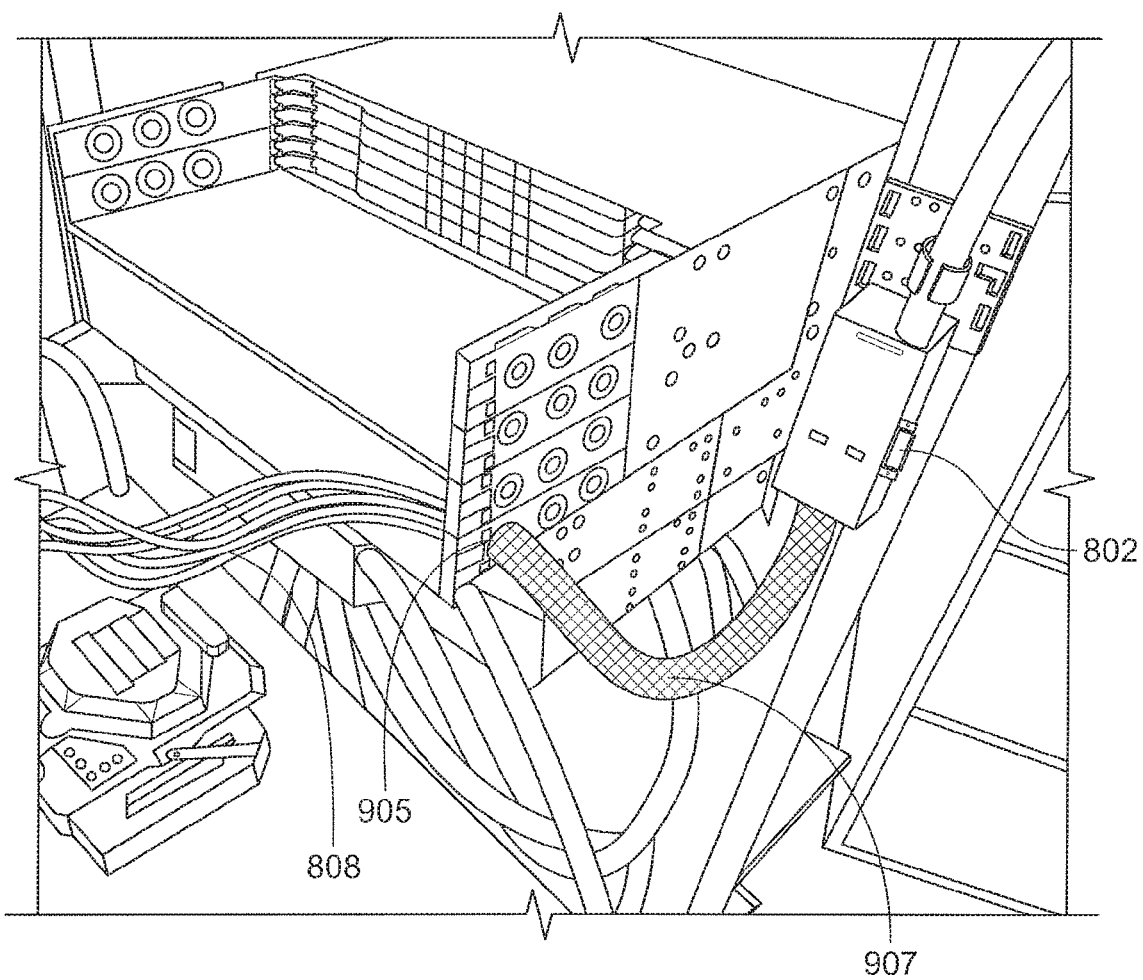
FIG. 68 shows the corrugated tube of FIG. 67 mounted over the mesh sleeves in the region between the breakout assembly and the port adjacent the fiber management chassis, the corrugated tube has one end secured to the breakout assembly and an opposite end secured to the port at the fiber management chassis.

To install the fiber routing system 800, the breakout bracket 820 is initially fastened to a piece of telecommunications equipment such as a post of a telecommunications rack. The fiber optic cable 806 is prepared by stripping away the outer jacket to expose extended lengths of the optical fiber ribbons 804. The prepared cable 806 is then secured to the cable anchoring location 816 by the cable clamp 838 as shown at FIGS. 60 and 61. Preferably, the exposed optical fiber ribbons 804 are routed to an offset location from the sleeve anchor mounting location 818 as shown at FIG. 61. This way, the optical fiber ribbons 804 do not interfere with installation of the sleeve anchor 812. During the installation process, the first ends 810 of the protective mesh sleeves 808 are secured within the sleeve anchor 812 as previously described. The sleeve anchor 812 with the mesh sleeves 808 secured thereto can be loaded into the sleeve anchor mounting location 818 as shown at FIG. 59. Ends of the protective mesh sleeves 808 that are opposite from the first ends 810 can be routed to a given piece of telecommunications equipment desired to be coupled to one or more of the optical fiber ribbons 804. For example, as shown at FIG. 66, the mesh sleeves 808 are routed from the cable breakout assembly 802 to a port 905 corresponding to a piece of telecommunications equipment such as one of the fiber management chassis 100 including cassette modules 106. With the sleeve anchor 812 mounted at the sleeve anchor mounting location 818, the optical fiber ribbons 804 can be directed through the openings 814 of the sleeve anchor 812 and through the fiber passages 903 of the reinforcing insert 893 so as to be fed into and through the protective mesh sleeves 808. Once the optical fiber ribbons 804 have been fed into their respective protective sleeves 808, the breakout cover 822 can be mounted over the breakout bracket 820 to cover the cable anchoring location 816 and the sleeve anchor mounting location 818. Prior to installing the breakout cover 822, one of the knock-outs 866 can be removed from the top cover plate 864 such that the top cover plate 864 defines an opening 868 for receiving the fiber optic cable 806. In certain examples, a length of slitted corrugated tubing 907 can be installed over the portions of the protective mesh sleeves 808 routed from the cable breakout assembly 802 to the port 905. In certain examples, tube grommets can be used to secure the ends of the slit-corrugated tube 907 to the cable breakout assembly 802 and to the port 905.

In certain examples, the fiber routing system 800 can be sold as a cable breakout kit. The cable breakout kit can include various components packaged together in a package such as a bag or a box. The kit can include the cable breakout assembly 802, a plurality of protective mesh sleeves 808, one or more sleeve anchors 812, a length of the slitted corrugated tubing 907, tubing grommets, cable grommets, the cable clamp 838, tie wraps, the inserts 300 for installing the opposite ends of the mesh sleeves 808 to pieces of telecommunications equipment, and various fasteners for coupling the various components to other pieces of telecommunications equipment or to each other.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Inventive aspects of the disclosure are further listed below.

First inventive aspect: A fiber routing system comprise a mesh sleeve having a sleeve end; and a sleeve anchor that mounts at the sleeve end, the sleeve anchor including: a reinforcing insert including at least an insert portion that fits within the sleeve end of the mesh sleeve, the reinforcing insert defining a fiber passage of the sleeve anchor that extends through the reinforcing insert that is configured to receive at least one optical fiber routed therethrough; and a clamping housing that mounts over the sleeve end such that the sleeve end is clamped between the clamping housing and the insert portion of the reinforcing insert.

Second inventive aspect: The first inventive aspect, wherein the insert portion of the reinforcing insert includes outer projections that embed within the mesh sleeve when the sleeve end is clamped between the clamping housing and the insert portion.

Third inventive aspect: The second inventive aspect, wherein the outer projections include barbs.

Fourth inventive aspect: Any of the first through third inventive aspects, wherein the mesh sleeve is one of a plurality of mesh sleeves having sleeve ends, wherein the reinforcing insert includes a base, wherein the insert portion of the reinforcing insert is one of a plurality of insert portions that are coupled to the base portion and that project outwardly from the base portion, wherein the insert portions fit within the sleeve ends, and wherein the sleeve ends are clamped between the insert portions and the clamping housing.

Fifth inventive aspect: The fourth inventive aspect, wherein the insertion portions are arranged in a row.

Sixth inventive aspect: Any of the first through fifth inventive aspects, wherein the clamping housing has a one-piece construction.

Seventh inventive aspect: Any of the first through sixth inventive aspects, wherein the reinforcing insert includes means for anchoring the sleeve anchor to a bracket or a cable.

Eighth inventive aspect: The seventh inventive aspect, wherein the means for anchoring includes oppositely positioned channels positioned outside the clamping housing.

Ninth inventive aspect: Any of the first through fifth inventive aspects, wherein the clamping housing includes multiple pieces that are secured together around the insert portion or insert portions.

Tenth inventive aspect: The ninth inventive aspect, wherein the clamping housing include two housing pieces that are secured together with the insert portion or portions captured between the two housing pieces.

Eleventh inventive aspect: The tenth inventive aspect, wherein the reinforcing insert includes a plurality of the insert portions arranged in a row, and wherein the clamping housing forms a rectangular sleeve anchoring cassette.

Twelfth inventive aspect: The tenth or eleventh inventive aspect, wherein the two housing pieces are secured together by a snap-fit connection interface.

Thirteenth inventive aspect: The eleventh inventive aspect, wherein the clamping housing defines internal channels in which the insert portions are received and in which the sleeve ends are clamped.

Fourteenth inventive aspect: The eleventh inventive aspect, wherein the fiber routing system includes a plurality of the clamping housing, wherein the clamping housings are stackable, and wherein the clamping housings mate when stacked.

Fifteenth inventive aspect: The tenth inventive aspect, wherein the clamping housing defined exterior channels or rails adapted to mate with corresponding rails or channels defined by a cable break-out bracket.

Sixteenth inventive aspect: Any of the first through sixth or ninth through thirteenth inventive aspects, further comprising means for securing the sleeve anchor to a bracket or a cable.

Seventeenth inventive aspect: The sixteenth inventive aspect, wherein the means for securing includes fasteners, or rails, or channels, or a snap-fit connection, or fastener openings, or latches, or cable clamps, or straps.

Eighteenth inventive aspect: The sixteenth inventive aspect, further comprising a slideable mechanical interface between the sleeve anchor and the bracket.

Nineteenth inventive aspect: Any of the first through eighteenth inventive aspects, further comprising a cable break-out bracket including a cable anchoring location and a sleeve anchor mounting location.

Twentieth inventive aspect: The nineteenth inventive aspect, wherein the cable anchoring location includes a cable clamp, and the sleeve anchor mounting location includes a mechanical interface for slideably receiving the sleeve anchor or sleeve anchors.

Twenty-first inventive aspect: A fiber routing system comprising a mesh sleeve having a sleeve end; a reinforcing insert positioned within the sleeve end, the reinforcing insert defining an internal fiber passage that extends through a length of the reinforcing insert and configured to receive at least one optical fiber routed therethrough, the reinforcing insert including an outer side defining an annular channel; and a wrap-around style fastener for securing the sleeve end to a sleeve anchoring location, the wrap-around style fastener being tightened about an exterior of the mesh sleeve at a location in alignment with the annular channel of the reinforcing insert such that a portion of the mesh sleeve is compressed into the annular channel by the wrap-around style fastener.

Twenty-second inventive aspect: The twenty-first inventive aspect, wherein the sleeve anchoring location is defined in a rack mountable cassette including a plurality of fiber optic connection locations.

Twenty-third inventive aspect: The twenty-second inventive aspect, wherein the plurality of fiber optic connection locations include a fiber optic connector.

Twenty-fourth inventive aspect: The twenty-second inventive aspect, wherein the plurality of fiber optic connection locations include a fiber optic adapter.

Twenty-fifth inventive aspect: A fiber routing system comprising a mesh sleeve having a sleeve end; and a sleeve anchor mounted at the sleeve end, the sleeve anchor including: a reinforcing insert including at least a portion that fits within the sleeve end of the mesh sleeve, the reinforcing insert including an anchoring feature accessible from outside of the sleeve end for securing the sleeve anchor at a sleeve anchoring location, the reinforcing insert defining a fiber passage of the sleeve anchor that extends through the reinforcing insert and configured to receive at least one optical fiber routed therethrough; and a clamping collar that mounts over the sleeve end such that the sleeve end is clamped radially between the clamping collar and the reinforcing insert.

Twenty-sixth inventive aspect: The twenty-fifth inventive aspect, wherein the portion of the reinforcing insert that fits within the sleeve end is defined by a stem that projects from a base at which the anchoring feature is defined.

Twenty-seventh inventive aspect: The twenty-sixth inventive aspect, wherein the anchoring feature includes a pair of flange receivers defined by the base.

Twenty-eighth inventive aspect: The twenty-seventh inventive aspect, wherein the flange receivers have open sides that face in opposite directions.

Twenty-ninth inventive aspect: The twenty-eighth inventive aspect, wherein the base is rectangular and the flange receivers are slots that are straights and that are parallel relative to one another.

Thirtieth inventive aspect: The twenty-sixth inventive aspect, wherein the stem includes outer projections that engage the end portion of the sleeve end to enhance retention of the sleeve end between the clamping collar.

Thirty-first inventive aspect: The thirtieth inventive aspect, wherein the outer projections include teeth.

Thirty-second inventive aspect: The thirty-first inventive aspect, wherein the teeth include barbs that project into and embed within a mesh of the mesh sleeve.

Thirty-third inventive aspect: The twenty-fifth inventive aspect, further comprising a mechanical interface for securing the clamping collar to the reinforcing insert.

Thirty-fourth inventive aspect: The thirty-third inventive aspect, wherein the mechanical interface includes a snap-fit interface.

Thirty-fifth inventive aspect: The thirty-fourth inventive aspect, wherein the snap-fit interface includes a pair of flexible latching arms.

Thirty-sixth inventive aspect: The twenty-fifth inventive aspect, wherein the sleeve anchoring location is defined by a mounting fixture having an anchoring interface that couples with the anchoring feature of the sleeve anchor.

Thirty-seventh inventive aspect: The thirty-sixth inventive aspect, wherein the anchoring interface of the mounting fixture includes retention flanges that cooperate to define a mounting channel, and wherein the anchoring feature of the sleeve anchor includes flange receiving portions that receive the retention flanges to provide anchoring, wherein the sleeve anchor is configured to be slid into the mounting channel, and wherein the flange receiving portions receive the retention flanges there therein as the sleeve anchor is slide into the mounting channel.

Thirty-eighth inventive aspect: The thirty-seventh inventive aspect, wherein the mounting fixture is a bracket.

Thirty-ninth inventive aspect: The thirty-eighth inventive aspect, wherein the bracket includes a cable mounting location at which an end of a fiber optic cable is secured, wherein a plurality of mesh sleeves can be secured at the anchoring interface, and wherein optical fibers of the fiber optic cable can be transitioned from the end of the cable to the mesh sleeves at the bracket.

Fortieth inventive aspect: The thirty-sixth inventive aspect, wherein the mounting fixture is a breakout block.

Forty-first inventive aspect: The fortieth inventive aspect, wherein the breakout block includes a first end at which a plurality of mesh sleeves can be secured at the anchoring interface and a second end at which a single mesh sleeve can be secured at the anchoring interface, and wherein a plurality of optical fibers can be transitioned into the single mesh sleeve at the breakout block.

Forty-second inventive aspect: The fortieth inventive aspect, wherein the mounting fixture is a series of breakout blocks.

Forty-third inventive aspect: A fiber routing system comprising a plurality of mesh sleeves each having a sleeve end; and a sleeve mount secured at the sleeve ends of the mesh sleeves, the sleeve mount including: a reinforcing insert piece including a plurality of reinforcing inserts arranged in a ganged configuration, each of the reinforcing inserts fitting within a corresponding one of the sleeve ends of the mesh sleeves, the reinforcing inserts defining separate fiber passages configured to receive at least one optical fiber routed therethrough; and a clamping piece including a plurality of clamping collars each configured to mount over a corresponding one of the reinforcing inserts such that the sleeve ends of the mesh sleeves are clamped radially between the clamping collar and their corresponding reinforcing inserts.

Forty-fourth inventive aspect: The forty-third inventive aspect, wherein the reinforcing insert piece further includes a sleeve anchoring feature for securing the sleeve mount at a sleeve anchoring location.

Forty-fifth inventive aspect: The forty-fourth inventive aspect, wherein the wherein the sleeve anchoring location is defined by a mounting fixture having an anchoring interface that couples with the anchoring feature of the sleeve mount.

Forty-sixth inventive aspect: The forty-fifth inventive aspect, wherein the mounting fixture is a bracket.

Forty-seventh inventive aspect: A fiber routing system comprising: a mesh sleeve having a sleeve end; and a sleeve anchor mounted at the sleeve end, the sleeve anchor including: a reinforcing insert that fits within the sleeve end of the mesh sleeve, the reinforcing insert including opposite first and second ends, the reinforcing insert including first and second outer tapered sections positioned respectively at the first and second ends of the reinforcing insert, the first and second outer tapered sections tapering radially outwardly as the first and second outer tapered sections extend toward a central region of the reinforcing insert, the reinforcing insert defining a fiber passage that extends through the reinforcing insert from the first end to the second end of the reinforcing insert and configured to receive at least one optical fiber routed therethrough; a first clamping collar that mounts over the sleeve end at a location corresponding to the first outer tapered section of the reinforcing insert such that the sleeve end is clamped radially between the first clamping collar and the first outer tapered section of the reinforcing insert, the first clamping collar having a first inner tapered section adapted to nest relative to the first outer tapered section of the reinforcing insert; and a second clamping collar that mounts over the sleeve end at a location corresponding to the second outer tapered section of the reinforcing insert such that the sleeve end is clamped radially between the second clamping collar and the second outer tapered section of the reinforcing insert, the second clamping collar having a second inner tapered section adapted to nest relative to the second outer tapered section of the reinforcing insert.

Forty-eighth inventive aspect: The forty-seventh inventive aspect, further comprising a mechanical interface for securing the first clamping collar to the second clamping collar.

Forty-ninth inventive aspect: The forty-eighth inventive aspect, wherein the mechanical interface includes a bayonet-type interface.

Fiftieth inventive aspect: The forty-seventh inventive aspect, wherein the first clamping collar further includes a sleeve anchoring feature for securing the sleeve anchor at a sleeve anchoring location.

Fifty-first inventive aspect: The fiftieth inventive aspect, wherein the wherein the sleeve anchoring location is defined by a mounting fixture having an anchoring interface that couples with the anchoring feature of the sleeve anchor.

Fifty-second inventive aspect: A cable assembly comprising a cable including a cable jacket surrounding a media segment, the cable jacket having a terminated end at an intermediate location along the media segment so that the media segment extends beyond the cable jacket; a cable breakout assembly that secures to the cable jacket, the cable breakout assembly including: a sleeve extending from a first end to a second end, the sleeve surrounding at least a portion of the media segment disposed beyond the terminated end of the cable jacket, the first end of the sleeve being disposed closer to the terminated end of the cable jacket than the second end of the sleeve; an insert arrangement at least partly disposed within the first end of the sleeve; and a fixing arrangement disposed about the first end of the sleeve to hold the sleeve to the insert arrangement, the fixing arrangement being secured to the insert arrangement so that the sleeve is sandwiched between the fixing arrangement and the insert arrangement.

Fifty-third inventive aspect: The fifty-second inventive aspect, wherein the insert arrangement secures to the cable jacket.

Fifty-fourth inventive aspect: The fifty-second inventive aspect, wherein the fixing arrangement secures to the cable jacket.

Fifty-fifth inventive aspect: The fifty-second inventive aspect, wherein a conduit extends between a first end and a second end, the first end of the conduit securing to the cable jacket, the second end of the conduit securing to the cable breakout assembly.

Fifty-sixth inventive aspect: The fifty-fifth inventive aspect, wherein the conduit is formed from a common material with the sleeve.

Fifty-seventh inventive aspect: The fifty-sixth inventive aspect, wherein the common material is mesh.

Fifty-eighth inventive aspect: The fifty-second inventive aspect, wherein the sleeve is formed of mesh.

Fifty-ninth inventive aspect: The fifty-second inventive aspect, wherein the fixing arrangement couples to the sleeve and separately couples to the insert arrangement.

Sixtieth inventive aspect: The fifty-second inventive aspect, wherein the fixing arrangement includes a plurality of separate fixation members of the cable breakout assembly.

Sixty-first inventive aspect: The fifty-second inventive aspect, wherein the fixing arrangement includes a plurality of fixation members coupled together as a unit.

Sixty-second inventive aspect: The fifty-second inventive aspect, wherein the fixing arrangement couples to the insert arrangement through the sleeve.

Sixty-third inventive aspect: Any of the fifty-second through sixty-second inventive aspects, wherein the sleeve is one of a plurality of sleeves of the cable breakout assembly; and wherein the insert arrangement includes a plurality of insert members, each of the insert members being disposed within a first end of a respective one of the sleeves.

Sixty-fourth inventive aspect: The sixty-third inventive aspect, wherein the insert arrangement includes an anchor bracket attached to the cable jacket; and wherein the insert members extend from the anchor bracket.

Sixty-fifth inventive aspect: The sixty-fourth inventive aspect, wherein the insert arrangement also includes a compression ring that surrounds the cable jacket and defines an external ridge; wherein the anchor bracket defines an inner annular recess that receives the external ridge when the anchor bracket is slid over the compression ring in a first direction.

Sixty-sixth inventive aspect: The sixty-third inventive aspect, wherein the anchor bracket includes extension arms that extend partly along the cable jacket.

Sixty-seventh inventive aspect: The sixty-sixth inventive aspect, further comprising a mounting member that surrounds the extension arms to secure the extension arms to the cable.

Sixty-eighth inventive aspect: The sixty-third inventive aspect, wherein the insert members are separate pieces.

Sixty-ninth inventive aspect: The sixty-third inventive aspect, wherein the fixation arrangement is configured to slide laterally relative to the insert arrangement to lock the sleeve.

Seventieth inventive aspect: The sixty-ninth inventive aspect, wherein the fixation arrangement includes a base and a cover.

Seventy-first inventive aspect: The seventieth inventive aspect, wherein the cover is coupled to the base with a living hinge.

Various modifications and additions can be made to the disclosed embodiments discussed above. Accordingly, the scope of the present disclosure should not be limited by the particular embodiments described above, but should be defined only by the claims set forth below and equivalents thereof.

What is claimed:

1. A fiber routing system comprising:
   a plurality of optical fibers;
   a first mesh sleeve configured to surround the plurality of optical fibers, the first mesh sleeve having a first end through which the optical fibers extend into the mesh sleeve and a second end through which the optical fibers extend out of the mesh sleeve;
   a plurality of second mesh sleeves separating the optical fibers into groups, each second mesh sleeve surrounding a respective one of the groups, each second mesh sleeve defining a first end through which the optical fibers of the respective group extend into the second mesh sleeve, the first ends of the second mesh sleeves being spaced from and oriented to face the second end of the first mesh sleeve; and
   a snap-fit arrangement that secures the second mesh sleeves to the first mesh sleeve, the snap-fit arrangement being configured to mount around the optical fibers so that the optical fibers pass through the snap-fit arrangement, the snap-fit arrangement including a first piece that snap-fits to a second piece to secure the snap-fit arrangement to the first mesh sleeve and to the second mesh sleeves, wherein the first piece includes a reinforcing insert including at least an insert portion that fits within the second end of the first mesh sleeve, the reinforcing insert defining a fiber passage that extends through the reinforcing insert and is configured to receive the optical fibers routed therethrough, and wherein the second piece includes a fixing arrangement that mounts over the first end of each of the second mesh sleeves so that the first end of each of the second mesh sleeves is clamped between the fixing arrangement and the insert portion of the reinforcing insert.

2. The fiber routing system of claim 1, wherein the insert portion of the reinforcing insert includes outer projections that embed within the mesh sleeve when the sleeve end is clamped between the fixing arrangement and the insert portion.

3. The fiber routing system of claim 1, wherein the fixing arrangement has a one-piece construction.

4. The fiber routing system of claim 1, wherein the fixation arrangement is configured to fully surround the reinforcing insert.

5. The fiber routing system of claim 1, wherein the fixation arrangement mounts over the second end of the first mesh sleeve so that the second end of the first mesh sleeve is clamped between the fixation arrangement and the insert portion of the reinforcing insert.

6. The fiber routing system of claim 1, wherein the fixation arrangement includes a base and a cover.

7. The fiber routing system of claim 6, wherein the cover is pivotally coupled to the base.

8. The fiber routing system of claim 6, wherein the fixation arrangement also includes a retainer insert disposed in the base, the retainer insert being formed of a softer material than the fixation arrangement.

9. The fiber routing system of claim 1, wherein the first piece defines a plurality of channels.

10. The fiber routing system of claim 9, wherein the second piece covers open slots of the channels.

11. The fiber routing system of claim 1, wherein the first piece is configured to be coupled to a cable jacket via a cable tie.

12. A fiber routing system comprising:
    a plurality of optical fibers;
    a first mesh sleeve configured to surround the plurality of optical fibers, the first mesh sleeve having a first end through which the optical fibers extend into the mesh sleeve and a second end through which the optical fibers extend out of the mesh sleeve;
    a plurality of second mesh sleeves separating the optical fibers into groups, each second mesh sleeve surrounding a respective one of the groups, each second mesh sleeve defining a first end through which the optical fibers of the respective group extend into the second mesh sleeve, the first ends of the second mesh sleeves being spaced from and oriented to face the second end of the first mesh sleeve; and
    a snap-fit arrangement that secures the second mesh sleeves to the first mesh sleeve, the snap-fit arrangement being configured to mount around the optical fibers so that the optical fibers pass through the snap-fit arrangement, the snap-fit arrangement including a first piece that snap-fits to a second piece to secure the snap-fit arrangement to the first mesh sleeve and to the second mesh sleeves, the first piece extending along a length between opposite first and second ends, the first piece defining a channel at the first end that separates into a plurality of channels at the second end.

13. The fiber routing system of claim 12, wherein the channel is laterally accessible through an open slot extending the length of the first piece; and wherein the second piece covers the open slot when snap-fit to the first piece.

14. The fiber routing system of claim 12, wherein the first piece has a first transverse cross-dimension at a first end and a second transverse cross-dimension at a second end, the first end being configured to attach to the second end of the first mesh sleeve and the second end being configured to attach to the first ends of the second mesh sleeves, the second transverse cross-dimension being larger than the first transverse cross-dimension.

15. The fiber routing system of claim 12, wherein the second piece laterally slides onto the first piece.

16. The fiber routing system of claim 12, wherein the second piece surrounds the first piece.

17. The fiber routing system of claim 12, wherein the first piece defines outwardly protruding teeth.

18. The fiber routing system of claim 17, wherein the teeth include a first group of teeth disposed at a first end of the first piece and a second group of teeth disposed at a second end of the first piece.

19. The fiber routing system of claim 17, wherein the second piece defines apertures aligned with the teeth.

20. The fiber routing system of claim 17, wherein the teeth protrude outwardly from opposite sides of the first piece.

* * * * *